(12) United States Patent
Wechsler et al.

(10) Patent No.: US 11,742,893 B2
(45) Date of Patent: Aug. 29, 2023

(54) SPECIFIC HOPPING PATTERNS FOR TELEGRAM SPLITTING

(71) Applicant: Fraunhofer-Gesellschaft zur Förderung der angewandten Forschung e.V, Munich (DE)

(72) Inventors: Johannes Wechsler, Spalt (DE); Gerd Kilian, Erlangen (DE); Josef Bernhard, Nabburg (DE); Dominik Soller, Schwaig (DE); Jakob Kneissl, Fürth (DE); Alexej Jarresch, Nuremberg (DE); Raimund Meyer, Fürth (DE); Frank Obernosterer, Nuremberg (DE)

(73) Assignee: FRAUNHOFER-GESELLSCHAFT ZUR FÖRDERUNG DER ANGEWANDTEN FORSCHUNG, E.V., Munich (DE)

( * ) Notice: Subject to any disclaimer, the term of this patent is extended or adjusted under 35 U.S.C. 154(b) by 0 days.

(21) Appl. No.: 16/600,140

(22) Filed: Oct. 11, 2019

(65) Prior Publication Data

US 2020/0044687 A1 Feb. 6, 2020

Related U.S. Application Data

(63) Continuation of application No. PCT/EP2018/025109, filed on Apr. 10, 2018.

(30) Foreign Application Priority Data

Apr. 11, 2017 (DE) .......................... 102017206236.3

(51) Int. Cl.
*H04B 1/715* (2011.01)
*H04B 1/02* (2006.01)
(Continued)

(52) U.S. Cl.
CPC ............... *H04B 1/715* (2013.01); *H04B 1/02* (2013.01); *H04B 1/06* (2013.01); *H04L 1/0041* (2013.01)

(58) Field of Classification Search
CPC ... H04B 1/00; H04B 1/02; H04B 1/06; H04B 1/69; H04B 1/713; H04B 1/715;
(Continued)

(56) References Cited

U.S. PATENT DOCUMENTS 4,271,524 A * 6/1981 Goodman ............... H04J 13/00
370/344
4,355,399 A * 10/1982 Timor .................. H04B 1/7143
375/135

(Continued)

FOREIGN PATENT DOCUMENTS

DE 10211235 A1 10/2003
DE 102011082098 A1 3/2013
(Continued)

OTHER PUBLICATIONS

Yoshie Kazuaki, "Office Action for JP Application No. 2019-555687", dated Jan. 6, 2021, JPO, Japan.
(Continued)

*Primary Examiner* — James M Perez
(74) *Attorney, Agent, or Firm* — NKL Law; Jae Youn Kim

(57) ABSTRACT

In embodiments, instead of a uniform (global) hopping pattern that is used equally by all data transmitters and data receivers of a communication system, data transmitters and the data receiver use an individual hopping pattern for the communication. This individual hopping pattern may depend on an operation and is therefore only used by the data transmitter and the data receiver themselves or by a
(Continued)

small group of data transmitters and/or data receivers, which may significantly increase the interference immunity.

29 Claims, 14 Drawing Sheets

(51) Int. Cl.
*H04B 1/06* (2006.01)
*H04L 1/00* (2006.01)

(58) Field of Classification Search
CPC .............. H04B 1/7136; H04B 1/71362; H04B 1/71365; H04B 1/71367; H04B 1/7143; H04B 1/0041; H04L 1/0041
USPC .......................................... 375/132–133, 135
See application file for complete search history.

(56) References Cited

U.S. PATENT DOCUMENTS

| | | | | |
|---|---|---|---|---|
| 4,383,323 A * | 5/1983 | Timor | .................. | H04J 3/26 375/135 |
| 4,485,477 A * | 11/1984 | Nossen | .................. | H04B 1/69 375/150 |
| 5,097,485 A * | 3/1992 | O'Connor | .............. | H04B 1/713 375/135 |
| 5,412,687 A * | 5/1995 | Sutton | .................. | H04L 27/148 375/135 |
| 5,434,577 A * | 7/1995 | Baghdady | .............. | G01S 11/10 342/380 |
| 5,448,569 A * | 9/1995 | Huang | .................. | H04W 36/30 370/332 |
| 5,450,490 A * | 9/1995 | Jensen | .................. | H04H 20/31 455/2.01 |
| 5,793,795 A * | 8/1998 | Li | .......................... | H04B 1/715 714/784 |
| 5,832,026 A * | 11/1998 | Li | .......................... | H04L 1/0057 375/136 |
| 5,852,630 A * | 12/1998 | Langberg | ............ | H04L 27/2647 375/219 |
| 5,974,081 A * | 10/1999 | Rosas | .................. | H04B 1/713 375/E1.033 |
| 5,987,033 A * | 11/1999 | Boer | .................. | H04W 74/0816 370/313 |
| 6,018,543 A * | 1/2000 | Blois | .................. | H04B 1/715 455/199.1 |
| 6,112,094 A * | 8/2000 | Dent | .................. | H04B 1/713 455/410 |
| 6,114,971 A * | 9/2000 | Nysen | .................. | G06K 7/10009 340/10.3 |
| 6,148,020 A * | 11/2000 | Emi | .................. | H04B 7/2621 375/138 |
| 6,169,761 B1 * | 1/2001 | Marcoccia | ........... | H04B 1/7156 455/226.1 |
| 6,278,722 B1 * | 8/2001 | Evans | .................. | H04B 1/405 375/E1.034 |
| 6,320,896 B1 * | 11/2001 | Jovanovich | .............. | H04B 1/69 375/147 |
| 6,335,946 B1 * | 1/2002 | Winnberg | ................ | H04L 27/10 375/132 |
| 6,381,261 B1 * | 4/2002 | Nagazumi | .............. | G01S 13/222 375/138 |
| 6,633,226 B1 * | 10/2003 | Nysen | .................. | G06K 7/10009 340/10.3 |
| 6,967,974 B1 * | 11/2005 | Partyka | .................. | H04L 7/046 370/312 |
| 7,167,504 B1 * | 1/2007 | Mower | .................. | H04B 1/707 375/142 |
| 7,269,200 B2 | 9/2007 | Igarashi | ............... | H03C 3/0991 375/135 |
| 7,496,080 B1 * | 2/2009 | Mower | .............. | H04L 12/4035 370/335 |
| 7,590,198 B2 * | 9/2009 | Sanada | ................ | H04B 1/7183 370/503 |
| 7,656,931 B2 * | 2/2010 | Smith | .................... | H04B 1/692 375/135 |
| 7,787,829 B1 * | 8/2010 | Wright | ...................... | H03J 7/04 455/76 |
| 8,000,375 B2 * | 8/2011 | Murofushi | ........... | H04B 1/7143 375/135 |
| 9,325,369 B2 * | 4/2016 | Lee | ........................ | H04B 1/715 |
| 9,356,652 B2 * | 5/2016 | Bivol | .................. | H04B 1/7143 |
| 10,327,156 B2 * | 6/2019 | Byun | .................... | H04W 72/56 |
| 10,469,125 B2 * | 11/2019 | Robertson | ............. | H04W 12/12 |
| 10,707,915 B2 * | 7/2020 | Liu | ...................... | H04B 1/7143 |
| 10,938,441 B2 * | 3/2021 | Liu | ........................ | H04L 5/0098 |
| 11,067,684 B2 * | 7/2021 | Kilian | ...................... | G01S 11/08 |
| 11,258,477 B2 * | 2/2022 | Kneissl | .................. | H04B 1/7136 |
| 11,258,722 B2 * | 2/2022 | Bernhard | .................. | H04L 1/003 |
| 11,368,186 B2 * | 6/2022 | Kilian | .................. | H04B 1/7143 |
| 11,483,015 B2 * | 10/2022 | Kilian | .................. | H04B 1/0021 |
| 11,483,028 B2 * | 10/2022 | Kilian | .................... | H04L 1/007 |
| 11,516,703 B2 * | 11/2022 | Kilian | .............. | H04W 52/0219 |
| 11,611,369 B2 * | 3/2023 | Gamm | .................. | H04B 1/7156 |
| 2003/0161383 A1 * | 8/2003 | Mower | ................ | H04B 1/7085 375/E1.016 |
| 2004/0057499 A1 * | 3/2004 | Haartsen | .............. | H04B 1/713 375/136 |
| 2004/0125889 A1 * | 7/2004 | Cumeralto | .............. | H04L 27/32 375/132 |
| 2005/0031051 A1 * | 2/2005 | Rosen | .................... | H04B 1/713 375/147 |
| 2005/0176371 A1 * | 8/2005 | Palin | .................... | H04B 1/7143 455/39 |
| 2005/0249265 A1 * | 11/2005 | Shoji | .................... | H04B 1/713 375/E1.033 |
| 2006/0045216 A1 * | 3/2006 | Hegyi | .................... | H04L 27/16 375/344 |
| 2006/0072649 A1 * | 4/2006 | Chang | .................... | H04B 1/713 375/E1.034 |
| 2007/0107844 A1 * | 5/2007 | Bullock | ............ | H01J 37/32174 156/345.28 |
| 2007/0242669 A1 * | 10/2007 | Achard | .................... | H04B 7/022 370/312 |
| 2009/0028219 A1 * | 1/2009 | Djuknic | .................. | H04B 1/692 375/E1.001 |
| 2009/0109953 A1 * | 4/2009 | Tsang | .................. | H04L 27/2662 370/350 |
| 2009/0161731 A1 * | 6/2009 | Fudge | ...................... | G01S 7/285 375/E1.033 |
| 2009/0238241 A1 * | 9/2009 | Hooli | .................... | H04L 5/0012 375/E1.033 |
| 2009/0303972 A1 * | 12/2009 | Flammer, III | .... | H04L 25/03866 370/338 |
| 2009/0304044 A1 * | 12/2009 | Van De Beek | ......... | H03L 7/183 375/135 |
| 2010/0111139 A1 * | 5/2010 | Arnott | .............. | H04W 72/0446 375/E1.033 |
| 2010/0156610 A1 * | 6/2010 | Wild | .................... | G06K 7/0008 340/10.34 |
| 2010/0260233 A1 * | 10/2010 | Luong | ................ | H04L 27/2675 375/136 |
| 2011/0179875 A1 * | 7/2011 | Salzburger | ............. | G01N 29/32 73/643 |
| 2013/0128876 A1 * | 5/2013 | Kilian | ................ | H03M 13/6306 370/347 |
| 2014/0192789 A1 * | 7/2014 | Bernhard | .......... | H04W 72/0446 370/336 |
| 2015/0053007 A1 * | 2/2015 | Decoux | ................ | G04D 7/1207 73/579 |
| 2015/0078150 A1 * | 3/2015 | Moreno De Ayala | .. | H04J 13/12 370/208 |
| 2015/0195670 A1 * | 7/2015 | Agee | .................... | H04B 1/7103 375/144 |
| 2015/0270869 A1 * | 9/2015 | Bivol | .................. | H04B 1/715 375/132 |
| 2016/0249328 A1 * | 8/2016 | Bernhard | .......... | H04W 52/0209 |
| 2016/0366649 A1 * | 12/2016 | Bernhard | .......... | H04W 52/0277 |

(56) References Cited

U.S. PATENT DOCUMENTS

| | | | |
|---|---|---|---|
| 2017/0026075 A1* | 1/2017 | Robertson | H04J 13/0062 |
| 2018/0152264 A1* | 5/2018 | Kilian | H03M 13/45 |
| 2018/0212739 A1* | 7/2018 | Kim | H04W 76/15 |
| 2019/0020424 A1* | 1/2019 | Yerramalli | H04B 17/309 |
| 2019/0036757 A1* | 1/2019 | Kilian | H04L 27/2659 |
| 2019/0036833 A1* | 1/2019 | Bernhard | H04L 47/41 |
| 2019/0036834 A1* | 1/2019 | Bernhard | H04L 47/365 |
| 2019/0227158 A1* | 7/2019 | Kilian | H04B 1/713 |
| 2019/0246315 A1* | 8/2019 | Kilian | H04L 1/0007 |
| 2019/0253101 A1* | 8/2019 | Kilian | H04L 7/041 |
| 2019/0253102 A1* | 8/2019 | Kilian | H04L 1/0061 |
| 2019/0273580 A1* | 9/2019 | Petkov | H04L 1/0013 |
| 2019/0288741 A1* | 9/2019 | Kilian | H03M 13/3776 |
| 2019/0380151 A1* | 12/2019 | Kim | H04W 74/0833 |
| 2019/0394636 A1* | 12/2019 | Kilian | H04B 1/7143 |
| 2020/0044687 A1* | 2/2020 | Wechsler | H04L 5/0012 |
| 2020/0052736 A1* | 2/2020 | Kilian | H04L 5/0044 |
| 2020/0052876 A1* | 2/2020 | Kilian | H04L 9/3247 |
| 2020/0052952 A1* | 2/2020 | Kneissl | H04L 27/2613 |
| 2020/0100282 A1* | 3/2020 | Ye | H04L 5/0044 |
| 2020/0168987 A1* | 5/2020 | Kilian | H01Q 1/42 |
| 2020/0169349 A1* | 5/2020 | Kilian | H04W 12/03 |
| 2020/0177233 A1* | 6/2020 | Kneissl | H04L 5/0044 |
| 2020/0266852 A1* | 8/2020 | Kilian | H04W 56/0015 |
| 2020/0336241 A1* | 10/2020 | Kilian | H04L 1/0041 |
| 2020/0343980 A1* | 10/2020 | Kilian | H04W 4/70 |
| 2021/0036721 A1* | 2/2021 | Kilian | H04B 1/0021 |
| 2021/0036727 A1* | 2/2021 | Kilian | H04B 1/1027 |
| 2021/0036734 A1* | 2/2021 | Gamm | H04J 13/107 |
| 2021/0083906 A1* | 3/2021 | Kilian | H04L 25/0236 |
| 2021/0105041 A1* | 4/2021 | Obernosterer | H04W 76/11 |
| 2021/0112485 A1* | 4/2021 | Obernosterer | H04W 72/541 |
| 2021/0159940 A1* | 5/2021 | Drugge | H04L 5/005 |
| 2021/0194538 A1* | 6/2021 | Kilian | H04L 5/0048 |
| 2021/0359425 A1* | 11/2021 | Ulbricht | H01Q 7/00 |
| 2021/0385768 A1* | 12/2021 | Kilian | H04B 1/7073 |
| 2022/0022205 A1* | 1/2022 | Kilian | H04W 88/10 |
| 2022/0345177 A1* | 10/2022 | Kilian | H04B 1/7143 |
| 2022/0417953 A1* | 12/2022 | Petkov | H04B 1/7143 |

FOREIGN PATENT DOCUMENTS

| | | |
|---|---|---|
| DE | 102016205054 A1 | 9/2017 |
| EP | 2015465 A2 | 1/2009 |
| JP | 2002135230 A | 5/2002 |
| JP | 2006-174267 A | 6/2006 |
| RU | 2485708 C2 | 3/2013 |
| WO | 2015128385 A1 | 2/2015 |

OTHER PUBLICATIONS

Gerd Kilian et al._Increasing Transmission Reliability for Telemetry Systems Using Telegram Splitting, IEEE, Mar. 2015, p. 949-961, vol. 63, Issue 3.

Gerd Kilian et al., Improved Coverage for Low-Power Telemetry Systems using Telegram Splitting, XP-002763748, Jun. 11-12, 2013.

Alex W. Lam, Time-Hopping and Frequency-Hopping Multiple-Access Packet Communications, IEEE, Jun. 1990, p. 875-887, vol. 38, No. 6.

* cited by examiner

SPECIFIC HOPPING PATTERNS FOR TELEGRAM SPLITTING

CROSS-REFERENCES TO RELATED APPLICATIONS

This application is a continuation of copending International Application No. PCT/EP2018/025109, filed Apr. 10, 2018, which is incorporated herein by reference in its entirety, and additionally claims priority from German Application No. DE 10 2017 2062 36.3, filed Apr. 11, 2017, which is incorporated herein by reference in its entirety.

BACKGROUND OF THE INVENTION

Embodiments refer to a data transmitter and, in particular, to a data transmitter transmitting data using an individual hopping pattern. Further embodiments refer to a data receiver and, in particular, to a data receiver receiving data transmitted using an individual hopping pattern. Further embodiments refer to generating specific hopping patterns. Further embodiments refer to transmitting and receiving data using specific hopping patterns. Some embodiments refer to specific hopping patterns for telegram splitting. Some embodiments refer to an optimization process for generating hopping patterns.

DE 10 2011 082 098 B4 describes the telegram splitting method, wherein a telegram (or data packet) is divided to a plurality of sub-data packets that are transmitted using a hopping pattern in a distributed manner in time and, optionally, in frequency.

WO 2015/128385 A1 describes a data transmission array comprising an energy harvesting element as an energy source is described. The data transmission array is configured to transmit data using the telegram splitting method, wherein, in dependence on an amount of electrical energy provided by the energy supply unit, a partial packet to be transmitted is either transmitted, buffered and transmitted at a later time, or discarded.

The publication [G. Kilian, H. Petkov, R. Psiuk, H. Lieske, F. Beer, J. Robert, and A. Heuberger, "Improved coverage for low-power telemetry systems using telegram splitting," in Proceedings of 2013 European Conference on Smart Objects, Systems and Technologies (SmartSysTech), 2013] describes an improved range for low-energy telemetry systems using the telegram splitting method.

The publication [G. Kilian, M. Breiling, H. H. Petkov, H. Lieske, F. Beer, J. Robert, and A. Heuberger, "Increasing Transmission Reliability for Telemetry Systems Using Telegram Splitting," IEEE Transactions on Communications, vol. 63, no. 3, pp. 949-961, March 2015] describes an improved transmission reliability for low-energy telemetry systems using the telegram splitting method.

The telegram splitting method uses specific time/frequency hopping patterns in order to transmit data via the radio channel. In order to be able to successfully decode a data packet, the hopping pattern used for the transmission has to be known at the receiver. In order to ensure this, global time and frequency hopping patterns known to all participants are defined for telegram splitting networks.

The communication of several participants by means of telegram splitting in the same band results in a deteriorated interference immunity of the transmission if the same time and/or frequency hopping pattern is used for the data transmission by several nodes. If two nodes start a transmission with the same hopping pattern within a short time window (e.g. the duration of a sub-data packet), all sub-data packets of the telegram overlap and, in the worst case, cancel each other out.

SUMMARY

An embodiment may have a data transmitter configured to transmit a signal having an individual hopping pattern, wherein the individual hopping pattern depends on an operation parameter, wherein the operation parameter is a frequency offset which the data transmitter provides to a hopping pattern in order to obtain the individual hopping pattern, wherein the frequency offset is a random frequency offset.

Another embodiment may have a data receiver configured to receive a signal from a data transmitter, wherein the signal has an individual hopping pattern, wherein the individual hopping pattern depends on an operation parameter of the data transmitter, wherein the operation parameter is a frequency offset which the data transmitter provides to a hopping pattern in order to obtain the individual hopping pattern, wherein the frequency offset is a random frequency offset.

According to another embodiment, a system may have an inventive data transmitter and an inventive data receiver.

According to another embodiment, a method for transmitting a signal may have the steps of: transmitting the signal, wherein the signal has an individual hopping pattern, wherein the individual hopping pattern depends on a transmitter-side operation parameter, wherein the operation parameter is a frequency offset which is provided to a hopping pattern on the transmitter-side in order to obtain the individual hopping pattern, wherein the frequency offset is a random frequency offset.

According to another embodiment, a method for receiving a signal may have the steps of: receiving the signal, wherein the signal has an individual hopping pattern, wherein the individual hopping pattern depends on a transmitter side operation parameter, wherein the operation parameter is a frequency offset which is provided to a hopping pattern on the transmitter-side in order to obtain the individual hopping pattern, wherein the frequency offset is a random frequency offset.

Another embodiment may have a non-transitory digital storage medium having a computer program stored thereon to perform the method for transmitting a signal, the method having the steps of: transmitting the signal, wherein the signal has an individual hopping pattern, wherein the individual hopping pattern depends on a transmitter-side operation parameter, wherein the operation parameter is a frequency offset which is provided to a hopping pattern on the transmitter-side in order to obtain the individual hopping pattern, wherein the frequency offset is a random frequency offset, when said computer program is run by a computer.

Another embodiment may have a non-transitory digital storage medium having a computer program stored thereon to perform the method for receiving a signal, the method having the steps of: receiving the signal, wherein the signal has an individual hopping pattern, wherein the individual hopping pattern depends on a transmitter side operation parameter, wherein the operation parameter is a frequency offset which is provided to a hopping pattern on the transmitter-side in order to obtain the individual hopping pattern, wherein the frequency offset is a random frequency offset, when said computer program is run by a computer.

Another embodiment may have a data transmitter configured to transmit data according to a hopping pattern, wherein the data transmitter is configured to transmit the data only in selected hops of a plurality of hops of the hopping pattern, wherein the data transmitter is configured to select the selected hops randomly or in dependence on an operation parameter; wherein the selected hops of the hopping pattern are a subset of the plurality of hops of the hopping pattern.

Another embodiment may have a data receiver configured to receive data according to a hopping pattern, wherein the data is transmitted by a data transmitter only in selected hops of a plurality of hops of the hopping pattern, wherein the selected hops are selected randomly or in dependence on an operation parameter, wherein the selected hops of the hopping pattern are a subset or partial set of the plurality of hops of the hopping pattern.

According to another embodiment, a system may have an inventive data transmitter and an inventive data receiver.

According to another embodiment, a method for transmitting data according to a hopping pattern may have the steps of: selecting a subset of hops of a plurality of hops of the hopping pattern, wherein the subset of hops is selected from the plurality of hops randomly or in dependence on an operation parameter; and transmitting the data in the selected hops of the hopping pattern.

According to another embodiment, a method for receiving data according to any hopping pattern may have the steps of: receiving the data, wherein the data is only transmitted in selected hops of a plurality of hops of the hopping pattern, wherein the hops are selected randomly or in dependence on an operation parameter.

Another embodiment may have a non-transitory digital storage medium having a computer program stored thereon to perform the method for transmitting data according to a hopping pattern, the method having the steps of: selecting a subset of hops of a plurality of hops of the hopping pattern, wherein the subset of hops is selected from the plurality of hops randomly or in dependence on an operation parameter; and transmitting the data in the selected hops of the hopping pattern, when said computer program is run by a computer.

Another embodiment may have a non-transitory digital storage medium having a computer program stored thereon to perform the method for receiving data according to any hopping pattern, the method having the steps of: receiving the data, wherein the data is only transmitted in selected hops of a plurality of hops of the hopping pattern, wherein the hops are selected randomly or in dependence on an operation parameter, when said computer program is run by a computer.

According to another embodiment, a method for generating a set of hopping patterns may have the steps of: randomly generating a plurality of hopping patterns, wherein the hopping patterns have at least two hops that are distributed in time and frequency; and selecting, from the plurality of hopping patterns, the hopping patterns whose autocorrelation functions have specified autocorrelation characteristics in order to obtain hopping patterns with specified autocorrelation characteristics.

Another embodiment may have transmitting a signal with a hopping pattern; wherein the hopping pattern is a time hopping pattern, a frequency hopping pattern, or a combination of the time hopping pattern and the frequency hopping pattern; wherein the time hopping pattern is one of the following eight time hopping patterns having 24 hops each:

| | # of sub-data packets in the core frame $S_C$ | | | | | | | | | | | |
|---|---|---|---|---|---|---|---|---|---|---|---|---|
| No. | 1 | 2 | 3 | 4 | 5 | 6 | 7 | 8 | 9 | 10 | 11 | 12 |
| 1 | 330 | 387 | 388 | 330 | 387 | 354 | 330 | 387 | 356 | 330 | 387 | 432 |
| 2 | 330 | 387 | 435 | 330 | 387 | 409 | 330 | 387 | 398 | 330 | 387 | 370 |
| 3 | 330 | 387 | 356 | 330 | 387 | 439 | 330 | 387 | 413 | 330 | 387 | 352 |
| 4 | 330 | 387 | 352 | 330 | 387 | 382 | 330 | 387 | 381 | 330 | 387 | 365 |
| 5 | 330 | 387 | 380 | 330 | 387 | 634 | 330 | 387 | 360 | 330 | 387 | 393 |
| 6 | 330 | 387 | 364 | 330 | 387 | 375 | 330 | 387 | 474 | 330 | 387 | 355 |
| 7 | 330 | 387 | 472 | 330 | 387 | 546 | 330 | 387 | 501 | 330 | 387 | 356 |
| 8 | 330 | 387 | 391 | 330 | 387 | 468 | 330 | 387 | 512 | 330 | 387 | 543 |

| | # of sub-data packets in the core frame $S_C$ | | | | | | | | | | |
|---|---|---|---|---|---|---|---|---|---|---|---|
| No. | 13 | 14 | 15 | 16 | 17 | 18 | 19 | 20 | 21 | 22 | 23 |
| 1 | 330 | 387 | 352 | 330 | 387 | 467 | 330 | 387 | 620 | 330 | 387 |
| 2 | 330 | 387 | 361 | 330 | 387 | 472 | 330 | 387 | 522 | 330 | 387 |
| 3 | 330 | 387 | 485 | 330 | 387 | 397 | 330 | 387 | 444 | 330 | 387 |
| 4 | 330 | 387 | 595 | 330 | 387 | 604 | 330 | 387 | 352 | 330 | 387 |
| 5 | 330 | 387 | 352 | 330 | 387 | 373 | 330 | 387 | 490 | 330 | 387 |
| 6 | 330 | 387 | 478 | 330 | 387 | 464 | 330 | 387 | 513 | 330 | 387 |
| 7 | 330 | 387 | 359 | 330 | 387 | 359 | 330 | 387 | 364 | 330 | 387 |
| 8 | 330 | 387 | 354 | 330 | 387 | 391 | 330 | 387 | 368 | 330 | 387 | wherein each line in the table is a time hopping pattern, wherein each column in the table is a hop of the respective time hopping pattern starting from a second hop so that each time hopping pattern has 24 hops, wherein each cell in the table indicates a temporal interval of a reference point of the respective hop to a same reference point of an immediately subsequent hop in symbol durations or multiples of symbol durations; wherein the frequency hopping pattern is one of the following eight frequency hopping patterns having 24 hops each:

| Pattern Number | # of sub-data packets in the core frame $S_C$ | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 5 | 21 | 13 | 6 | 22 | 14 | 1 | 17 | 9 | 0 | 16 | 8 | 7 | 23 | 15 | 4 | 20 | 12 | 3 | 19 | 11 | 2 | 18 | 10 |
| 2 | 4 | 20 | 12 | 1 | 17 | 9 | 0 | 16 | 8 | 6 | 22 | 14 | 7 | 23 | 15 | 2 | 18 | 10 | 5 | 21 | 13 | 3 | 19 | 11 |

-continued

| Pattern Number | # of sub-data packets in the core frame $S_C$ | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 3 | 4 | 20 | 12 | 3 | 19 | 11 | 6 | 22 | 14 | 7 | 23 | 15 | 0 | 16 | 8 | 5 | 21 | 13 | 2 | 18 | 10 | 1 | 17 | 9 |
| 4 | 6 | 22 | 14 | 2 | 18 | 10 | 7 | 23 | 15 | 0 | 16 | 8 | 1 | 17 | 9 | 4 | 20 | 12 | 5 | 21 | 13 | 3 | 19 | 11 |
| 5 | 7 | 23 | 15 | 4 | 20 | 12 | 3 | 19 | 11 | 2 | 18 | 10 | 6 | 22 | 14 | 0 | 16 | 8 | 1 | 17 | 9 | 5 | 21 | 13 |
| 6 | 3 | 19 | 11 | 6 | 22 | 14 | 2 | 18 | 10 | 0 | 16 | 8 | 7 | 23 | 15 | 1 | 17 | 9 | 4 | 20 | 12 | 5 | 21 | 13 |
| 7 | 3 | 19 | 11 | 1 | 17 | 9 | 5 | 21 | 13 | 7 | 23 | 15 | 0 | 16 | 8 | 2 | 18 | 10 | 6 | 22 | 14 | 4 | 20 | 12 |
| 8 | 0 | 16 | 8 | 6 | 22 | 14 | 3 | 19 | 11 | 2 | 18 | 10 | 4 | 20 | 12 | 7 | 23 | 15 | 5 | 21 | 13 | 1 | 17 | 9 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers (UCG_C0-UCG_C23).

Another embodiment may have transmitting a signal according to a hopping pattern; wherein the hopping pattern is a time hopping pattern, a frequency hopping pattern, or a combination of the time hopping pattern and the frequency hopping pattern; wherein the time hopping pattern is one of the following eight time hopping patterns having 24 hops each:

| No. | # of sub-data packets in the core frame $S_C$ | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | 373 | 319 | 489 | 373 | 319 | 500 | 373 | 319 | 482 | 373 | 319 | 637 |
| 2 | 373 | 319 | 505 | 373 | 319 | 545 | 373 | 319 | 403 | 373 | 319 | 412 |
| 3 | 373 | 319 | 349 | 373 | 319 | 349 | 373 | 319 | 443 | 373 | 319 | 649 |
| 4 | 373 | 319 | 507 | 373 | 319 | 426 | 373 | 319 | 658 | 373 | 319 | 601 |
| 5 | 373 | 319 | 430 | 373 | 319 | 375 | 373 | 319 | 427 | 373 | 319 | 476 |
| 6 | 373 | 319 | 485 | 373 | 319 | 357 | 373 | 319 | 611 | 373 | 319 | 438 |
| 7 | 373 | 319 | 620 | 373 | 319 | 490 | 373 | 319 | 402 | 373 | 319 | 517 |
| 8 | 373 | 319 | 353 | 373 | 319 | 341 | 373 | 319 | 634 | 373 | 319 | 556 |

| No. | # of sub-data packets in the core frame $S_C$ | | | | | | | | | | |
|---|---|---|---|---|---|---|---|---|---|---|---|
| | 13 | 14 | 15 | 16 | 17 | 18 | 19 | 20 | 21 | 22 | 23 |
| 1 | 373 | 319 | 342 | 373 | 319 | 346 | 373 | 319 | 405 | 373 | 319 |
| 2 | 373 | 319 | 420 | 373 | 319 | 446 | 373 | 319 | 393 | 373 | 319 |
| 3 | 373 | 319 | 629 | 373 | 319 | 344 | 373 | 319 | 354 | 373 | 319 |
| 4 | 373 | 319 | 364 | 373 | 319 | 345 | 373 | 319 | 342 | 373 | 319 |
| 5 | 373 | 319 | 632 | 373 | 319 | 557 | 373 | 319 | 349 | 373 | 319 |
| 6 | 373 | 319 | 372 | 373 | 319 | 460 | 373 | 319 | 417 | 373 | 319 |
| 7 | 373 | 319 | 353 | 373 | 319 | 366 | 373 | 319 | 345 | 373 | 319 |
| 8 | 373 | 319 | 646 | 373 | 319 | 341 | 373 | 319 | 364 | 373 | 319 | wherein each line in the table is a time hopping pattern, wherein each column in the table is a hop of the respective time hopping pattern starting from a second hop so that each time hopping pattern has 24 hops, wherein each cell in the table indicates a temporal interval of a reference point of the respective hop to a same reference point of an immediately subsequent hop in symbol durations or multiples of symbol durations; wherein the frequency hopping pattern is one of the following eight frequency hopping patterns having 24 hops each:

| Pattern Number | # of sub-data packets in the core frame $S_C$ | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 4 | 24 | 14 | 8 | 28 | 18 | 9 | 29 | 19 | 3 | 23 | 13 | 7 | 27 | 17 | 0 | 20 | 10 | 6 | 26 | 16 | 5 | 25 | 15 |
| 2 | 2 | 22 | 12 | 0 | 20 | 10 | 7 | 27 | 17 | 8 | 28 | 18 | 1 | 21 | 11 | 4 | 24 | 14 | 9 | 29 | 19 | 6 | 26 | 16 |
| 3 | 0 | 20 | 10 | 6 | 26 | 16 | 4 | 24 | 14 | 3 | 23 | 13 | 2 | 22 | 12 | 5 | 25 | 15 | 9 | 29 | 19 | 1 | 21 | 11 |
| 4 | 7 | 27 | 17 | 4 | 24 | 14 | 2 | 22 | 12 | 8 | 28 | 18 | 1 | 21 | 11 | 9 | 29 | 19 | 6 | 26 | 16 | 0 | 20 | 10 |
| 5 | 3 | 23 | 13 | 2 | 22 | 12 | 8 | 28 | 18 | 5 | 25 | 15 | 0 | 20 | 10 | 7 | 27 | 17 | 6 | 26 | 16 | 1 | 21 | 11 |
| 6 | 1 | 21 | 11 | 3 | 23 | 13 | 8 | 28 | 18 | 9 | 29 | 19 | 2 | 22 | 12 | 5 | 25 | 15 | 0 | 20 | 10 | 7 | 27 | 17 |
| 7 | 6 | 26 | 16 | 7 | 27 | 17 | 9 | 29 | 19 | 4 | 24 | 14 | 0 | 20 | 10 | 3 | 23 | 13 | 8 | 28 | 18 | 5 | 25 | 15 |
| 8 | 1 | 21 | 11 | 7 | 27 | 17 | 3 | 23 | 13 | 9 | 29 | 19 | 4 | 24 | 14 | 6 | 26 | 16 | 8 | 28 | 18 | 0 | 20 | 10 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers (UCG_C0-UCG_C29).

Another embodiment may have receiving a signal having a hopping pattern; wherein the hopping pattern is a time hopping pattern, a frequency hopping pattern, or a combination of the time hopping pattern and the frequency hopping pattern; wherein the time hopping pattern is one of the following eight time hopping patterns having 24 hops each:

| | # of sub-data packets in the core frame $S_C$ | | | | | | | | | | | |
|---|---|---|---|---|---|---|---|---|---|---|---|---|
| No. | 1 | 2 | 3 | 4 | 5 | 6 | 7 | 8 | 9 | 10 | 11 | 12 |
| 1 | 330 | 387 | 388 | 330 | 387 | 354 | 330 | 387 | 356 | 330 | 387 | 432 |
| 2 | 330 | 387 | 435 | 330 | 387 | 409 | 330 | 387 | 398 | 330 | 387 | 370 |
| 3 | 330 | 387 | 356 | 330 | 387 | 439 | 330 | 387 | 413 | 330 | 387 | 352 |
| 4 | 330 | 387 | 352 | 330 | 387 | 382 | 330 | 387 | 381 | 330 | 387 | 365 |
| 5 | 330 | 387 | 380 | 330 | 387 | 634 | 330 | 387 | 360 | 330 | 387 | 393 |
| 6 | 330 | 387 | 364 | 330 | 387 | 375 | 330 | 387 | 474 | 330 | 387 | 355 |
| 7 | 330 | 387 | 472 | 330 | 387 | 546 | 330 | 387 | 501 | 330 | 387 | 356 |
| 8 | 330 | 387 | 391 | 330 | 387 | 468 | 330 | 387 | 512 | 330 | 387 | 543 |

| | # of sub-data packets in the core frame $S_C$ | | | | | | | | | | |
|---|---|---|---|---|---|---|---|---|---|---|---|
| No. | 13 | 14 | 15 | 16 | 17 | 18 | 19 | 20 | 21 | 22 | 23 |
| 1 | 330 | 387 | 352 | 330 | 387 | 467 | 330 | 387 | 620 | 330 | 387 |
| 2 | 330 | 387 | 361 | 330 | 387 | 472 | 330 | 387 | 522 | 330 | 387 |
| 3 | 330 | 387 | 485 | 330 | 387 | 397 | 330 | 387 | 444 | 330 | 387 |
| 4 | 330 | 387 | 595 | 330 | 387 | 604 | 330 | 387 | 352 | 330 | 387 |
| 5 | 330 | 387 | 352 | 330 | 387 | 373 | 330 | 387 | 490 | 330 | 387 |
| 6 | 330 | 387 | 478 | 330 | 387 | 464 | 330 | 387 | 513 | 330 | 387 |
| 7 | 330 | 387 | 359 | 330 | 387 | 359 | 330 | 387 | 364 | 330 | 387 |
| 8 | 330 | 387 | 354 | 330 | 387 | 391 | 330 | 387 | 368 | 330 | 387 | wherein each line in the table is a time hopping pattern, wherein each column in the table is a hop of the respective time hopping pattern starting from a second hop so that each time hopping pattern has 24 hops, wherein each cell in the table indicates a temporal interval of a reference point of the respective hop to a same reference point of an immediately subsequent hop in symbol durations or multiples of symbol durations; wherein the frequency hopping pattern is one of the following eight frequency hopping patterns having 24 hops each:

| | # of sub-data packets in the core frame $S_C$ | | | | | | | | | | | | | | | | | | | | | | | |
|---|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 5 | 21 | 13 | 6 | 22 | 14 | 1 | 17 | 9 | 0 | 16 | 8 | 7 | 23 | 15 | 4 | 20 | 12 | 3 | 19 | 11 | 2 | 18 | 10 |
| 2 | 4 | 20 | 12 | 1 | 17 | 9 | 0 | 16 | 8 | 6 | 22 | 14 | 7 | 23 | 15 | 2 | 18 | 10 | 5 | 21 | 13 | 3 | 19 | 11 |
| 3 | 4 | 20 | 12 | 3 | 19 | 11 | 6 | 22 | 14 | 7 | 23 | 15 | 0 | 16 | 8 | 5 | 21 | 13 | 2 | 18 | 10 | 1 | 17 | 9 |
| 4 | 6 | 22 | 14 | 2 | 18 | 10 | 7 | 23 | 15 | 0 | 16 | 8 | 1 | 17 | 9 | 4 | 20 | 12 | 5 | 21 | 13 | 3 | 19 | 11 |
| 5 | 7 | 23 | 15 | 4 | 20 | 12 | 3 | 19 | 11 | 2 | 18 | 10 | 6 | 22 | 14 | 0 | 16 | 8 | 1 | 17 | 9 | 5 | 21 | 13 |
| 6 | 3 | 19 | 11 | 6 | 22 | 14 | 2 | 18 | 10 | 0 | 16 | 8 | 7 | 23 | 15 | 1 | 17 | 9 | 4 | 20 | 12 | 5 | 21 | 13 |
| 7 | 3 | 19 | 11 | 1 | 17 | 9 | 5 | 21 | 13 | 7 | 23 | 15 | 0 | 16 | 8 | 2 | 18 | 10 | 6 | 22 | 14 | 4 | 20 | 12 |
| 8 | 0 | 16 | 8 | 6 | 22 | 14 | 3 | 19 | 11 | 2 | 18 | 10 | 4 | 20 | 12 | 7 | 23 | 15 | 5 | 21 | 13 | 1 | 17 | 9 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers (UCG_C0-UCG_C23).

Another embodiment may have receiving a signal having a hopping pattern; wherein the hopping pattern is a time hopping pattern, a frequency hopping pattern, or a combination of the time hopping pattern and the frequency hopping pattern; wherein the time hopping pattern is one of the following eight time hopping patterns having 24 hops each:

| | # of sub-data packets in the core frame $S_C$ | | | | | | | | | | | |
|---|---|---|---|---|---|---|---|---|---|---|---|---|
| No. | 1 | 2 | 3 | 4 | 5 | 6 | 7 | 8 | 9 | 10 | 11 | 12 |
| 1 | 373 | 319 | 489 | 373 | 319 | 500 | 373 | 319 | 482 | 373 | 319 | 637 |
| 2 | 373 | 319 | 505 | 373 | 319 | 545 | 373 | 319 | 403 | 373 | 319 | 412 |
| 3 | 373 | 319 | 349 | 373 | 319 | 349 | 373 | 319 | 443 | 373 | 319 | 649 |
| 4 | 373 | 319 | 507 | 373 | 319 | 426 | 373 | 319 | 658 | 373 | 319 | 601 |
| 5 | 373 | 319 | 430 | 373 | 319 | 375 | 373 | 319 | 427 | 373 | 319 | 476 |
| 6 | 373 | 319 | 485 | 373 | 319 | 357 | 373 | 319 | 611 | 373 | 319 | 438 |
| 7 | 373 | 319 | 620 | 373 | 319 | 490 | 373 | 319 | 402 | 373 | 319 | 517 |
| 8 | 373 | 319 | 353 | 373 | 319 | 341 | 373 | 319 | 634 | 373 | 319 | 556 |

| | # of sub-data packets in the core frame $S_C$ | | | | | | | | | | |
|---|---|---|---|---|---|---|---|---|---|---|---|
| No. | 13 | 14 | 15 | 16 | 17 | 18 | 19 | 20 | 21 | 22 | 23 |
| 1 | 373 | 319 | 342 | 373 | 319 | 346 | 373 | 319 | 405 | 373 | 319 |
| 2 | 373 | 319 | 420 | 373 | 319 | 446 | 373 | 319 | 393 | 373 | 319 |
| 3 | 373 | 319 | 629 | 373 | 319 | 344 | 373 | 319 | 354 | 373 | 319 |
| 4 | 373 | 319 | 364 | 373 | 319 | 345 | 373 | 319 | 342 | 373 | 319 |
| 5 | 373 | 319 | 632 | 373 | 319 | 557 | 373 | 319 | 349 | 373 | 319 |
| 6 | 373 | 319 | 372 | 373 | 319 | 460 | 373 | 319 | 417 | 373 | 319 |
| 7 | 373 | 319 | 353 | 373 | 319 | 366 | 373 | 319 | 345 | 373 | 319 |
| 8 | 373 | 319 | 646 | 373 | 319 | 341 | 373 | 319 | 364 | 373 | 319 | wherein each line in the table is a time hopping pattern, wherein each column in the table is a hop of the respective time hopping pattern starting from a second hop so that each time hopping pattern has 24 hops, wherein each cell in the table indicates a temporal interval of a reference point of the respective hop to a same reference point of an immediately subsequent hop in symbol durations or multiples of symbol durations; wherein the frequency hopping pattern is one of the following eight frequency hopping patterns having 24 hops each:

| Pattern Number | # of sub-data packets in the core frame $S_C$ | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 4 | 24 | 14 | 8 | 28 | 18 | 9 | 29 | 19 | 3 | 23 | 13 | 7 | 27 | 17 | 0 | 20 | 10 | 6 | 26 | 16 | 5 | 25 | 15 |
| 2 | 2 | 22 | 12 | 0 | 20 | 10 | 7 | 27 | 17 | 8 | 28 | 18 | 1 | 21 | 11 | 4 | 24 | 14 | 9 | 29 | 19 | 6 | 26 | 16 |
| 3 | 0 | 20 | 10 | 6 | 26 | 16 | 4 | 24 | 14 | 3 | 23 | 13 | 2 | 22 | 12 | 5 | 25 | 15 | 9 | 29 | 19 | 1 | 21 | 11 |
| 4 | 7 | 27 | 17 | 4 | 24 | 14 | 2 | 22 | 12 | 8 | 28 | 18 | 1 | 21 | 11 | 9 | 29 | 19 | 6 | 26 | 16 | 0 | 20 | 10 |
| 5 | 3 | 23 | 13 | 2 | 22 | 12 | 8 | 28 | 18 | 5 | 25 | 15 | 0 | 20 | 10 | 7 | 27 | 17 | 6 | 26 | 16 | 1 | 21 | 11 |
| 6 | 1 | 21 | 11 | 3 | 23 | 13 | 8 | 28 | 18 | 9 | 29 | 19 | 2 | 22 | 12 | 5 | 25 | 15 | 0 | 20 | 10 | 7 | 27 | 17 |
| 7 | 6 | 26 | 16 | 7 | 27 | 17 | 9 | 29 | 19 | 4 | 24 | 14 | 0 | 20 | 10 | 3 | 23 | 13 | 8 | 28 | 18 | 5 | 25 | 15 |
| 8 | 1 | 21 | 11 | 7 | 27 | 17 | 3 | 23 | 13 | 9 | 29 | 19 | 4 | 24 | 14 | 6 | 26 | 16 | 8 | 28 | 18 | 0 | 20 | 10 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers (UCG_C0-UCG_C29).

Another embodiment may have transmitting a signal with a hopping pattern; wherein the hopping pattern is a time hopping pattern, a frequency hopping pattern, or a combination of the time hopping pattern and the frequency hopping pattern; wherein the time hopping pattern is one of the following eight time hopping patterns having 18 hops each:

| Pattern Number | # of sub-data packets in the core frame $S_C$ | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | |
| 1 | 471 | 595 | 594 | 496 | 545 | 445 | 440 | 535 | 601 | 522 | 430 | 545 | 519 | 439 | 484 | 438 | 605 | |
| 2 | 512 | 424 | 649 | 447 | 550 | 611 | 624 | 418 | 501 | 464 | 606 | 509 | 636 | 443 | 465 | 434 | 431 | |
| 3 | 625 | 548 | 540 | 434 | 520 | 559 | 488 | 531 | 501 | 465 | 459 | 428 | 444 | 459 | 505 | 459 | 633 | |
| 4 | 457 | 489 | 612 | 450 | 457 | 440 | 567 | 538 | 516 | 514 | 540 | 474 | 592 | 445 | 577 | 444 | 493 | |
| 5 | 488 | 643 | 626 | 541 | 560 | 550 | 450 | 475 | 520 | 456 | 618 | 447 | 455 | 440 | 455 | 510 | 477 | |
| 6 | 548 | 444 | 459 | 529 | 453 | 525 | 440 | 553 | 583 | 527 | 520 | 461 | 575 | 457 | 464 | 533 | 421 | |
| 7 | 461 | 607 | 501 | 534 | 505 | 569 | 561 | 472 | 509 | 450 | 555 | 440 | 423 | 494 | 448 | 525 | 485 | |
| 8 | 577 | 611 | 464 | 552 | 451 | 508 | 478 | 438 | 443 | 507 | 420 | 553 | 520 | 576 | 580 | 564 | 404 | | wherein each line in the table is a time hopping pattern, wherein each column in the table is a hop of the respective time hopping pattern starting from a second hop so that each time hopping pattern has 18 hops, wherein each cell in the table indicates a temporal interval of a reference point of the respective hop to a same reference point of an immediately subsequent hop in symbol durations or multiples of symbol durations; wherein the frequency hopping pattern is one of the following eight frequency hopping patterns having 18 hops each:

| Pattern | # of sub-data packets in the core frame $S_C$ | | | | | | | | | | | | | | | | | |
|---|---|---|---|---|---|---|---|---|---|---|---|---|---|---|---|---|---|---|
| Number | 1 | 2 | 3 | 4 | 5 | 6 | 7 | 8 | 9 | 10 | 11 | 12 | 13 | 14 | 15 | 16 | 17 | 18 |
| 1 | 19 | 18 | 12 | 21 | 15 | 14 | 22 | 2 | 5 | 10 | 17 | 6 | 8 | 4 | 7 | 20 | 13 | 0 |
| 2 | 10 | 4 | 1 | 7 | 23 | 6 | 3 | 8 | 17 | 2 | 18 | 9 | 22 | 14 | 11 | 16 | 5 | 21 |
| 3 | 0 | 16 | 11 | 20 | 9 | 13 | 23 | 21 | 2 | 19 | 1 | 15 | 3 | 7 | 12 | 4 | 22 | 6 |
| 4 | 14 | 9 | 0 | 15 | 7 | 5 | 8 | 18 | 1 | 12 | 19 | 23 | 17 | 16 | 10 | 2 | 13 | 11 |
| 5 | 6 | 12 | 19 | 10 | 4 | 22 | 13 | 17 | 11 | 5 | 23 | 3 | 1 | 8 | 14 | 0 | 9 | 20 |
| 6 | 16 | 20 | 3 | 5 | 21 | 10 | 17 | 1 | 12 | 18 | 15 | 11 | 0 | 9 | 2 | 14 | 6 | 8 |
| 7 | 15 | 0 | 8 | 18 | 9 | 23 | 11 | 20 | 14 | 3 | 16 | 22 | 19 | 13 | 7 | 21 | 12 | 4 |
| 8 | 4 | 7 | 16 | 22 | 13 | 19 | 2 | 3 | 6 | 15 | 10 | 20 | 23 | 5 | 21 | 17 | 18 | 1 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers (UCG_C0-UCG_C23).

Another embodiment may have transmitting a signal according to a hopping pattern; wherein the hopping pattern is a time hopping pattern, a frequency hopping pattern, or a combination of the time hopping pattern and the frequency hopping pattern; wherein the time hopping pattern is one of the following eight time hopping patterns having 18 hops each:

| Pattern | # of sub-data packets in the core frame $S_C$ | | | | | | | | | | | | | | | | | |
|---|---|---|---|---|---|---|---|---|---|---|---|---|---|---|---|---|---|---|
| Number | 1 | 2 | 3 | 4 | 5 | 6 | 7 | 8 | 9 | 10 | 11 | 12 | 13 | 14 | 15 | 16 | 17 | |
| 1 | 442 | 455 | 586 | 520 | 436 | 485 | 506 | 446 | 590 | 459 | 637 | 466 | 597 | 445 | 471 | 419 | 547 | |
| 2 | 447 | 594 | 459 | 512 | 577 | 490 | 510 | 500 | 576 | 581 | 512 | 441 | 483 | 507 | 467 | 447 | 612 | |
| 3 | 525 | 446 | 428 | 450 | 434 | 445 | 457 | 563 | 470 | 537 | 529 | 527 | 537 | 513 | 428 | 525 | 620 | |
| 4 | 626 | 467 | 450 | 544 | 564 | 505 | 450 | 645 | 457 | 423 | 433 | 439 | 559 | 547 | 449 | 641 | 508 | |
| 5 | 590 | 592 | 423 | 544 | 444 | 553 | 475 | 431 | 452 | 551 | 454 | 459 | 450 | 512 | 499 | 532 | 447 | |
| 6 | 476 | 420 | 516 | 422 | 558 | 483 | 474 | 462 | 474 | 458 | 529 | 596 | 562 | 419 | 417 | 600 | 634 | |
| 7 | 500 | 462 | 601 | 484 | 556 | 591 | 423 | 429 | 540 | 523 | 530 | 606 | 589 | 459 | 415 | 419 | 606 | |
| 8 | 422 | 473 | 458 | 535 | 420 | 423 | 502 | 425 | 602 | 472 | 555 | 650 | 509 | 579 | 595 | 510 | 568 | | wherein each line in the table is a time hopping pattern, wherein each column in the table is a hop of the respective time hopping pattern starting from a second hop so that each time hopping pattern has 18 hops, wherein each cell in the table indicates a temporal interval of a reference point of the respective hop to a same reference point of an immediately subsequent hop in symbol durations or multiples of symbol durations; wherein the frequency hopping pattern is one of the following eight frequency hopping patterns having 18 hops each:

| Pattern | # of sub-data packets in the core frame $S_C$ | | | | | | | | | | | | | | | | | |
|---|---|---|---|---|---|---|---|---|---|---|---|---|---|---|---|---|---|---|
| Number | 1 | 2 | 3 | 4 | 5 | 6 | 7 | 8 | 9 | 10 | 11 | 12 | 13 | 14 | 15 | 16 | 17 | 18 |
| 1 | 2 | 14 | 16 | 18 | 0 | 26 | 21 | 9 | 6 | 28 | 5 | 24 | 22 | 29 | 17 | 27 | 13 | 12 |
| 2 | 23 | 7 | 19 | 15 | 8 | 3 | 1 | 11 | 10 | 20 | 25 | 4 | 6 | 9 | 14 | 17 | 5 | 0 |
| 3 | 10 | 23 | 11 | 2 | 25 | 22 | 4 | 24 | 27 | 8 | 16 | 15 | 1 | 18 | 28 | 7 | 21 | 26 |
| 4 | 12 | 13 | 29 | 20 | 3 | 19 | 26 | 15 | 1 | 21 | 27 | 6 | 17 | 14 | 4 | 2 | 25 | 7 |
| 5 | 19 | 22 | 12 | 13 | 11 | 28 | 23 | 18 | 16 | 0 | 10 | 24 | 3 | 5 | 29 | 20 | 8 | 9 |
| 6 | 16 | 12 | 18 | 25 | 19 | 23 | 20 | 4 | 5 | 6 | 9 | 27 | 21 | 10 | 15 | 28 | 24 | 13 |
| 7 | 14 | 29 | 26 | 11 | 22 | 2 | 0 | 1 | 7 | 3 | 8 | 9 | 23 | 4 | 27 | 16 | 15 | 17 |
| 8 | 0 | 24 | 28 | 3 | 29 | 5 | 14 | 8 | 18 | 22 | 20 | 17 | 10 | 6 | 26 | 11 | 21 | 12 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers (UCG_C0-UCG_C29).

Another embodiment may have receiving a signal having a hopping pattern; wherein the hopping pattern is a time hopping pattern, a frequency hopping pattern, or a combination of the time hopping pattern and the frequency hopping pattern; wherein the time hopping pattern is one of the following eight time hopping patterns having 18 hops each:

| Pattern Number | # of sub-data packets in the core frame $S_C$ | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| 1 | 471 | 595 | 594 | 496 | 545 | 445 | 440 | 535 | 601 | 522 | 430 | 545 | 519 | 439 | 484 | 438 | 605 |
| 2 | 512 | 424 | 649 | 447 | 550 | 611 | 624 | 418 | 501 | 464 | 606 | 509 | 636 | 443 | 465 | 434 | 431 |
| 3 | 625 | 548 | 540 | 434 | 520 | 559 | 488 | 531 | 501 | 465 | 459 | 428 | 444 | 459 | 505 | 459 | 633 |
| 4 | 457 | 489 | 612 | 450 | 457 | 440 | 567 | 538 | 516 | 514 | 540 | 474 | 592 | 445 | 577 | 444 | 493 |
| 5 | 488 | 643 | 626 | 541 | 560 | 550 | 450 | 475 | 520 | 456 | 618 | 447 | 455 | 440 | 455 | 510 | 477 |
| 6 | 548 | 444 | 459 | 529 | 453 | 525 | 440 | 553 | 583 | 527 | 520 | 461 | 575 | 457 | 464 | 533 | 421 |
| 7 | 461 | 607 | 501 | 534 | 505 | 569 | 561 | 472 | 509 | 450 | 555 | 440 | 423 | 494 | 448 | 525 | 485 |
| 8 | 577 | 611 | 464 | 552 | 451 | 508 | 478 | 438 | 443 | 507 | 420 | 553 | 520 | 576 | 580 | 564 | 404 | wherein each line in the table is a time hopping pattern, wherein each column in the table is a hop of the respective time hopping pattern starting from a second hop so that each time hopping pattern has 18 hops, wherein each cell in the table indicates a temporal interval of a reference point of the respective hop to a same reference point of an immediately subsequent hop in symbol durations or multiples of symbol durations; wherein the frequency hopping pattern is one of the following eight frequency hopping patterns having 18 hops each:

| Pattern Number | # of sub-data packets in the core frame $S_C$ | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| 1 | 19 | 18 | 12 | 21 | 15 | 14 | 22 | 2 | 5 | 10 | 17 | 6 | 8 | 4 | 7 | 20 | 13 | 0 |
| 2 | 10 | 4 | 1 | 7 | 23 | 6 | 3 | 8 | 17 | 2 | 18 | 9 | 22 | 14 | 11 | 16 | 5 | 21 |
| 3 | 0 | 16 | 11 | 20 | 9 | 13 | 23 | 21 | 2 | 19 | 1 | 15 | 3 | 7 | 12 | 4 | 22 | 6 |
| 4 | 14 | 9 | 0 | 15 | 7 | 5 | 8 | 18 | 1 | 12 | 19 | 23 | 17 | 16 | 10 | 2 | 13 | 11 |
| 5 | 6 | 12 | 19 | 10 | 4 | 22 | 13 | 17 | 11 | 5 | 23 | 3 | 1 | 8 | 14 | 0 | 9 | 20 |
| 6 | 16 | 20 | 3 | 5 | 21 | 10 | 17 | 1 | 12 | 18 | 15 | 11 | 0 | 9 | 2 | 14 | 6 | 8 |
| 7 | 15 | 0 | 8 | 18 | 9 | 23 | 11 | 20 | 14 | 3 | 16 | 22 | 19 | 13 | 7 | 21 | 12 | 4 |
| 8 | 4 | 7 | 16 | 22 | 13 | 19 | 2 | 3 | 6 | 15 | 10 | 20 | 23 | 5 | 21 | 17 | 18 | 1 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers (UCG_C0-UCG_C23).

Another embodiment may have receiving a signal having a hopping pattern; wherein the hopping pattern is a time hopping pattern, a frequency hopping pattern, or a combination of the time hopping pattern and the frequency hopping pattern; wherein the time hopping pattern is one of the following eight time hopping patterns having 18 hops each:

| Pattern Number | # of sub-data packets in the core frame $S_C$ | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| 1 | 442 | 455 | 586 | 520 | 436 | 485 | 506 | 446 | 590 | 459 | 637 | 466 | 597 | 445 | 471 | 419 | 547 |
| 2 | 447 | 594 | 459 | 512 | 577 | 490 | 510 | 500 | 576 | 581 | 512 | 441 | 483 | 507 | 467 | 447 | 612 |
| 3 | 525 | 446 | 428 | 450 | 434 | 445 | 457 | 563 | 470 | 537 | 529 | 527 | 537 | 513 | 428 | 525 | 620 |
| 4 | 626 | 467 | 450 | 544 | 564 | 505 | 450 | 645 | 457 | 423 | 433 | 439 | 559 | 547 | 449 | 641 | 508 |
| 5 | 590 | 592 | 423 | 544 | 444 | 553 | 475 | 431 | 452 | 551 | 454 | 459 | 450 | 512 | 499 | 532 | 447 |
| 6 | 476 | 420 | 516 | 422 | 558 | 483 | 474 | 462 | 474 | 458 | 529 | 596 | 562 | 419 | 417 | 600 | 634 |
| 7 | 500 | 462 | 601 | 484 | 556 | 591 | 423 | 429 | 540 | 523 | 530 | 606 | 589 | 459 | 415 | 419 | 606 |
| 8 | 422 | 473 | 458 | 535 | 420 | 423 | 502 | 425 | 602 | 472 | 555 | 650 | 509 | 579 | 595 | 510 | 568 | wherein each line in the table is a time hopping pattern, wherein each column in the table is a hop of the respective time hopping pattern starting from a second hop so that each time hopping pattern has 18 hops, wherein each cell in the table indicates a temporal interval of a reference point of the respective hop to a same reference point of an immediately subsequent hop in symbol durations or multiples of symbol durations; wherein the frequency hopping pattern is one of the following eight frequency hopping patterns having 18 hops each

| Pattern Number | # of sub-data packets in the core frame $S_C$ | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| 1 | 2 | 14 | 16 | 18 | 0 | 26 | 21 | 9 | 6 | 28 | 5 | 24 | 22 | 29 | 17 | 27 | 13 | 12 |
| 2 | 23 | 7 | 19 | 15 | 8 | 3 | 1 | 11 | 10 | 20 | 25 | 4 | 6 | 9 | 14 | 17 | 5 | 0 |
| 3 | 10 | 23 | 11 | 2 | 25 | 22 | 4 | 24 | 27 | 8 | 16 | 15 | 1 | 18 | 28 | 7 | 21 | 26 |
| 4 | 12 | 13 | 29 | 20 | 3 | 19 | 26 | 15 | 1 | 21 | 27 | 6 | 17 | 14 | 4 | 2 | 25 | 7 |
| 5 | 19 | 22 | 12 | 13 | 11 | 28 | 23 | 18 | 16 | 0 | 10 | 24 | 3 | 5 | 29 | 20 | 8 | 9 |
| 6 | 16 | 12 | 18 | 25 | 19 | 23 | 20 | 4 | 5 | 6 | 9 | 27 | 21 | 10 | 15 | 28 | 24 | 13 |
| 7 | 14 | 29 | 26 | 11 | 22 | 2 | 0 | 1 | 7 | 3 | 8 | 9 | 23 | 4 | 27 | 16 | 15 | 17 |
| 8 | 0 | 24 | 28 | 3 | 29 | 5 | 14 | 8 | 18 | 22 | 20 | 17 | 10 | 6 | 26 | 11 | 21 | 12 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers (UCG_C0-UCG_C29).

Embodiments provide a data transmitter configured to transmit a signal comprising an individual hopping pattern, wherein the individual hopping pattern depends on an operation parameter.

Further embodiments provide a data receiver configured to receive a signal from a data transmitter, wherein the signal comprises an individual hopping pattern, wherein the individual hopping pattern depends on an operation parameter of the data transmitter.

In embodiments, instead of a uniform (global) hopping pattern that is used equally by all data transmitters and data receivers of a communication system, the data transmitter and the data receiver use an individual hopping pattern for the communication. This individual hopping pattern may depend on an operation parameter (e.g. an operation parameter of the data transmitter, an operation parameter of the data receiver, or an operation parameter of the communication system of the data transmitter and/or the data receiver) and is therefore only used by the data transmitter and the data receiver themselves or by a small group of data transmitters and/or data receivers, which may significantly increase the interference immunity.

In embodiments, the data transmitter and/or the data receiver may be configured to calculate the individual hopping pattern in dependence on the operation parameter, e.g. using a mapping rule having the operation parameter as an input quantity.

Furthermore, the data transmitter and/or the data transceiver may be configured to choose (or select) a hopping pattern from a set of hopping patterns in dependence on the operation parameter in order to obtain the individual hopping pattern.

In embodiments, the operation parameter of the data transmitter may be an intrinsic parameter of the data transmitter itself.

For example, the intrinsic parameter of the data transmitter may be addressing information or identification information of the data transmitter.

For example, the intrinsic parameter of the data transmitter may be a quartz tolerance of the data transmitter. In this case, for example, the data transmitter may be configured to determine, in dependence on the quartz tolerance, a maximum range of frequency sub-channels of a frequency channel to be used and to calculate the hopping pattern or select the same from a set of hopping patterns such that it is within the maximum range of frequency sub-channels of the frequency channel to be used.

For example, the intrinsic parameter of the data transmitter may be a frequency offset that is applied to the signal transmitted by the data transmitter and therefore to the hopping pattern used by the data transmitter.

For example, the intrinsic parameter of the data transmitter may be available transmission energy. In this case, the data transmitter may be configured to puncture a hopping pattern in dependence on the available transmission energy in order to obtain the individual hopping pattern.

For example, the intrinsic parameter of the data transmitter may be a frequency offset which the data transmitter provides to a hopping pattern in order to obtain the individual hopping pattern. The frequency offset may be a random frequency offset. Furthermore, the data transmitter may be configured to determine the frequency offset in dependence on user data or error protection data to be transmitted. Furthermore, the data transmitter may be configured to provide the signal with information describing the frequency offset.

In embodiments, the operation parameter of the data transmitter may be a parameter assigned to the data transmitter.

For example, the parameter assigned to the data transmitter may be a radio cell of a communication system. Here, the individual hopping pattern may be assigned to the data transmitter, e.g., by a base station of the radio cell or by a central control unit.

For example, the parameter assigned to the data transmitter may be a geographical position of the data transmitter. For example, the data transmitter itself may determine the geographical position by means of a sensor (e.g. a GPS receiver).

For example, the parameter assigned to the data transmitter may be a frequency of use of the respective hopping pattern of a set of hopping patterns. Here, the data transmitter may be configured to select the individual hopping pattern from the set of hopping patterns in dependence on the respective frequency of use.

For example, the parameter assigned to the data transmitter may be a priority of the data transmitter or of a message to be transmitted by the data transmitter.

In embodiments, the operation parameter may be user data or a part of user data, or error protection data or a part of error protection data.

In embodiments, the individual hopping pattern may comprise a plurality of hops distributed in time and/or frequency. The distribution of the plurality of hops in time and/or frequency may depend on the operation parameter.

In embodiments, the data transmitter may be configured to transmit data distributed in time and/or frequency according to the individual hopping pattern. Accordingly, the data receiver may be configured to receive data that is transmitted distributed in time and/or frequency according to the individual hopping pattern.

In embodiments, the data transmitter may be configured to divide the data (e.g. a data packet) to be transmitted into a plurality of sub-data packets and to transmit the sub-data packets distributed in time and/or frequency according to the individual hopping pattern. The data receiver may be configured to receive the sub-data packets that are transmitted distributed in time and/or frequency according to the individual hopping pattern, and to recombine the same in order to obtain the data.

In embodiments, the data (e.g. the data packet) may be channel-coded such that not all sub-data packets are needed for the error-free decoding of the data, but only a part of the sub-data packets.

In embodiments, the individual hopping pattern may be a time hopping pattern, a frequency hopping pattern, or a combination of a time hopping pattern and a frequency hopping pattern.

A time hopping pattern may indicate a sequence of transmission times or transmission time intervals with which the sub-data packets are transmitted. For example, a first sub-data packet may be transmitted at a first transmission time (or in a first transmission time slot) and a second sub-data packet may be transmitted at a second transmission time (or in a second transmission time slot), wherein the first transmission time and the second transmission time are different. Here, the time hopping pattern may define (or specify or indicate) the first transmission time and the second transmission time. Alternatively, the time hopping pattern may indicate the first transmission time or a temporal interval between the first transmission time and the second transmission time. Obviously, the time hopping pattern may only indicate the temporal interval between the first time and the second transmission time. Between the sub-data packets, there may be transmission pauses in which no transmission takes place. The sub-data packets may also temporally overlap.

A frequency hopping pattern may indicate a sequence of transmission frequencies or transmission frequency hops with which the sub-data packets are transmitted. For example, a first sub-data packet may be transmitted with a first transmission frequency (or in a first frequency channel) and a second sub-data packet may be transmitted with a second transmission frequency (or in a second frequency channel), wherein the first transmission frequency and the second transmission frequency are different. The frequency hopping pattern may define (or specify or indicate) the first transmission frequency and the second transmission frequency. Alternatively, the frequency hopping pattern may indicate the first transmission frequency and a frequency interval (transmission frequency hop) between the first transmission frequency and the second transmission frequency. Obviously, the frequency hopping pattern may also only indicate the frequency interval (transmission frequency hop) between the first transmission frequency and the second transmission frequency.

A time/frequency hopping pattern may be the combination of a time hopping pattern and a frequency hopping pattern, i.e. a sequence of transmission times or transmission time intervals with which the sub-data packets are transmitted, wherein transmission frequencies (or transmission frequency hops) are assigned to the transmission times (or transmission time intervals).

In embodiments, the individual hopping pattern may be a first individual hopping pattern, wherein the signal may comprise a second individual hopping pattern, wherein the second individual hopping pattern may be depend on the first individual hopping pattern or on the operation parameter.

For example, the first individual hopping pattern may have a fixed length, wherein the second individual hopping pattern may have a variable length. Here, the data transmitter may be configured to transmit data of a fixed length using the first individual hopping pattern, and to transmit data of a variable length using the second individual hopping pattern.

The data transmitter may be configured to select the second individual hopping pattern from a set of hopping patterns in dependence on the first individual hopping pattern or on the operation parameter.

Furthermore, the data transmitter may be configured to adapt a hopping pattern in dependence on the first individual hopping pattern or on the operation parameter in order to obtain the second individual hopping pattern.

Further embodiments provide a method for transmitting a signal. The method includes a step of transmitting a signal, wherein the signal comprises an individual hopping pattern, wherein the individual hopping pattern depends on a transmitter-side operation parameter.

Further embodiments provide a method for receiving a signal. The method includes a step of receiving the signal, wherein the signal comprises an individual hopping pattern, wherein the individual hopping pattern depends on a transmitter-side operation parameter.

Further embodiments provide a data transmitter configured to transmit data according to a hopping pattern, wherein the data transmitter is configured to transmit the data only in selected hops of a plurality of hops of the hopping pattern, wherein the data transmitter is configured to select the hops randomly or in dependence on an operation parameter.

Further embodiments provide a data receiver configured to receive data according to a hopping pattern, wherein the data is transmitted by a data transmitter only in selected hops of a plurality of hops of the hopping pattern, wherein the hops are selected randomly or in dependence on an operation parameter.

Further embodiments provide a method for transmitting a signal. The method includes a step of selecting a subset of hops of a plurality of hops of the hopping pattern, wherein the subset of hops is selected from the plurality of hops randomly or in dependence on an operation parameter. Furthermore, the method includes a step of transmitting the data in the selected hops of the hopping pattern.

Further embodiments provide a method for receiving a signal. The method includes a step of receiving the data, wherein the data is transmitted only in selected hops of a plurality of hops of the hopping pattern, wherein the hops are selected randomly or in dependence on an operation parameter.

Further embodiments provide a method for generating hopping patterns according to an embodiment. The method includes a step of randomly generating a plurality of hopping patterns, wherein the hopping patterns comprise at least two hops distributed in frequency and time. The method further includes a step of selecting, from the plurality of hopping patterns, the hopping patterns whose autocorrelation functions comprise specified autocorrelation characteristics in order to obtain hopping patterns with specified autocorrelation characteristics.

In embodiments, the hopping patterns whose autocorrelation function side maximums do not exceed a specified maximum amplitude threshold value may fulfill the specified autocorrelation characteristics.

For example, the amplitude threshold value may be equal to a number of hops that form a sub-hopping pattern of the hopping pattern that repeats itself and is shifted in time and/or frequency.

In embodiments, the hopping patterns whose subtotal formed across a specified number of largest amplitude values of the respective autocorrelation function is smaller than a specified threshold value may fulfill the specified autocorrelation characteristics.

Here, the threshold value may be selected such that at least two hopping patterns (or a specified number of hopping patterns) fulfill the specified autocorrelation characteristics.

The threshold value may also be derived in dependence on boundary parameters, e.g. a number of sub-data packets (partial packets) or frequency hops.

The threshold value may also be selected to be fixed.

In embodiments, the method may further comprise a step of calculating cross-correlation functions between the hopping patterns having specified autocorrelation characteristics.

Furthermore, the method may comprise a step of selecting, from the hopping patterns having specified autocorrelation characteristics, the hopping patterns whose cross-correlation functions comprise specified cross-correlation characteristics in order to obtain hopping patterns having specified autocorrelation characteristics and specified cross-correlation characteristics.

In embodiments, the hopping patterns whose subtotals formed across a specified number of largest amplitude values of the respective cross-correlation function are the smallest may fulfill the specified cross-correlation characteristics.

In embodiments, the hopping patterns may be generated such that the hops of the respective hopping patterns are within a specified frequency band.

In embodiments, the method may further comprise a step of randomly generating a plurality of further hopping patterns, wherein the further hopping patterns comprise at least two hops distributed in frequency and time. The method may further comprise a step of selecting, from the plurality of further hopping patterns, the further hopping patterns whose autocorrelation functions comprise specified autocorrelation characteristics in order to obtain further hopping patterns having specified autocorrelation characteristics. Here, the plurality of further hopping patterns may be generated such that the hops of the respective further hopping patterns are within a specified further frequency band, wherein the specified frequency band and the specified further frequency band at least partially overlap.

Here, the hopping patterns whose autocorrelation function side maximums do not exceed a specified maximum amplitude threshold value may fulfill the specified autocorrelation characteristics. For example, the amplitude threshold value may be equal to a number of hops of a cluster of a plurality of clusters into which the hopping pattern is subdivided. For example, a cluster may be a number of hops comprising the same temporal interval and/or frequency interval to each other.

Furthermore, the hopping patterns whose subtotal formed across a specified number of largest amplitude values of the respective autocorrelation function is smaller than a specified threshold value may fulfill the specified autocorrelation characteristics. Here, the threshold value may be selected such that at least two hopping patterns (or a specified number of hopping patterns) fulfill the specified autocorrelation characteristics.

In embodiments, the cross-correlation functions may be calculated between the hopping patterns having specified autocorrelation characteristics and the further hopping patterns having specified autocorrelation characteristics, wherein the hopping patterns whose cross-correlation functions comprise specified cross-correlation characteristics are selected from the hopping patterns having specified autocorrelation characteristics and the further hopping patterns having specified autocorrelation characteristics.

Here, the hopping patterns whose subtotals formed across a specified number of largest amplitude values of the respective cross-correlation function are the smallest may fulfill the specified cross-correlation characteristics.

Further embodiments provide a method for generating a set of hopping patterns, wherein the method comprises a step of randomly generating a plurality of hopping patterns, wherein the hopping patterns comprise at least two hops distributed in frequency and time. The method further includes a step of mapping the plurality of the hopping patterns into a two-dimensional time and frequency occupancy matrix each and, optionally, considering possibly occurring influences of neighboring frequency positions (neighboring channel interference) with the calculation of the two-dimensional autocorrelation functions (2D-ACF) applied thereto. Furthermore, the method includes a step of selecting, from a (e.g., significantly larger) plurality of hopping patterns, a (e.g., finite but larger) number of hopping patterns whose 2D autocorrelation functions comprise specified autocorrelation characteristics in order to obtain hopping patterns having specified autocorrelation characteristics, wherein all amplitude values of the 2D-ACF are sorted, e.g., vectorially in ascending order, and wherein a subtotal is subsequently formed across largest amplitude values, which is then compared to a threshold value and, if smaller, is selected accordingly.

For example, the subtotal may be formed since, if all amplitude values are added, the sum is the same. In embodiments, only hopping patterns whose ACF/CCF comprise maximums that are as small as possible, however, comprise several small values (better blurring) should be selected. Thus, sorting may be carried out, wherein the largest ones are taken. The number may be variable.

In embodiments, the method may further comprise a step of repeating the method using different intrinsic parameters of the data transmitter such as a quartz tolerance in order to generate a new (e.g. finite) number of hopping patterns from a (e.g. even significantly larger) plurality of hopping patterns having a changed maximum range of frequency sub-channels.

In embodiments, the method may further comprise a step of calculating all 2D cross-correlation functions (2D-CCF) between the selected hopping patterns and the newly selected hopping patterns (from the repetition of the method), each having specified autocorrelation characteristics, with a subsequent evaluation of each individual 2D-CCF with respect to a repeated vectorial sorting of all amplitude values of the 2D-CCF in increasing order as well as subsequent subtotal formation across the plurality of the largest amplitude values and subsequent storage in a result matrix.

In embodiments, the step of selecting the hopping patterns (e.g. via a Monte Carlo method) from the hopping patterns with specified 2D autocorrelation characteristics and previously calculated 2D cross-correlation functions with the previously described cross-correlation characteristics may be carried out such that all 2D-CCF belonging to the selection of the set of hopping patterns are added to corresponding subtotals of the result matrix, and the set of hopping patterns whose sum is a minimum is selected.

For example, they may all be summed up and only then is the minimum being formed. Thus, beside many good CCF values, a less good one may also be included. With 16 hopping patterns, not all 64 CCFs will be equally good.

Further embodiments provide a method for transmitting a signal having a hopping pattern, wherein the hopping pattern is a time hopping pattern, a frequency hopping pattern, or a combination of the time hopping pattern and the frequency hopping pattern, wherein the time hopping pattern is one of the following eight time hopping patterns having 24 hops each:

| | # of sub-data packets in the core frame $S_C$ | | | | | | | | | | | |
|---|---|---|---|---|---|---|---|---|---|---|---|---|
| No. | 1 | 2 | 3 | 4 | 5 | 6 | 7 | 8 | 9 | 10 | 11 | 12 |
| 1 | 330 | 387 | 388 | 330 | 387 | 354 | 330 | 387 | 356 | 330 | 387 | 432 |
| 2 | 330 | 387 | 435 | 330 | 387 | 409 | 330 | 387 | 398 | 330 | 387 | 370 |
| 3 | 330 | 387 | 356 | 330 | 387 | 439 | 330 | 387 | 413 | 330 | 387 | 352 |
| 4 | 330 | 387 | 352 | 330 | 387 | 382 | 330 | 387 | 381 | 330 | 387 | 365 |
| 5 | 330 | 387 | 380 | 330 | 387 | 634 | 330 | 387 | 360 | 330 | 387 | 393 |
| 6 | 330 | 387 | 364 | 330 | 387 | 375 | 330 | 387 | 474 | 330 | 387 | 355 |
| 7 | 330 | 387 | 472 | 330 | 387 | 546 | 330 | 387 | 501 | 330 | 387 | 356 |
| 8 | 330 | 387 | 391 | 330 | 387 | 468 | 330 | 387 | 512 | 330 | 387 | 543 |

| | # of sub-data packets in the core frame $S_C$ | | | | | | | | | | |
|---|---|---|---|---|---|---|---|---|---|---|---|
| No. | 13 | 14 | 15 | 16 | 17 | 18 | 19 | 20 | 21 | 22 | 23 |
| 1 | 330 | 387 | 352 | 330 | 387 | 467 | 330 | 387 | 620 | 330 | 387 |
| 2 | 330 | 387 | 361 | 330 | 387 | 472 | 330 | 387 | 522 | 330 | 387 |
| 3 | 330 | 387 | 485 | 330 | 387 | 397 | 330 | 387 | 444 | 330 | 387 |
| 4 | 330 | 387 | 595 | 330 | 387 | 604 | 330 | 387 | 352 | 330 | 387 |
| 5 | 330 | 387 | 352 | 330 | 387 | 373 | 330 | 387 | 490 | 330 | 387 |
| 6 | 330 | 387 | 478 | 330 | 387 | 464 | 330 | 387 | 513 | 330 | 387 |
| 7 | 330 | 387 | 359 | 330 | 387 | 359 | 330 | 387 | 364 | 330 | 387 |
| 8 | 330 | 387 | 354 | 330 | 387 | 391 | 330 | 387 | 368 | 330 | 387 | wherein each line in the table is a time hopping pattern, wherein each column in the table is a hop of the respective time hopping pattern starting from a second hop so that each time hopping pattern comprises 24 hops, wherein each cell in the table indicates a temporal interval of a reference point (e.g. middle or start or end) of the respective hop to a same reference point (e.g. middle or start or end) of an immediately subsequent hop in (advantageously multiples of) transmission symbol durations, wherein the frequency hopping pattern is one of the following eight frequency hopping patterns having 24 hops each:

| Pattern | # of sub-data packets in the core frame $S_C$ | | | | | | | | | | | | | | | | | | | | | | | |
|---|---|---|---|---|---|---|---|---|---|---|---|---|---|---|---|---|---|---|---|---|---|---|---|---|
| Number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 5 | 21 | 13 | 6 | 22 | 14 | 1 | 17 | 9 | 0 | 16 | 8 | 7 | 23 | 15 | 4 | 20 | 12 | 3 | 19 | 11 | 2 | 18 | 10 |
| 2 | 4 | 20 | 12 | 1 | 17 | 9 | 0 | 16 | 8 | 6 | 22 | 14 | 7 | 23 | 15 | 2 | 18 | 10 | 5 | 21 | 13 | 3 | 19 | 11 |
| 3 | 4 | 20 | 12 | 3 | 19 | 11 | 6 | 22 | 14 | 7 | 23 | 15 | 0 | 16 | 8 | 5 | 21 | 13 | 2 | 18 | 10 | 1 | 17 | 9 |

| Pattern Number | # of sub-data packets in the core frame $S_C$ | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 4 | 6 | 22 | 14 | 2 | 18 | 10 | 7 | 23 | 15 | 0 | 16 | 8 | 1 | 17 | 9 | 4 | 20 | 12 | 5 | 21 | 13 | 3 | 19 | 11 |
| 5 | 7 | 23 | 15 | 4 | 20 | 12 | 3 | 19 | 11 | 2 | 18 | 10 | 6 | 22 | 14 | 0 | 16 | 8 | 1 | 17 | 9 | 5 | 21 | 13 |
| 6 | 3 | 19 | 11 | 6 | 22 | 14 | 2 | 18 | 10 | 0 | 16 | 8 | 7 | 23 | 15 | 1 | 17 | 9 | 4 | 20 | 12 | 5 | 21 | 13 |
| 7 | 3 | 19 | 11 | 1 | 17 | 9 | 5 | 21 | 13 | 7 | 23 | 15 | 0 | 16 | 8 | 2 | 18 | 10 | 6 | 22 | 14 | 4 | 20 | 12 |
| 8 | 0 | 16 | 8 | 6 | 22 | 14 | 3 | 19 | 11 | 2 | 18 | 10 | 4 | 20 | 12 | 7 | 23 | 15 | 5 | 21 | 13 | 1 | 17 | 9 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C23.

In embodiments, the signal may be transmitted by a node comprising a quartz tolerance of +/−20 ppm or better.

In embodiments, a data packet may be transmitted divided into a plurality of sub-data packets according to the hopping pattern so that a sub-data packet of the plurality of sub-data packets is transmitted in each hop of the hopping pattern.

In embodiments, the hopping pattern may be a combination of the time hopping pattern and the frequency hopping pattern, wherein the time hopping pattern and the frequency hopping pattern comprise the same line number in the respective table. For example, the hopping pattern may be a combination of the first time hopping pattern and the first frequency hopping pattern. Obviously, the hopping pattern may also be a combination of the second time hopping pattern and the second frequency hopping pattern, etc.

Further embodiments provide a method for transmitting a signal having a hopping pattern, wherein the hopping pattern is a time hopping pattern, a frequency hopping pattern, or a combination of the time hopping pattern and the frequency hopping pattern, wherein the time hopping pattern is one of the following eight time hopping patterns having 24 hops each:

| No. | # of sub-data packets in the core frame $S_C$ | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | 373 | 319 | 489 | 373 | 319 | 500 | 373 | 319 | 482 | 373 | 319 | 637 |
| 2 | 373 | 319 | 505 | 373 | 319 | 545 | 373 | 319 | 403 | 373 | 319 | 412 |
| 3 | 373 | 319 | 349 | 373 | 319 | 349 | 373 | 319 | 443 | 373 | 319 | 649 |
| 4 | 373 | 319 | 507 | 373 | 319 | 426 | 373 | 319 | 658 | 373 | 319 | 601 |
| 5 | 373 | 319 | 430 | 373 | 319 | 375 | 373 | 319 | 427 | 373 | 319 | 476 |
| 6 | 373 | 319 | 485 | 373 | 319 | 357 | 373 | 319 | 611 | 373 | 319 | 438 |
| 7 | 373 | 319 | 620 | 373 | 319 | 490 | 373 | 319 | 402 | 373 | 319 | 517 |
| 8 | 373 | 319 | 353 | 373 | 319 | 341 | 373 | 319 | 634 | 373 | 319 | 556 |

| No. | # of sub-data packets in the core frame $S_C$ | | | | | | | | | | |
|---|---|---|---|---|---|---|---|---|---|---|---|
| | 13 | 14 | 15 | 16 | 17 | 18 | 19 | 20 | 21 | 22 | 23 |
| 1 | 373 | 319 | 342 | 373 | 319 | 346 | 373 | 319 | 405 | 373 | 319 |
| 2 | 373 | 319 | 420 | 373 | 319 | 446 | 373 | 319 | 393 | 373 | 319 |
| 3 | 373 | 319 | 629 | 373 | 319 | 344 | 373 | 319 | 354 | 373 | 319 |
| 4 | 373 | 319 | 364 | 373 | 319 | 345 | 373 | 319 | 342 | 373 | 319 |
| 5 | 373 | 319 | 632 | 373 | 319 | 557 | 373 | 319 | 349 | 373 | 319 |
| 6 | 373 | 319 | 372 | 373 | 319 | 460 | 373 | 319 | 417 | 373 | 319 |
| 7 | 373 | 319 | 353 | 373 | 319 | 366 | 373 | 319 | 345 | 373 | 319 |
| 8 | 373 | 319 | 646 | 373 | 319 | 341 | 373 | 319 | 364 | 373 | 319 | wherein each line in the table is a time hopping pattern, wherein each column in the table is a hop of the respective time hopping pattern starting from a second hop so that each time hopping pattern comprises 24 hops, wherein each cell in the table indicates a temporal interval of a reference point (e.g. middle or start or end) of the respective hop to a same reference point (e.g. middle or start or end) of an immediately subsequent hop in (advantageously multiples of) transmission symbol durations, wherein the frequency hopping pattern is one of the following eight frequency hopping patterns having 24 hops each:

| Pattern Number | # of sub-data packets in the core frame $S_C$ | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 4 | 24 | 14 | 8 | 28 | 18 | 9 | 29 | 19 | 3 | 23 | 13 | 7 | 27 | 17 | 0 | 20 | 10 | 6 | 26 | 16 | 5 | 25 | 15 |
| 2 | 2 | 22 | 12 | 0 | 20 | 10 | 7 | 27 | 17 | 8 | 28 | 18 | 1 | 21 | 11 | 4 | 24 | 14 | 9 | 29 | 19 | 6 | 26 | 16 |

-continued

| Pattern Number | # of sub-data packets in the core frame $S_C$ | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 3 | 0 | 20 | 10 | 6 | 26 | 16 | 4 | 24 | 14 | 3 | 23 | 13 | 2 | 22 | 12 | 5 | 25 | 15 | 9 | 29 | 19 | 1 | 21 | 11 |
| 4 | 7 | 27 | 17 | 4 | 24 | 14 | 2 | 22 | 12 | 8 | 28 | 18 | 1 | 21 | 11 | 9 | 29 | 19 | 6 | 26 | 16 | 0 | 20 | 10 |
| 5 | 3 | 23 | 13 | 2 | 22 | 12 | 8 | 28 | 18 | 5 | 25 | 15 | 0 | 20 | 10 | 7 | 27 | 17 | 6 | 26 | 16 | 1 | 21 | 11 |
| 6 | 1 | 21 | 11 | 3 | 23 | 13 | 8 | 28 | 18 | 9 | 29 | 19 | 2 | 22 | 12 | 5 | 25 | 15 | 0 | 20 | 10 | 7 | 27 | 17 |
| 7 | 6 | 26 | 16 | 7 | 27 | 17 | 9 | 29 | 19 | 4 | 24 | 14 | 0 | 20 | 10 | 3 | 23 | 13 | 8 | 28 | 18 | 5 | 25 | 15 |
| 8 | 1 | 21 | 11 | 7 | 27 | 17 | 3 | 23 | 13 | 9 | 29 | 19 | 4 | 24 | 14 | 6 | 26 | 16 | 8 | 28 | 18 | 0 | 20 | 10 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C29.

In embodiments, the signal may be transmitted by a node comprising a quartz tolerance of +/−10 ppm or better.

In embodiments, a data packet may be transmitted divided into a plurality of sub-data packets according to the hopping pattern so that a sub-data packet of the plurality of sub-data packets is transmitted in each hop of the hopping pattern.

In embodiments, the hopping pattern may be a combination of the time hopping pattern and the frequency hopping pattern, wherein the time hopping pattern and the frequency hopping pattern comprise the same line number in the respective table. For example, the hopping pattern may be a combination of the first time hopping pattern and the first frequency hopping pattern. Obviously, the hopping pattern may also be a combination of the second time hopping pattern and the second frequency hopping pattern, etc.

Further embodiments provide a method for receiving a signal having a hopping pattern, wherein the hopping pattern is a time hopping pattern, a frequency hopping pattern, or a combination of the time hopping pattern and the frequency hopping pattern, wherein the time hopping pattern is one of the following eight time hopping patterns having 24 hops each:

| | # of sub-data packets in the core frame $S_C$ | | | | | | | | | | | |
|---|---|---|---|---|---|---|---|---|---|---|---|---|
| No. | 1 | 2 | 3 | 4 | 5 | 6 | 7 | 8 | 9 | 10 | 11 | 12 |
| 1 | 330 | 387 | 388 | 330 | 387 | 354 | 330 | 387 | 356 | 330 | 387 | 432 |
| 2 | 330 | 387 | 435 | 330 | 387 | 409 | 330 | 387 | 398 | 330 | 387 | 370 |
| 3 | 330 | 387 | 356 | 330 | 387 | 439 | 330 | 387 | 413 | 330 | 387 | 352 |
| 4 | 330 | 387 | 352 | 330 | 387 | 382 | 330 | 387 | 381 | 330 | 387 | 365 |
| 5 | 330 | 387 | 380 | 330 | 387 | 634 | 330 | 387 | 360 | 330 | 387 | 393 |
| 6 | 330 | 387 | 364 | 330 | 387 | 375 | 330 | 387 | 474 | 330 | 387 | 355 |
| 7 | 330 | 387 | 472 | 330 | 387 | 546 | 330 | 387 | 501 | 330 | 387 | 356 |
| 8 | 330 | 387 | 391 | 330 | 387 | 468 | 330 | 387 | 512 | 330 | 387 | 543 |

| | # of sub-data packets in the core frame $S_C$ | | | | | | | | | | |
|---|---|---|---|---|---|---|---|---|---|---|---|
| No. | 13 | 14 | 15 | 16 | 17 | 18 | 19 | 20 | 21 | 22 | 23 |
| 1 | 330 | 387 | 352 | 330 | 387 | 467 | 330 | 387 | 620 | 330 | 387 |
| 2 | 330 | 387 | 361 | 330 | 387 | 472 | 330 | 387 | 522 | 330 | 387 |
| 3 | 330 | 387 | 485 | 330 | 387 | 397 | 330 | 387 | 444 | 330 | 387 |
| 4 | 330 | 387 | 595 | 330 | 387 | 604 | 330 | 387 | 352 | 330 | 387 |
| 5 | 330 | 387 | 352 | 330 | 387 | 373 | 330 | 387 | 490 | 330 | 387 |
| 6 | 330 | 387 | 478 | 330 | 387 | 464 | 330 | 387 | 513 | 330 | 387 |
| 7 | 330 | 387 | 359 | 330 | 387 | 359 | 330 | 387 | 364 | 330 | 387 |
| 8 | 330 | 387 | 354 | 330 | 387 | 391 | 330 | 387 | 368 | 330 | 387 | wherein each line in the table is a time hopping pattern, wherein each column in the table is a hop of the respective time hopping pattern starting from a second hop so that each time hopping pattern comprises 24 hops, wherein each cell in the table indicates a temporal interval of a reference point (e.g. middle or start or end) of the respective hop to a same reference point (e.g. middle or start or end) of an immediately subsequent hop in (advantageously multiples of) reception symbol durations, wherein the frequency hopping pattern is one of the following eight frequency hopping patterns having 24 hops each:

| | # of sub-data packets in the core frame $S_C$ | | | | | | | | | | | | | | | | | | | | | | | |
|---|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 5 | 21 | 13 | 6 | 22 | 14 | 1 | 17 | 9 | 0 | 16 | 8 | 7 | 23 | 15 | 4 | 20 | 12 | 3 | 19 | 11 | 2 | 18 | 10 |
| 2 | 4 | 20 | 12 | 1 | 17 | 9 | 0 | 16 | 8 | 6 | 22 | 14 | 7 | 23 | 15 | 2 | 18 | 10 | 5 | 21 | 13 | 3 | 19 | 11 |
| 3 | 4 | 20 | 12 | 3 | 19 | 11 | 6 | 22 | 14 | 7 | 23 | 15 | 0 | 16 | 8 | 5 | 21 | 13 | 2 | 18 | 10 | 1 | 17 | 9 |
| 4 | 6 | 22 | 14 | 2 | 18 | 10 | 7 | 23 | 15 | 0 | 16 | 8 | 1 | 17 | 9 | 4 | 20 | 12 | 5 | 21 | 13 | 3 | 19 | 11 |
| 5 | 7 | 23 | 15 | 4 | 20 | 12 | 3 | 19 | 11 | 2 | 18 | 10 | 6 | 22 | 14 | 0 | 16 | 8 | 1 | 17 | 9 | 5 | 21 | 13 |
| 6 | 3 | 19 | 11 | 6 | 22 | 14 | 2 | 18 | 10 | 0 | 16 | 8 | 7 | 23 | 15 | 1 | 17 | 9 | 4 | 20 | 12 | 5 | 21 | 13 |
| 7 | 3 | 19 | 11 | 1 | 17 | 9 | 5 | 21 | 13 | 7 | 23 | 15 | 0 | 16 | 8 | 2 | 18 | 10 | 6 | 22 | 14 | 4 | 20 | 12 |
| 8 | 0 | 16 | 8 | 6 | 22 | 14 | 3 | 19 | 11 | 2 | 18 | 10 | 4 | 20 | 12 | 7 | 23 | 15 | 5 | 21 | 13 | 1 | 17 | 9 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C23.

Further embodiments provide a method for receiving a signal having a hopping pattern, wherein the hopping pattern is a time hopping pattern, a frequency hopping pattern, or a combination of the time hopping pattern and the frequency hopping pattern, wherein the time hopping pattern is one of the following eight time hopping patterns having 24 hops each:

| | # of sub-data packets in the core frame $S_C$ | | | | | | | | | | | |
|---|---|---|---|---|---|---|---|---|---|---|---|---|
| No. | 1 | 2 | 3 | 4 | 5 | 6 | 7 | 8 | 9 | 10 | 11 | 12 |
| 1 | 373 | 319 | 489 | 373 | 319 | 500 | 373 | 319 | 482 | 373 | 319 | 637 |
| 2 | 373 | 319 | 505 | 373 | 319 | 545 | 373 | 319 | 403 | 373 | 319 | 412 |
| 3 | 373 | 319 | 349 | 373 | 319 | 349 | 373 | 319 | 443 | 373 | 319 | 649 |
| 4 | 373 | 319 | 507 | 373 | 319 | 426 | 373 | 319 | 658 | 373 | 319 | 601 |
| 5 | 373 | 319 | 430 | 373 | 319 | 375 | 373 | 319 | 427 | 373 | 319 | 476 |
| 6 | 373 | 319 | 485 | 373 | 319 | 357 | 373 | 319 | 611 | 373 | 319 | 438 |
| 7 | 373 | 319 | 620 | 373 | 319 | 490 | 373 | 319 | 402 | 373 | 319 | 517 |
| 8 | 373 | 319 | 353 | 373 | 319 | 341 | 373 | 319 | 634 | 373 | 319 | 556 |

| | # of sub-data packets in the core frame $S_C$ | | | | | | | | | | |
|---|---|---|---|---|---|---|---|---|---|---|---|
| No. | 13 | 14 | 15 | 16 | 17 | 18 | 19 | 20 | 21 | 22 | 23 |
| 1 | 373 | 319 | 342 | 373 | 319 | 346 | 373 | 319 | 405 | 373 | 319 |
| 2 | 373 | 319 | 420 | 373 | 319 | 446 | 373 | 319 | 393 | 373 | 319 |
| 3 | 373 | 319 | 629 | 373 | 319 | 344 | 373 | 319 | 354 | 373 | 319 |
| 4 | 373 | 319 | 364 | 373 | 319 | 345 | 373 | 319 | 342 | 373 | 319 |
| 5 | 373 | 319 | 632 | 373 | 319 | 557 | 373 | 319 | 349 | 373 | 319 |
| 6 | 373 | 319 | 372 | 373 | 319 | 460 | 373 | 319 | 417 | 373 | 319 |
| 7 | 373 | 319 | 353 | 373 | 319 | 366 | 373 | 319 | 345 | 373 | 319 |
| 8 | 373 | 319 | 646 | 373 | 319 | 341 | 373 | 319 | 364 | 373 | 319 | wherein each line in the table is a time hopping pattern, wherein each column in the table is a hop of the respective time hopping pattern starting from a second hop so that each time hopping pattern comprises 24 hops, wherein each cell in the table indicates a temporal interval of a reference point (e.g. middle or start or end) of the respective hop to a same reference point (e.g. middle or start or end) of an immediately subsequent hop in (advantageously multiples of) reception symbol durations, wherein the frequency hopping pattern is one of the following eight frequency hopping patterns having 24 hops each:

| Pattern | # of sub-data packets in the core frame $S_C$ | | | | | | | | | | | | | | | | | | | | | | | |
|---|---|---|---|---|---|---|---|---|---|---|---|---|---|---|---|---|---|---|---|---|---|---|---|---|
| Number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 4 | 24 | 14 | 8 | 28 | 18 | 9 | 29 | 19 | 3 | 23 | 13 | 7 | 27 | 17 | 0 | 20 | 10 | 6 | 26 | 16 | 5 | 25 | 15 |
| 2 | 2 | 22 | 12 | 0 | 20 | 10 | 7 | 27 | 17 | 8 | 28 | 18 | 1 | 21 | 11 | 4 | 24 | 14 | 9 | 29 | 19 | 6 | 26 | 16 |
| 3 | 0 | 20 | 10 | 6 | 26 | 16 | 4 | 24 | 14 | 3 | 23 | 13 | 2 | 22 | 12 | 5 | 25 | 15 | 9 | 29 | 19 | 1 | 21 | 11 |
| 4 | 7 | 27 | 17 | 4 | 24 | 14 | 2 | 22 | 12 | 8 | 28 | 18 | 1 | 21 | 11 | 9 | 29 | 19 | 6 | 26 | 16 | 0 | 20 | 10 |
| 5 | 3 | 23 | 13 | 2 | 22 | 12 | 8 | 28 | 18 | 5 | 25 | 15 | 0 | 20 | 10 | 7 | 27 | 17 | 6 | 26 | 16 | 1 | 21 | 11 |

| Pattern Number | \# of sub-data packets in the core frame $S_C$ |  |  |  |  |  |  |  |  |  |  |  |  |  |  |  |  |  |  |  |  |  |  |  |
|---|---|---|---|---|---|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 6 | 1 | 21 | 11 | 3 | 23 | 13 | 8 | 28 | 18 | 9 | 29 | 19 | 2 | 22 | 12 | 5 | 25 | 15 | 0 | 20 | 10 | 7 | 27 | 17 |
| 7 | 6 | 26 | 16 | 7 | 27 | 17 | 9 | 29 | 19 | 4 | 24 | 14 | 0 | 20 | 10 | 3 | 23 | 13 | 8 | 28 | 18 | 5 | 25 | 15 |
| 8 | 1 | 21 | 11 | 7 | 27 | 17 | 3 | 23 | 13 | 9 | 29 | 19 | 4 | 24 | 14 | 6 | 26 | 16 | 8 | 28 | 18 | 0 | 20 | 10 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C29.

Further embodiments provide a method for transmitting a signal having a hopping pattern, wherein the hopping pattern is a time hopping pattern, a frequency hopping pattern, or a combination of the time hopping pattern and the frequency hopping pattern, wherein the time hopping pattern is one of the following eight time hopping patterns having 18 hops each:

| Pattern Number | \# of sub-data packets in the core frame $S_C$ |  |  |  |  |  |  |  |  |  |  |  |  |  |  |  |  |
|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 |
| 1 | 471 | 595 | 594 | 496 | 545 | 445 | 440 | 535 | 601 | 522 | 430 | 545 | 519 | 439 | 484 | 438 | 605 |
| 2 | 512 | 424 | 649 | 447 | 550 | 611 | 624 | 418 | 501 | 464 | 606 | 509 | 636 | 443 | 465 | 434 | 431 |
| 3 | 625 | 548 | 540 | 434 | 520 | 559 | 488 | 531 | 501 | 465 | 459 | 428 | 444 | 459 | 505 | 459 | 633 |
| 4 | 457 | 489 | 612 | 450 | 457 | 440 | 567 | 538 | 516 | 514 | 540 | 474 | 592 | 445 | 577 | 444 | 493 |
| 5 | 488 | 643 | 626 | 541 | 560 | 550 | 450 | 475 | 520 | 456 | 618 | 447 | 455 | 440 | 455 | 510 | 477 |
| 6 | 548 | 444 | 459 | 529 | 453 | 525 | 440 | 553 | 583 | 527 | 520 | 461 | 575 | 457 | 464 | 533 | 421 |
| 7 | 461 | 607 | 501 | 534 | 505 | 569 | 561 | 472 | 509 | 450 | 555 | 440 | 423 | 494 | 448 | 525 | 485 |
| 8 | 577 | 611 | 464 | 552 | 451 | 508 | 478 | 438 | 443 | 507 | 420 | 553 | 520 | 576 | 580 | 564 | 404 | wherein each line in the table is a time hopping pattern, wherein each column in the table is a hop of the respective time hopping pattern starting from a second hop so that each time hopping pattern comprises 18 hops, wherein each cell in the table indicates a temporal interval of a reference point (e.g. middle or start or end) of the respective hop to a same reference point (e.g. middle or start or end) of an immediately subsequent hop in (advantageously multiples of) transmission symbol durations, wherein the frequency hopping pattern is one of the following eight frequency hopping patterns having 18 hops each:

| Pattern Number | \# of sub-data packets in the core frame $S_C$ |  |  |  |  |  |  |  |  |  |  |  |  |  |  |  |  |  |
|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 | 18 |
| 1 | 19 | 18 | 12 | 21 | 15 | 14 | 22 | 2 | 5 | 10 | 17 | 6 | 8 | 4 | 7 | 20 | 13 | 0 |
| 2 | 10 | 4 | 1 | 7 | 23 | 6 | 3 | 8 | 17 | 2 | 18 | 9 | 22 | 14 | 11 | 16 | 5 | 21 |
| 3 | 0 | 16 | 11 | 20 | 9 | 13 | 23 | 21 | 2 | 19 | 1 | 15 | 3 | 7 | 12 | 4 | 22 | 6 |
| 4 | 14 | 9 | 0 | 15 | 7 | 5 | 8 | 18 | 1 | 12 | 19 | 23 | 17 | 16 | 10 | 2 | 13 | 11 |
| 5 | 6 | 12 | 19 | 10 | 4 | 22 | 13 | 17 | 11 | 5 | 23 | 3 | 1 | 8 | 14 | 0 | 9 | 20 |
| 6 | 16 | 20 | 3 | 5 | 21 | 10 | 17 | 1 | 12 | 18 | 15 | 11 | 0 | 9 | 2 | 14 | 6 | 8 |
| 7 | 15 | 0 | 8 | 18 | 9 | 23 | 11 | 20 | 14 | 3 | 16 | 22 | 19 | 13 | 7 | 21 | 12 | 4 |
| 8 | 4 | 7 | 16 | 22 | 13 | 19 | 2 | 3 | 6 | 15 | 10 | 20 | 23 | 5 | 21 | 17 | 18 | 1 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C23.

In embodiments, the signal may be transmitted by a node comprising a quartz tolerance of +/−20 ppm or better.

In embodiments, a data packet may be transmitted divided into a plurality of sub-data packets according to the hopping pattern so that a sub-data packet of the plurality of sub-data packets is transmitted in each hop of the hopping pattern.

In embodiments, the hopping pattern may be a combination of the time hopping pattern and the frequency hopping pattern, wherein the time hopping pattern and the frequency hopping pattern comprise the same line number in the respective table. For example, the hopping pattern may be a combination of the first time hopping pattern and the first frequency hopping pattern. Obviously, the hopping pattern may also be a combination of the second time hopping pattern and the second frequency hopping pattern, etc.

Further embodiments provide a method for transmitting a signal having a hopping pattern, wherein the hopping pattern is a time hopping pattern, a frequency hopping pattern, or a combination of the time hopping pattern and the frequency hopping pattern, wherein the time hopping pattern is one of the following eight time hopping patterns having 18 hops each:

| Pattern | # of sub-data packets in the core frame $S_C$ | | | | | | | | | | | | | | | | |
|---|---|---|---|---|---|---|---|---|---|---|---|---|---|---|---|---|---|
| Number | 1 | 2 | 3 | 4 | 5 | 6 | 7 | 8 | 9 | 10 | 11 | 12 | 13 | 14 | 15 | 16 | 17 |
| 1 | 442 | 455 | 586 | 520 | 436 | 485 | 506 | 446 | 590 | 459 | 637 | 466 | 597 | 445 | 471 | 419 | 547 |
| 2 | 447 | 594 | 459 | 512 | 577 | 490 | 510 | 500 | 576 | 581 | 512 | 441 | 483 | 507 | 467 | 447 | 612 |
| 3 | 525 | 446 | 428 | 450 | 434 | 445 | 457 | 563 | 470 | 537 | 529 | 527 | 537 | 513 | 428 | 525 | 620 |
| 4 | 626 | 467 | 450 | 544 | 564 | 505 | 450 | 645 | 457 | 423 | 433 | 439 | 559 | 547 | 449 | 641 | 508 |
| 5 | 590 | 592 | 423 | 544 | 444 | 553 | 475 | 431 | 452 | 551 | 454 | 459 | 450 | 512 | 499 | 532 | 447 |
| 6 | 476 | 420 | 516 | 422 | 558 | 483 | 474 | 462 | 474 | 458 | 529 | 596 | 562 | 419 | 417 | 600 | 634 |
| 7 | 500 | 462 | 601 | 484 | 556 | 591 | 423 | 429 | 540 | 523 | 530 | 606 | 589 | 459 | 415 | 419 | 606 |
| 8 | 422 | 473 | 458 | 535 | 420 | 423 | 502 | 425 | 602 | 472 | 555 | 650 | 509 | 579 | 595 | 510 | 568 | wherein each line in the table is a time hopping pattern, wherein each column in the table is a hop of the respective time hopping pattern starting from a second hop so that each time hopping pattern comprises 18 hops, wherein each cell in the table indicates a temporal interval of a reference point (e.g. middle or start or end) of the respective hop to a same reference point (e.g. middle or start or end) of an immediately subsequent hop in (advantageously multiples of) transmission symbol durations, wherein the frequency hopping pattern is one of the following eight frequency hopping patterns having 18 hops each:

| Pattern | # of sub-data packets in the core frame $S_C$ | | | | | | | | | | | | | | | | | |
|---|---|---|---|---|---|---|---|---|---|---|---|---|---|---|---|---|---|---|
| Number | 1 | 2 | 3 | 4 | 5 | 6 | 7 | 8 | 9 | 10 | 11 | 12 | 13 | 14 | 15 | 16 | 17 | 18 |
| 1 | 2 | 14 | 16 | 18 | 0 | 26 | 21 | 9 | 6 | 28 | 5 | 24 | 22 | 29 | 17 | 27 | 13 | 12 |
| 2 | 23 | 7 | 19 | 15 | 8 | 3 | 1 | 11 | 10 | 20 | 25 | 4 | 6 | 9 | 14 | 17 | 5 | 0 |
| 3 | 10 | 23 | 11 | 2 | 25 | 22 | 4 | 24 | 27 | 8 | 16 | 15 | 1 | 18 | 28 | 7 | 21 | 26 |
| 4 | 12 | 13 | 29 | 20 | 3 | 19 | 26 | 15 | 1 | 21 | 27 | 6 | 17 | 14 | 4 | 2 | 25 | 7 |
| 5 | 19 | 22 | 12 | 13 | 11 | 28 | 23 | 18 | 16 | 0 | 10 | 24 | 3 | 5 | 29 | 20 | 8 | 9 |
| 6 | 16 | 12 | 18 | 25 | 19 | 23 | 20 | 4 | 5 | 6 | 9 | 27 | 21 | 10 | 15 | 28 | 24 | 13 |
| 7 | 14 | 29 | 26 | 11 | 22 | 2 | 0 | 1 | 7 | 3 | 8 | 9 | 23 | 4 | 27 | 16 | 15 | 17 |
| 8 | 0 | 24 | 28 | 3 | 29 | 5 | 14 | 8 | 18 | 22 | 20 | 17 | 10 | 6 | 26 | 11 | 21 | 12 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C29.

In embodiments, the signal may be transmitted by a node comprising a quartz tolerance of +/−10 ppm or better.

In embodiments, a data packet may be transmitted divided into a plurality of sub-data packets according to the hopping pattern so that a sub-data packet of the plurality of sub-data packets is transmitted in each hop of the hopping pattern.

In embodiments, the hopping pattern may be a combination of the time hopping pattern and the frequency hopping pattern, wherein the time hopping pattern and the frequency hopping pattern comprise the same line number in the respective table. For example, the hopping pattern may be a combination of the first time hopping pattern and the first frequency hopping pattern. Obviously, the hopping pattern may also be a combination of the second time hopping pattern and the second frequency hopping pattern, etc.

Further embodiments provide a method for receiving a signal having a hopping pattern, wherein the hopping pattern is a time hopping pattern, a frequency hopping pattern, or a combination of the time hopping pattern and the frequency hopping pattern, wherein the time hopping pattern is one of the following eight time hopping patterns having 18 hops each:

| Pattern | # of sub-data packets in the core frame $S_C$ | | | | | | | | | | | | | | | | |
|---|---|---|---|---|---|---|---|---|---|---|---|---|---|---|---|---|---|
| Number | 1 | 2 | 3 | 4 | 5 | 6 | 7 | 8 | 9 | 10 | 11 | 12 | 13 | 14 | 15 | 16 | 17 |
| 1 | 471 | 595 | 594 | 496 | 545 | 445 | 440 | 535 | 601 | 522 | 430 | 545 | 519 | 439 | 484 | 438 | 605 |
| 2 | 512 | 424 | 649 | 447 | 550 | 611 | 624 | 418 | 501 | 464 | 606 | 509 | 636 | 443 | 465 | 434 | 431 |
| 3 | 625 | 548 | 540 | 434 | 520 | 559 | 488 | 531 | 501 | 465 | 459 | 428 | 444 | 459 | 505 | 459 | 633 |
| 4 | 457 | 489 | 612 | 450 | 457 | 440 | 567 | 538 | 516 | 514 | 540 | 474 | 592 | 445 | 577 | 444 | 493 |
| 5 | 488 | 643 | 626 | 541 | 560 | 550 | 450 | 475 | 520 | 456 | 618 | 447 | 455 | 440 | 455 | 510 | 477 |
| 6 | 548 | 444 | 459 | 529 | 453 | 525 | 440 | 553 | 583 | 527 | 520 | 461 | 575 | 457 | 464 | 533 | 421 |
| 7 | 461 | 607 | 501 | 534 | 505 | 569 | 561 | 472 | 509 | 450 | 555 | 440 | 423 | 494 | 448 | 525 | 485 |
| 8 | 577 | 611 | 464 | 552 | 451 | 508 | 478 | 438 | 443 | 507 | 420 | 553 | 520 | 576 | 580 | 564 | 404 | wherein each line in the table is a time hopping pattern, wherein each column in the table is a hop of the respective time hopping pattern starting from a second hop so that each time hopping pattern comprises 18 hops, wherein each cell in the table indicates a temporal interval of a reference point (e.g. middle or start or end) of the respective hop to a same reference point (e.g. middle or start or end) of an immediately subsequent hop in (advantageously multiples of) reception symbol durations, wherein the frequency hopping pattern is one of the following eight frequency hopping patterns having 18 hops each:

| Pattern Number | # of sub-data packets in the core frame $S_C$ | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| 1 | 19 | 18 | 12 | 21 | 15 | 14 | 22 | 2 | 5 | 10 | 17 | 6 | 8 | 4 | 7 | 20 | 13 | 0 |
| 2 | 10 | 4 | 1 | 7 | 23 | 6 | 3 | 8 | 17 | 2 | 18 | 9 | 22 | 14 | 11 | 16 | 5 | 21 |
| 3 | 0 | 16 | 11 | 20 | 9 | 13 | 23 | 21 | 2 | 19 | 1 | 15 | 3 | 7 | 12 | 4 | 22 | 6 |
| 4 | 14 | 9 | 0 | 15 | 7 | 5 | 8 | 18 | 1 | 12 | 19 | 23 | 17 | 16 | 10 | 2 | 13 | 11 |
| 5 | 6 | 12 | 19 | 10 | 4 | 22 | 13 | 17 | 11 | 5 | 23 | 3 | 1 | 8 | 14 | 0 | 9 | 20 |
| 6 | 16 | 20 | 3 | 5 | 21 | 10 | 17 | 1 | 12 | 18 | 15 | 11 | 0 | 9 | 2 | 14 | 6 | 8 |
| 7 | 15 | 0 | 8 | 18 | 9 | 23 | 11 | 20 | 14 | 3 | 16 | 22 | 19 | 13 | 7 | 21 | 12 | 4 |
| 8 | 4 | 7 | 16 | 22 | 13 | 19 | 2 | 3 | 6 | 15 | 10 | 20 | 23 | 5 | 21 | 17 | 18 | 1 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C23.

Further embodiments provide a method for receiving a signal having a hopping pattern, wherein the hopping pattern is a time hopping pattern, a frequency hopping pattern, or a combination of the time hopping pattern and the frequency hopping pattern, wherein the time hopping pattern is one of the following eight time hopping patterns having 18 hops each:

| Pattern Number | # of sub-data packets in the core frame $S_C$ | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | |
| 1 | 442 | 455 | 586 | 520 | 436 | 485 | 506 | 446 | 590 | 459 | 637 | 466 | 597 | 445 | 471 | 419 | 547 | |
| 2 | 447 | 594 | 459 | 512 | 577 | 490 | 510 | 500 | 576 | 581 | 512 | 441 | 483 | 507 | 467 | 447 | 612 | |
| 3 | 525 | 446 | 428 | 450 | 434 | 445 | 457 | 563 | 470 | 537 | 529 | 527 | 537 | 513 | 428 | 525 | 620 | |
| 4 | 626 | 467 | 450 | 544 | 564 | 505 | 450 | 645 | 457 | 423 | 433 | 439 | 559 | 547 | 449 | 641 | 508 | |
| 5 | 590 | 592 | 423 | 544 | 444 | 553 | 475 | 431 | 452 | 551 | 454 | 459 | 450 | 512 | 499 | 532 | 447 | |
| 6 | 476 | 420 | 516 | 422 | 558 | 483 | 474 | 462 | 474 | 458 | 529 | 596 | 562 | 419 | 417 | 600 | 634 | |
| 7 | 500 | 462 | 601 | 484 | 556 | 591 | 423 | 429 | 540 | 523 | 530 | 606 | 589 | 459 | 415 | 419 | 606 | |
| 8 | 422 | 473 | 458 | 535 | 420 | 423 | 502 | 425 | 602 | 472 | 555 | 650 | 509 | 579 | 595 | 510 | 568 | | wherein each line in the table is a time hopping pattern, wherein each column in the table is a hop of the respective time hopping pattern starting from a second hop so that each time hopping pattern comprises 18 hops, wherein each cell in the table indicates a temporal interval of a reference point (e.g. middle or start or end) of the respective hop to a same reference point (e.g. middle or start or end) of an immediately subsequent hop in (advantageously multiples of) reception symbol durations, wherein the frequency hopping pattern is one of the following eight frequency hopping patterns having 18 hops each

| Pattern Number | # of sub-data packets in the core frame $S_C$ | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| 1 | 2 | 14 | 16 | 18 | 0 | 26 | 21 | 9 | 6 | 28 | 5 | 24 | 22 | 29 | 17 | 27 | 13 | 12 |
| 2 | 23 | 7 | 19 | 15 | 8 | 3 | 1 | 11 | 10 | 20 | 25 | 4 | 6 | 9 | 14 | 17 | 5 | 0 |
| 3 | 10 | 23 | 11 | 2 | 25 | 22 | 4 | 24 | 27 | 8 | 16 | 15 | 1 | 18 | 28 | 7 | 21 | 26 |
| 4 | 12 | 13 | 29 | 20 | 3 | 19 | 26 | 15 | 1 | 21 | 27 | 6 | 17 | 14 | 4 | 2 | 25 | 7 |
| 5 | 19 | 22 | 12 | 13 | 11 | 28 | 23 | 18 | 16 | 0 | 10 | 24 | 3 | 5 | 29 | 20 | 8 | 9 |
| 6 | 16 | 12 | 18 | 25 | 19 | 23 | 20 | 4 | 5 | 6 | 9 | 27 | 21 | 10 | 15 | 28 | 24 | 13 |
| 7 | 14 | 29 | 26 | 11 | 22 | 2 | 0 | 1 | 7 | 3 | 8 | 9 | 23 | 4 | 27 | 16 | 15 | 17 |
| 8 | 0 | 24 | 28 | 3 | 29 | 5 | 14 | 8 | 18 | 22 | 20 | 17 | 10 | 6 | 26 | 11 | 21 | 12 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C29.

BRIEF DESCRIPTION OF THE DRAWINGS

Embodiments of the present invention will be detailed subsequently referring to the appended drawings, in which:

FIG. 5 shows in a diagram a frequency band of a communication system defined by band edges, and unused frequency ranges of the frequency band resulting from a data transmitter with a small tolerance range using the narrow hopping pattern shown in

FIG. 4;

In the following description of the embodiments of the present invention, the same elements or elements with the same effect are provided in the figures with the same reference numerals so that their description is interchangeable.

1. INDIVIDUAL HOPPING PATTERN

Figure 1:
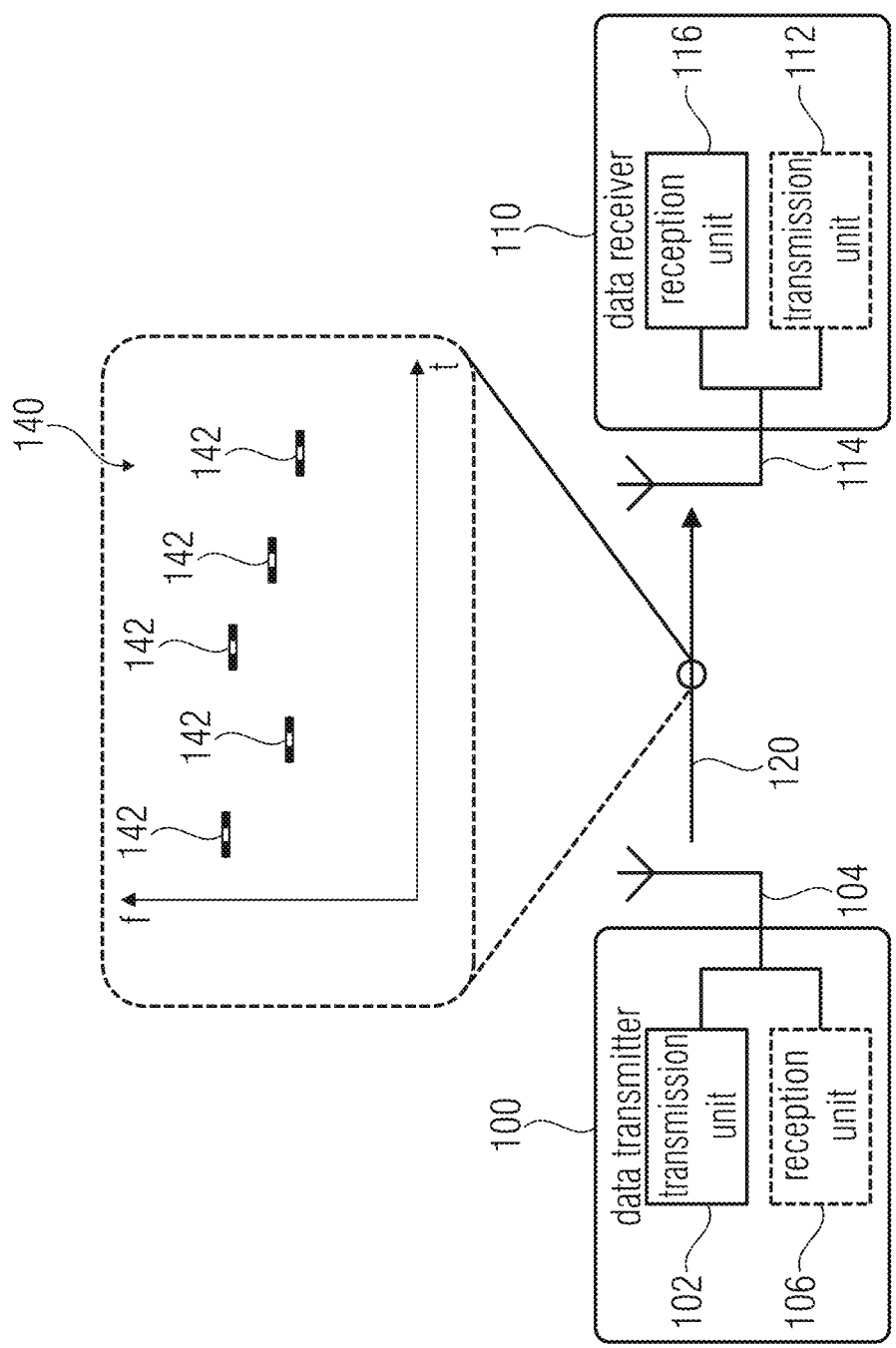
FIG. 1 shows a schematic block circuit diagram of a system having a data transmitter and a data receiver according to an embodiment of the present invention.

FIG. 1 shows a schematic block circuit diagram of a system having a data transmitter 100 and a data receiver 110 according to an embodiment of the present invention.

The data transmitter 100 is configured to transmit a signal 120, wherein the signal comprises an individual hopping pattern, wherein the individual hopping pattern depends on an operation parameter.

The data receiver 110 is configured to receive the signal 120 from the data transmitter 100, wherein the signal 120 comprises the individual hopping pattern, wherein the individual hopping pattern depends on the operation parameter.

In embodiments, instead of a uniform (global) hopping pattern that is used equally by all data transmitters and data receivers of a communication system, the data transmitter 100 and the data receiver 110 use an individual hopping pattern 140 for the communication. This individual hopping pattern depends on an operation parameter (e.g. an operation parameter of the data transmitter 100, the data receiver 110, or the communication system) and is therefore only used by the data transmitter 100 and the data receiver 110 themselves or by a small group of data transmitters and/or data receivers, which may significantly increase the interference immunity.

For example, the data transmitter 100 and/or the data receiver 110 may be configured to calculate the individual hopping pattern 140 in dependence on the operation parameter, e.g., using a mapping rule having the operation parameter as the input quantity. Furthermore, the data transmitter 100 and/or the data receiver 110 may be configured to choose (or select) a hopping pattern from a set of hopping patterns in dependence on the operation parameter in order to obtain the individual hopping pattern 140.

As is indicated in FIG. 1, the individual hopping pattern 140 may comprise a plurality of hops 142 distributed in time and/or frequency. The distribution of the plurality of hops 142 in time and/or frequency may depend on the operation parameter.

In embodiments, the data transmitter 100 may be configured to transmit data 120 distributed in time and/or frequency according to the individual hopping pattern 140. Accordingly, the data receiver 110 may be configured to receive data 120 that is distributed in time and/or frequency according to the individual hopping pattern 140.

As is exemplarily shown in FIG. 1, the data transmitter 100 may comprise a transmission unit (or transmission module, or transmitter) 102 configured to transmit the data 120. The transmission unit 102 may be connected to an antenna 104 of the data transmitter 100. The data transmitter 100 may further comprise a reception unit (or reception module, or receiver) 106 configured to receive data. The reception unit 106 may be connected to the antenna 104 or to a further (separate) antenna of the data transmitter 100. The data transmitter 100 may also comprise a combined transmission/reception unit (transceiver).

The data receiver 110 may comprise a reception unit (or reception module, or receiver) 116 configured to receive data 120. The reception unit 116 may be connected to an antenna 114 of the data receiver 110. Furthermore, the data receiver 110 may comprise a transmission unit (or transmission module or transmitter) 112 configured to transmit data. The transmission unit 112 may be connected to the antenna 114 or to a further (separate) antenna of the data receiver 110. The data receiver 110 may also comprise a combined transmission/reception unit (transceiver).

In embodiments, the data transmitter 100 may be a sensor node, while the data receiver 110 may be a base station. Typically, a communication system includes at least one data receiver 110 (base station) and a multitude of data transmitters (sensor nodes such as heating meters). Obviously, it is also possible that the data transmitter 100 is a base station, while the data receiver 110 is a sensor node. Furthermore, it is possible that both the data transmitter 100 and the data receiver 110 are sensor nodes. In addition, it is possible that both the data transmitter 100 and the data receiver 110 are base stations.

The data transmitter 100 and the data receiver 110 may be optionally configured to transmit and receive, respectively, data 120 using the telegram splitting method. Here, a telegram, or data packet, 120 is divided into a plurality of sub-data packets (or partial data packets, or partial packets) 142 and the sub-data packets 142 are transmitted from the data transmitter 100 to the data receiver 110 distributed in time and/or frequency according to the individual hopping pattern 140, wherein the data receiver 110 rejoins (or combines) the sub-data packets in order to obtain the data packet 120. Here, each of the sub-data packets 142 only contains a part of the data packet 120. Furthermore, the data packet 120 may be channel-coded so that not all sub-data packets 142 are needed for the error-free decoding of the data packet 120, but only a part of the sub-data packets 142.

As was previously mentioned, the temporal distribution of the plurality of sub-data packets 142 may be carried out according to a time hopping pattern and/or a frequency hopping pattern.

A time hopping pattern may indicate a sequence of transmission times or transmission time intervals with which the sub-data packets are transmitted. For example, a first sub-data packet may be transmitted at a first transmission time (or in a first transmission time slot) and a second sub-data packet may be transmitted at a second transmission time (or in a second transmission time slot), wherein the first transmission time and the second transmission time are different. Here, the time hopping pattern may define (or specify or indicate) the first transmission time and the second transmission time. Alternatively, the time hopping pattern may indicate the first transmission time or a temporal interval between the first transmission time and the second transmission time. Obviously, the time hopping pattern may only indicate the temporal interval between the first time and the second transmission time. Between the sub-data packets, there may be transmission pauses in which no transmission takes place. The sub-data packets may also temporally overlap.

A frequency hopping pattern may indicate a sequence of transmission frequencies or transmission frequency hops with which the sub-data packets are transmitted. For example, a first sub-data packet may be transmitted with a first transmission frequency (or in a first frequency channel) and a second sub-data packet may be transmitted with a second transmission frequency (or in a second frequency channel), wherein the first transmission frequency and the second transmission frequency are different. The frequency hopping pattern may define (or specify or indicate) the first transmission frequency and the second transmission frequency. Alternatively, the frequency hopping pattern may indicate the first transmission frequency and a frequency interval (transmission frequency hop) between the first transmission frequency and the second transmission frequency. Obviously, the frequency hopping pattern may also only indicate the frequency interval (transmission frequency hop) between the first transmission frequency and the second transmission frequency.

Obviously, the plurality of sub-data packets 142 may also be transmitted from the data transmitter 100 to the data receiver 110 distributed both in time and frequency. The distribution of the plurality of sub-data packets in time and frequency may be carried out according to a time/frequency hopping pattern.

A time/frequency hopping pattern may be a combination of a time hopping pattern and a frequency hopping pattern, i.e. a sequence of transmission times or transmission time intervals with which the sub-data packets are transmitted, wherein transmission frequencies (or transmission frequency hops) are assigned to the transmission times (or transmission time intervals).

Figure 2:
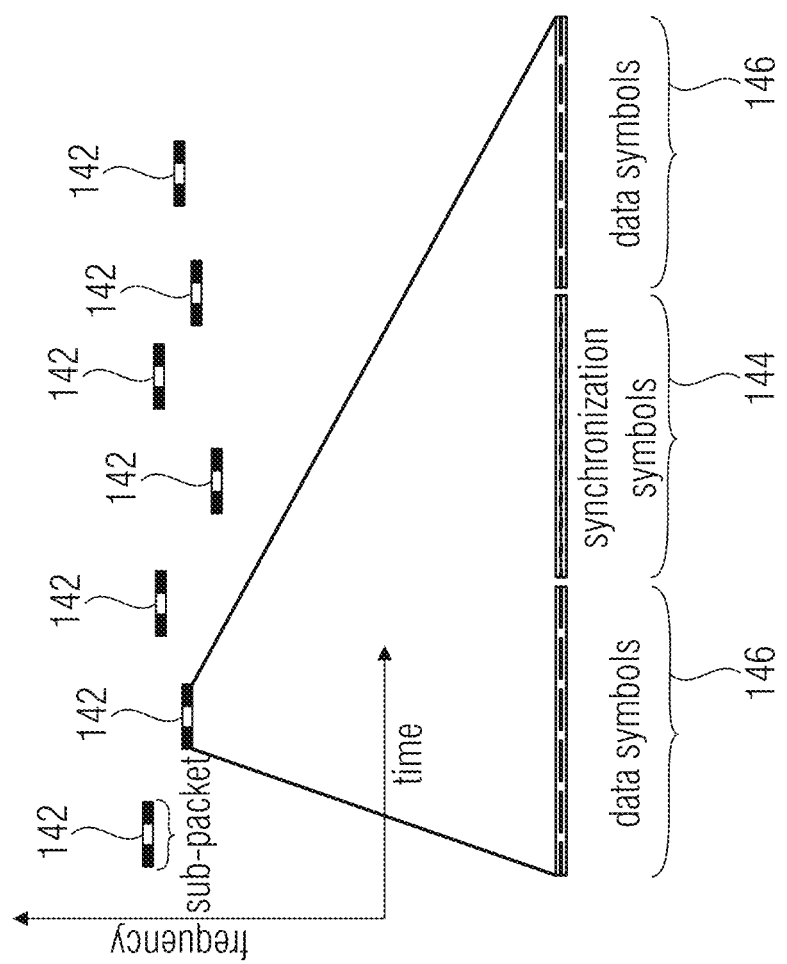
FIG. 2 shows in a diagram an occupancy of the transmission channel in the transmission of a plurality of sub-data packets according to a time/frequency hopping pattern.

FIG. 2 shows in a diagram an occupancy of the transmission channel during the transmission of a plurality of sub-data packets 142 according to a time/frequency hopping pattern. Here, the ordinate describes the frequency and the abscissa describes the time.

As can be seen in FIG. 2, the data packet 120 may exemplarily be divided among n=7 sub-data packets 142 and may be transmitted from the data transmitter 100 to the data receiver 110 distributed in time and frequency according to a time/frequency hopping pattern.

As can further be seen in FIG. 2, a synchronization sequence 144 may also be divided among the plurality of sub-data packets 142 so that, beside data (data symbols in FIG. 2) 146, the plurality of sub-data packets 142 each contain a part of the synchronization sequence (synchronization symbols in FIG. 2) 144.

In the following, detailed embodiments of the data transmitter 100 and data receiver 110 are described in more detail, which use an individual hopping pattern for the transmission, wherein the individual hopping pattern depends on an operation parameter. Here, the use of the telegram splitting method is purely optional.

Furthermore, the following assumes that the operation parameter is a parameter of the data transmitter 100 or of the communication system. Here, the operation parameter may be an intrinsic operation parameter of the data transmitter or an operation parameter assigned to the data transmitter.

1.1 Varying Hopping Patterns

As was previously mentioned, instead of a fixed hopping pattern, an individual hopping pattern 140 may be used for the transmission between the data transmitter 100 and the data receiver 110 in embodiments.

With this, the following problem may be solved. In the communication of several participants by means of telegram splitting in the same band, an interference immunity of the transfer is deteriorated if the same time/frequency hopping pattern is used by several nodes for the data transmission. If two nodes start a transmission with the same hopping pattern within a short time window, all sub-packets of the telegram overlap and, in the worst case, cancel each other out.

For the assignment, there are different possibilities to vary the hopping patterns according to the network topology.

In embodiments, the individual hopping pattern 140 may depend on an (intrinsic) operation parameter of the data transmitter 100, wherein the (intrinsic) operation parameter of the data transmitter may be addressing information or identification information of the data transmitter 100.

For example, an addressing hopping pattern may be used. In the transmission to a known participant, a hopping pattern calculated from a value that identifies or addresses the target participant, e.g. a serial number or a network address, may be used instead of a predefined hopping pattern.

This has the advantage that the hopping patterns 140 are individual for each data transmitter 100 (or user) and that the probability of a collision of identical hopping patterns may be drastically reduced.

However, the number of the hopping patterns that may be continuously searched for by a data receiver (e.g. a base station) 110 is limited due to the calculation performance. If an individual hopping sequence is defined for each data transmitter (e.g. node) 100, the number of the nodes that may be simultaneously received is correspondingly lower.

In embodiments, on the data transmitter-side (or on the waveform-side), an individual hopping pattern 100 that may be derived from addressing information or identification information, such as a datum, a serial number or a network address, identifying the receiver or transmitter may be used for each transmission between two participants.

In embodiments, on the data receiver-side, when using a time/frequency hopping pattern identifying the transmitter, a time/frequency hopping pattern list may be stored which contains the hopping patterns or the identified datum of the data transmitters to be received.

1.2 Local Hopping Patterns

In embodiments, the individual hopping pattern may depend on an (assigned) operation parameter of the data transmitter 100, wherein the (assigned) operation parameter of the data transmitter 100 may be a radio cell.

With this, the following problem may be solved. If a radio-based network consisting of several central nodes (e.g. many nodes that communicate with one base station) is created, radio cells form around each central node. If the transmissions in a radio cell are not decoupled by classic multiplexing methods (e.g. frequency multiplexing) and corresponding network planning, the communications of a cell also interfere with the communications of all overlapping or adjacent radio cells. This problem also arises in the telegram splitting-based network since all participants (e.g. the data transmitters) use the global time/frequency hopping patterns for the communication with the central node (e.g. the data receiver).

In embodiments, each central participant (e.g. the data receiver 110) may comprise its own set of local time/frequency hopping patterns, which makes it possible to operate the radio cells of the networks in an overlapping manner. They may supplement the global hopping patterns or completely replace the same.

The assignment may be performed during sign-in. In a star-shape network in which many nodes communicate with one base station, the initial communication may be handled via the global hopping patterns. If a node is now assigned to a base station or signs in at the same, it notifies the terminal node as to which set of local hopping patterns is used.

The notification as to which set is used may be explicitly performed by the transmission of the time/frequency hopping patterns of the set. It is also possible to define one or several sets of local hopping patterns in the nodes and to negotiate the set to be used during the initial contact.

In embodiments, the individual hopping pattern 140 may depend on an (assigned) operation parameter of the data transmitter 100, wherein the (assigned) operation parameter of the data transmitter 100 may be a geographical position.

For example, regional hopping patterns may be used. If the nodes know their position (e.g. by means of GNSS), the nodes may use this information to determine which set of local hopping patterns they may use. Again, this may be done by means of previously stored sets, or by calculation from the position. The selection of the hopping pattern set may also be determined by other external influences, such as radio signals of external systems. The position may also be signaled by the base station.

1.3 QoS Hopping Patterns (QoS=Quality of Service)

In embodiments, the individual hopping pattern 140 may be selected from a set of hopping patterns, wherein a defined frequency of use (=operation parameter) may be assigned to each hopping pattern of the set of hopping patterns. This means that the use of the hopping patterns is not carried out uniformly, but selectively non-uniformly.

With this, the following problem may be solved. In order to reach the maximum theoretical capacity of the network, all hopping patterns have to be used with the same frequency of use. However, when exceeding the capacity limit, this results in the fact that the probability of a packet loss becomes equally bad for all hopping patterns and that no more packets may be transmitted.

1.3.1 Varying Frequency of Use

In embodiments, a varying frequency of use may be employed. With this, a graceful network-degradation may be reduced or even avoided.

For example, frequency of use of the hopping patterns may be fixedly stored in the hopping pattern set. This results in the fact that a network capacity is reached faster for the frequently used hopping patterns. If the frequency of use of the remaining hopping patterns is accordingly selected to be lower, the probability of successfully transmitting a message with a little used hopping pattern increases since the probability of a full overlap decreases.

With this, the network will be able to transfer successively less messages in the capacity limit, however, when exceeding the limit, it does not break down completely, but the latency of the network increases according to the selected frequency of use. This enables a controlled and predicable network performance loss at the capacity limit.

In embodiments, the frequency of use of the hopping pattern for transmission may be determined on the data transmitter-side (and/or on the data receiver-side) according to a predefined rule for the frequency of use.

In embodiments, the calculation performance provided for decoding a hopping pattern may be assigned on the data receiver-side according to the frequency of use of the hopping pattern.

The following example is intended as an illustration. The hopping patterns M1 and M2 are defined in the time/frequency hopping pattern set Si. Each set is now assigned a relative frequency of use: M1 75% and M2 25%. This means that the hopping pattern M1 is used three times as often for transmission as M2. Thus, the probability that a transfer with the hopping pattern M1 is disturbed by the simultaneous transmission of another node with the hopping pattern M1 is three times as high as the transmission with the hopping pattern M2 since it is used less frequently in the network.

1.3.2 Application-Specific and/or Proprietary Hopping Patterns

In embodiments, the individual hopping pattern may be selected from a set of hopping patterns in dependence on an (assigned) operation parameter, wherein the (assigned) operation parameter is being applied. Thus, the hopping patterns may be selected according to the application. Some hopping patterns may only be used for certain message types (e.g. alarms). This makes it possible to implement QoS for certain services or to allow proprietary extensions of the global hopping patterns for a certain network provider.

With this, the following problem may be solved. By means of the known global hopping patterns, important or special messages (e.g. alarms) may only be transmitted with the same probability of getting through as a normal message. Depending on the message, however, it may be desired that the transmission receives a higher or lower priority, and therefore a higher or lower probability of getting through, than others. For example, a fire alarm or a motor vehicle's message indicating an accident has a higher priority than others.

In embodiments, on the data transmitter-side (or waveform-side), the hopping pattern used for transmission may be selected in dependence on the data to be transmitted.

In embodiments, on the data receiver-side, the calculation performance provided for decoding a hopping pattern may be adapted according to the priority of the hopping pattern.

1.4 Performance-Dependent Hopping Patterns

In embodiments, the individual hopping pattern may depend on an (intrinsic) operation parameter of the data transmitter 100, wherein the (intrinsic) operation parameter of the data transmitter 100 may be a quartz tolerance.

With this, the following problem may be solved. A radio transmission system is bound to a predefined frequency channel from a regulatory and implementation point of view. Due to tolerances in the quartzes used, it is not possible to exactly determine the frequency on which a message is actually emitted. For this reason, guard bands are defined, wherein an emission is specifically not carried out, however, which are also used by the tolerances.

Figure 3:
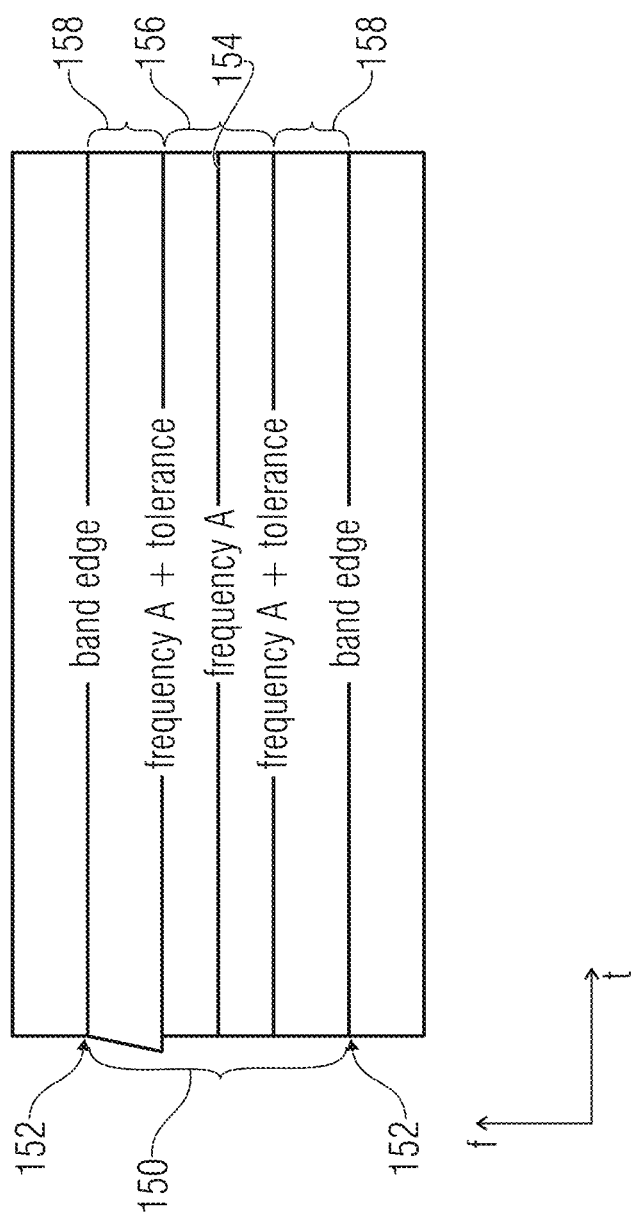
FIG. 3 shows in a diagram a frequency band of a communication system defined by band edges, as well as a frequency A to be used by a data transmitter for the transmission, and a tolerance range around the frequency A in which the transmission of the data transmitter actually takes place due to its quartz tolerance.

FIG. 3 shows in a diagram a frequency band 150 of a communication system, which is defined by band edges 152, as well as a frequency A 154 to be used by a data transmitter 100 for the transmission, and a tolerance range 156 around the frequency A 154 in which the transmission of the data transmitter 100 may actually take place due to its quartz tolerance. Here, the ordinate describes the frequency and the abscissa describes the time.

In other words, FIG. 3 shows a transmission defined on frequency A 154. The actual transmission takes place on a frequency in the range of frequency A±tolerance (blue region) 156, since a determination with an accuracy of 100% is not possible. In order to remain within the specified band with this offset, a certain margin 158 has to be defined, which is not intended for transmissions, but is large enough so that the band edges 152 are not exceeded at large tolerances.

In order to be able to use the frequency resources as fully as possible, it is desirable to keep the guard bands as narrow as possible, however, this increases the requirements on the quartzes used and therefore increases the costs of the nodes.

The aforementioned points also occur in telegram splitting radio transmission systems and are due to the fact that, the greater the permitted tolerance for the nodes of the radio system, the fewer frequency sub-channels may be used in the time and frequency hopping patterns.

This results in smaller tolerance ranges at the edge of the hopping pattern with high accuracy for nodes, which makes it possible to define a broad hopping pattern for these nodes without exceeding the band edges. If the tolerances are larger, the tolerance range has to be increased, for which the hopping pattern has to be made narrower in order to continue to transmit within the band edges. This is again illustrated in FIG. 4.

Figure 4:
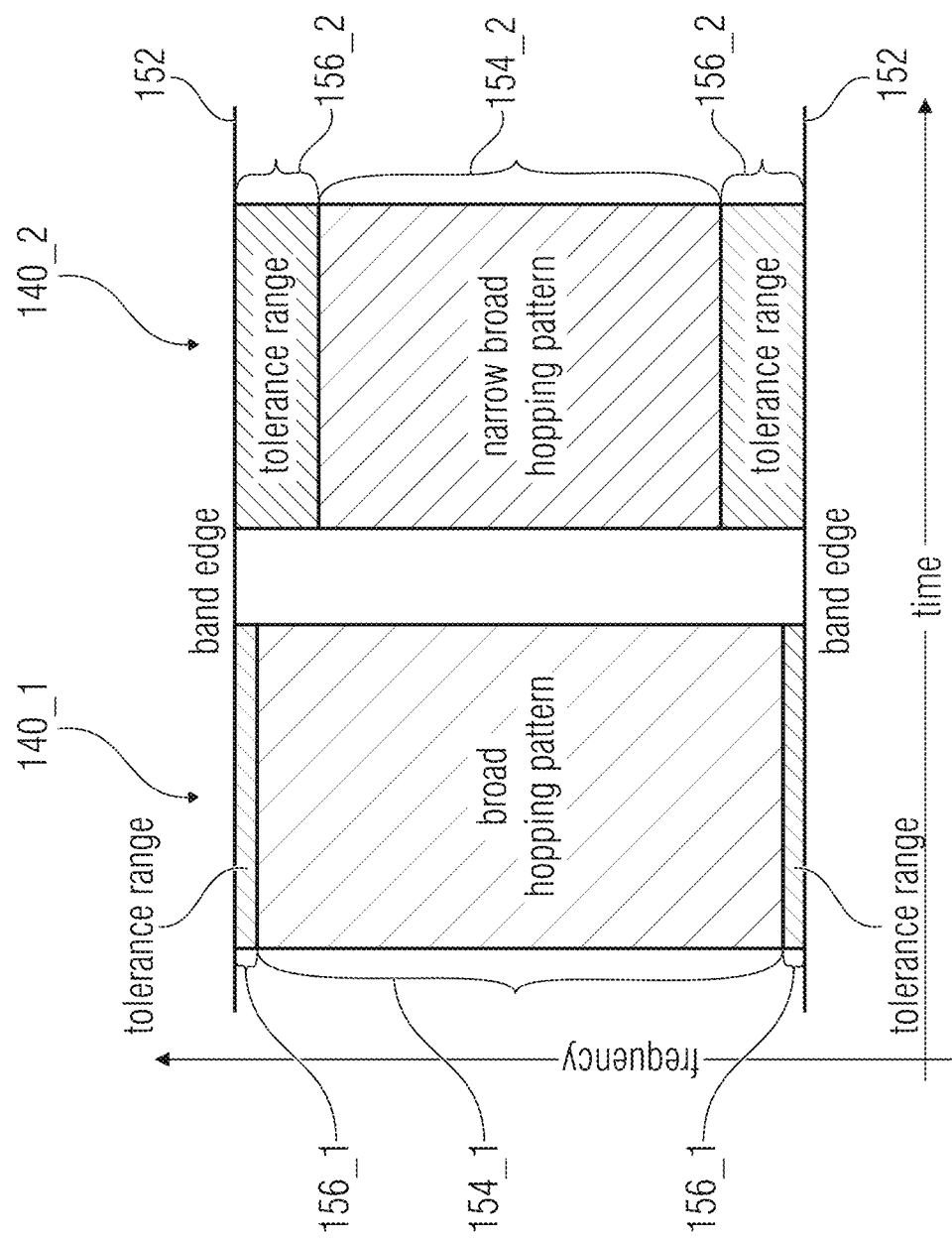
FIG. 4 shows in a diagram a frequency band of a communication system defined by band edges, as well as a frequency range used by a broad hopping pattern as well as its tolerance range, and a frequency range used by a narrow hopping pattern as well as its tolerance range.

FIG. 4 shows in a diagram, a frequency band of a communication system defined by band edges 152, and a frequency range 154_1 used by a broad hopping pattern 140_1, and its tolerance range 156_1, and a frequency range 154_2 used by a narrow hopping pattern 140_2, and its tolerance range 156_2. In other words, FIG. 4 shows a comparison of a broad hopping pattern and a narrow hopping pattern that are due to different tolerance ranges. Here, the ordinate describes the frequency and the abscissa describes the time.

Now, if nodes with a low tolerance use the hopping patterns defined for nodes with a high tolerance, the probability of these nodes interfering with each other is increased since they do not fully use the tolerance range and therefore effectively use less frequency resources. This is shown in FIG. 5.

Figure 5:
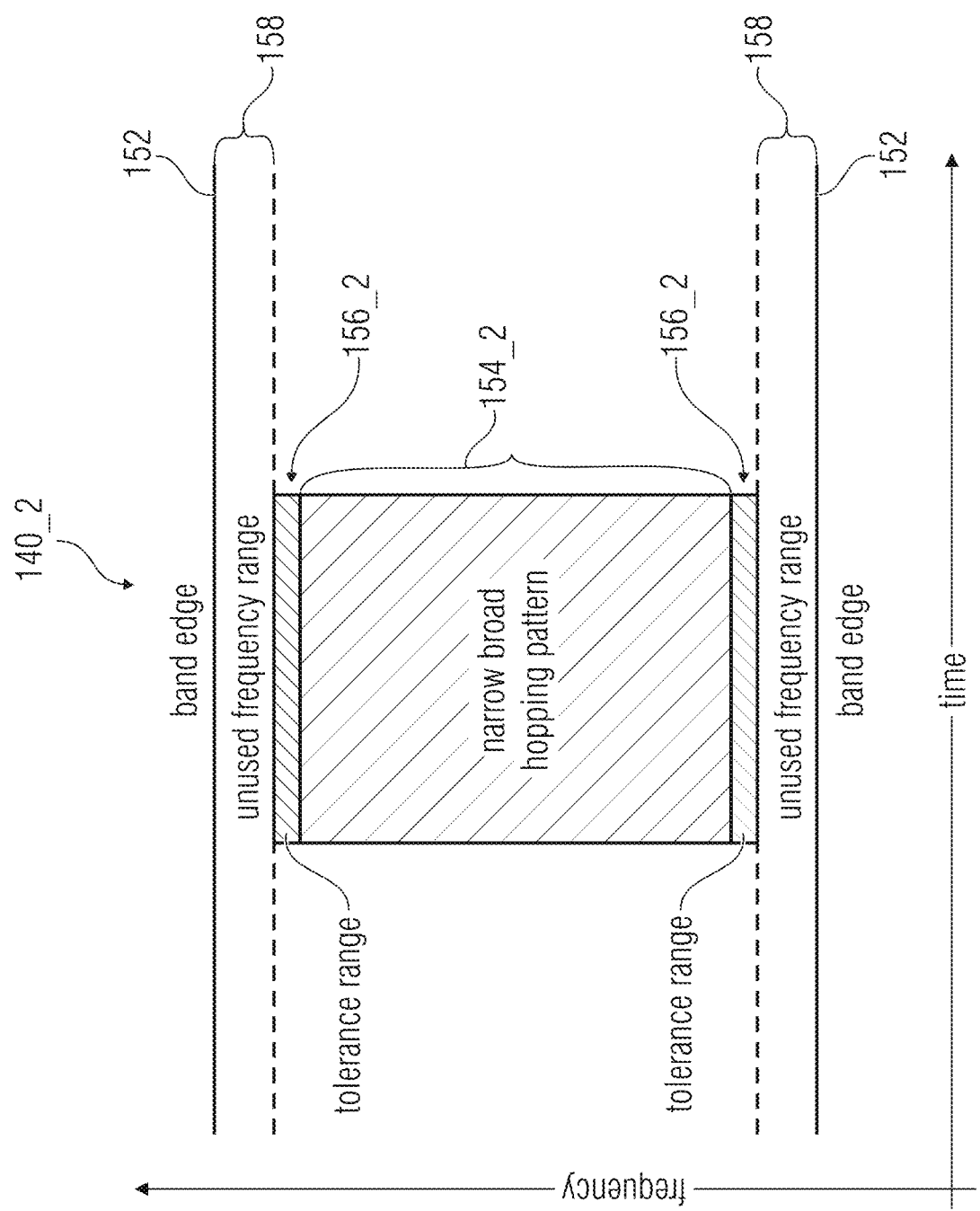

In detail, FIG. 5 shows in a diagram a frequency band 150 of a communication system defined by band edges 152, as well as unused frequencies ranges 158 of the frequency band that result from a data transmitter 100 with a low tolerance range 156_2 using the narrow hopping pattern 140_2 shown in FIG. 4. In other words, FIG. 5 shows a narrow hopping pattern in the case of nodes with a low tolerance. Here, the ordinate describes the frequency and the abscissa describes the time.

In embodiments, the hopping patterns (or hopping sequences) 140 may be adapted to the tolerances of the data transmitters 100 (e.g. nodes).

This has the advantage that more expensive data transmitters (e.g. nodes) with lower tolerances have access to a larger number of radio channels than cheaper data transmitters (e.g. nodes) with higher tolerances, which decreases the interference probability between the data transmitters (e.g.

nodes). In addition, cheap data transmitters (e.g. nodes) may still be operated in the same network.

1.4.1 Hopping Pattern for the Compensation of Excessively High Quartz Tolerances In embodiments, the individual hopping pattern 140 may depend on an (intrinsic) operation parameter of the data transmitter 100, wherein the (intrinsic) operation parameter may be a quartz tolerance of the data transmitter 100, wherein the data transmitter 100 may be configured to determine, in dependence on the quartz tolerance, a maximum range of frequency sub-channels of a frequency channel to be used, and to calculate the individual hopping pattern 140 or to select the same from a set of hopping patterns such that the same is within the maximum range of frequency sub-channels of the frequency channel (or frequency band) to be used.

For example, for data transmitters 100 (e.g. nodes) with high tolerances, sets of hopping patterns using a smaller number of sub-channels may be defined, which may ensure compliance with the overall channel.

In embodiments, on the data transmitter-side (or waveform) side, the hopping pattern 140 used for transmission may be selected in dependence on the tolerances of the data transmitter 100.

For example, for data transmitters 100 with low tolerances, broad hopping patterns with sub-channels closer to the edge region of the band 150 may be selected, whereas, for data transmitters 100 with large tolerances, narrow hopping patterns with sub-channels further away from the edge region of the band 150 may be selected.

1.4.2. Omission of the Edge Channels in Case of High Quartz Tolerances

According to their tolerance, data transmitters (e.g. nodes) with high tolerances should not emit sub-data packets 142 on the edge sub-channels where, due to the quartz tolerance, they cannot ensure that the transmission will still occur within the channel.

If the hopping patterns are selected such that the sub-channels are uniformly used, only a few sub-packets fall out of the transmission as a result of this measure, and, due to the error protection used in telegram splitting, the receivability and reconstructability of the message of the worst data transmitters (e.g. nodes) are further ensured.

In embodiments, on the data transmitter-side (or waveform-side), the hopping pattern 140 used for transmission may, in dependence on the tolerances, be left unused at the edges as far as the tolerances require.

In embodiments, the data transmitter 110 may be configured to receive hopping patterns that are so strongly shifted in frequency by the tolerances of the data transmitters 100 that they are actually outside of the defined band 150. Furthermore, the data receiver 110 may be configured to continue to receive a hopping pattern that is stretched or compressed by the frequency tolerances, e.g., through a definition of further reception hopping patterns corresponding to the distorted version of the original hopping pattern.

1.4.3. Puncturing the Hopping Pattern for Compensation of the Battery

In embodiments, the individual hopping pattern may depend on an (intrinsic) operation parameter of the data transmitter 100, wherein the (intrinsic) operation parameter of the data transmitter 100 may be available transmission energy, or an amount of energy that may be provided by an energy supply unit (e.g. a button cell or an energy harvesting element) of the data transmitter 100.

In this case, the data transmitter 100 may be configured to puncture a hopping pattern in dependence on the available transmission energy in order to obtain the individual hopping pattern 140.

For example, the data transmitter 100 (e.g. node) may comprise a current supply that requires a longer regeneration phase after emission on the radio channel than the pause between individual sub-data packets 142 would allow. In this case, the data transmitter 100 (e.g. node) may accordingly "puncture" the time/frequency hopping pattern in order to be able to maintain the minimum pause needed for regeneration. Here, it should be noted that the number of the omitted sub-data packets 142 is selected according to the rate of the error protection used such that the decodability of the data is maintained.

In embodiments, on the data transmitter-side (or waveform-side), the hopping pattern used for emission may be punctured such that the pause times between two transmissions allow for a battery-saving operation.

1.4.4 Frequency-Offset Hopping Pattern

In embodiments, the individual hopping pattern 140 may depend on an (intrinsic) operation parameter of the data transmitter 100, wherein the (intrinsic) operation parameter may be a frequency offset which the data transmitter applies to a hopping pattern in order to obtain the individual hopping pattern 140. The frequency offset may be a random frequency offset.

For a node with low tolerances, if a hopping pattern is defined that is too narrow, the problem of the unused frequency ranges arises, as is illustrated in FIG. 5. This may be avoided if the hopping pattern 140 is randomly shifted in the entirety of the frequency. The limits of the random frequency offset may be selected such that the regions previously unused by the narrow hopping pattern are also used.

For later processing in the data receiver 110, it may be of advantage if the random frequency offset used is stored in a part of the transmitted data. This makes it possible for the data receiver to continue to determine the frequency offset caused by the tolerance. Without the information, this may not be possible since the data receiver may not know at which nominal frequency, without tolerance, the data transmitter 100 has performed the transmission.

1.4.5. Over-Positioning Hopping Patterns Puncturing

In embodiments, a hopping pattern may also be selected such that the number of the transmitted partial packets falls below the number of defined transmissions in the hopping pattern. This means that, during the transmission, hops may be randomly omitted without negatively influencing the transmission probability since all sub-data packets are still transmitted. This makes it possible to increase the capacity in the network since the random omissions decrease the probability of the full overlap.

In embodiments, on the data transmitter-side (or waveform-side), a hopping pattern defining a higher number of hops than a number of sub-data packets to be transmitted may be shortened to the needed number of hops by random puncturing.

In embodiments, on the data receiver-side, the detection may further be performed across all defined hops since the puncturing is not known. An exact determination of the puncturing is possible, e.g. by comparing the detection quality of different puncturing patterns.

1.5 Extension Hopping Pattern

In embodiments, a further (or second) individual hopping pattern may be used for the transmission between the data transmitter 100 and the data receiver 110, wherein the further (or second) individual hopping pattern depends on the (first) individual hopping pattern 140 or on the operation parameter. The further (or second) individual hopping pattern is subsequently referred to as extension hopping pattern, while the (first) individual hopping pattern 140 is referred to as core hopping pattern. In this case, the core hopping pattern may correspond to the above-described individual hopping pattern 140.

In this case, the core hopping sequence 140 may have a fixed length (fixed number of hops 142) and may be used for the transmission of data of a fixed length, while the extension hopping sequence may have a variable length (variable number of hops) and may be used for the transmission of data of a variable length.

In order for the profit from the adaptation of the core hopping sequence (=individual hopping pattern) not to be lost, special characteristics of the core hopping sequence may be considered when generating the extension hopping sequence so that the extension hopping sequence, in addition to the possibility of transmitting additional data of a variable length, also has the above mentioned advantages.

1.5.1. Extension Sequence with Core Hopping Sequence Channels

In embodiments, the extension hopping sequence may be calculated, adapted, or selected from a set of hopping patterns in dependence on the core hopping sequence such that the extension hopping sequence only comprises frequency sub-channels also having the core hopping sequence. In this case, the extension hopping sequence may have fewer frequency sub-channels than the core hopping sequence.

For example, when generating (or forming) the extension hopping sequence, only the sub-channels that are also used by the core hopping sequence 140 may be used. Any missing sub-channels are also omitted, as is exemplarily illustrated based on the following table:

| Sub-Channel | Used in core sequence | Available for extension sequence |
| --- | --- | --- |
| 0 | No | No |
| 1 | Yes | Yes |
| 2 | Yes | Yes |
| 3 | Yes | Yes |
| 4 | No | No |
| 5 | Yes | Yes |
| 6 | Yes | Yes |
| 7 | No | No |
| 8 | No | No |
| 9 | Yes | Yes |
| 10 | No | No |
| 11 | Yes | Yes |
| 12 | No | No |

For the generation, e.g., a pseudo-random number may be created for each sub-data packet and the resulting number may be limited by the modulo operation with respect to the corresponding number of sub-channels. Through the core hopping sequence 140, the random number as well as the method for the generation of the random number may be known to the data receiver 110.

In embodiments, on the data transmitter-side, only the sub-channels of the core hopping sequence 140 may be used for the extension hopping sequence.

In embodiments, on the data receiver-side, the expected sub-data packets of the extension hopping sequence may be adapted accordingly.

1.5.2. Extension Sequence within the Core Sequence Limits

In embodiments, the extension hopping sequence may be calculated, adapted or selected from a set of hopping patterns in dependence on the core hopping sequence such that the extension hopping sequence also comprises frequency sub-channels that the core hopping sequence does not comprise.

For example, in the generation (or formation) of the extension hopping sequence, (all) sub-channels that are lower or equal to the highest used frequency sub-channel of the core hopping sequence and that are higher or equal to the lowest used frequency sub-channel of the core hopping sequence may be used for the extension hopping sequence, as is exemplarily illustrated based on the following table:

| Sub-Channel | Used in Core Sequence | Available for Extension Sequence |
| --- | --- | --- |
| 0 | No | No |
| 1 | Yes | Yes |
| 2 | Yes | Yes |
| 3 | Yes | Yes |
| 4 | No | Yes |
| 5 | Yes | Yes |
| 6 | Yes | Yes |
| 7 | No | Yes |
| 8 | No | Yes |
| 9 | Yes | Yes |
| 10 | No | Yes |
| 11 | Yes | Yes |
| 12 | No | No |

For the generation, e.g., a pseudo-random number may be created for each sub-data packet and the resulting number may be limited by the modulo operation with respect to the corresponding number of sub-channels. Through the core hopping sequence, the random number as well as the method for the generation of the random number may be known to the data receiver.

In embodiments, on the data transmitter-side, only the sub-channels that are not used for the core hopping sequence 140 may be used for the extension hopping sequence.

In embodiments, on the data receiver-side, the expected sub-data packets of the extension hopping sequence may be adapted accordingly.

1.6. Further Embodiments

Figure 6:
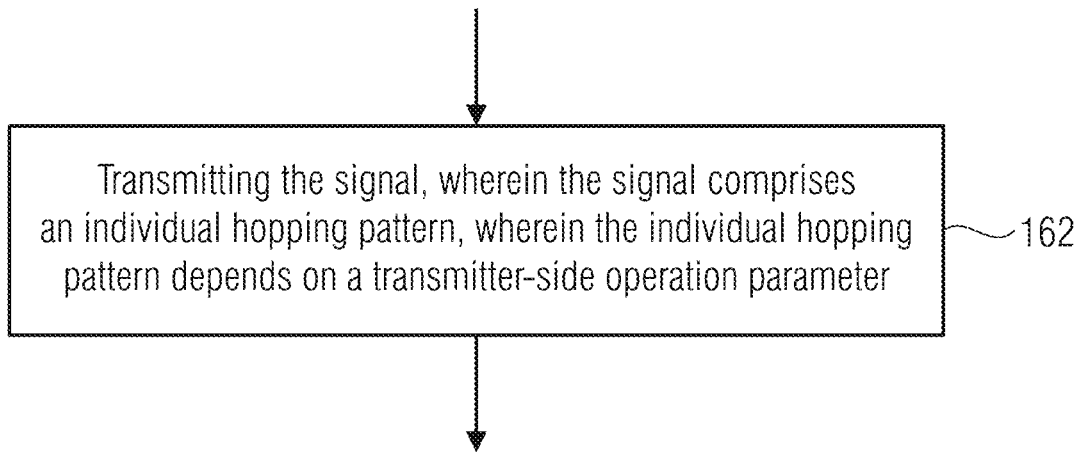
FIG. 6 shows a flow diagram of a method for transmitting a signal according to an embodiment.

FIG. 6 shows a flow diagram of a method 160 for transmitting a signal according to an embodiment. The method 160 includes a step 162 of transmitting the signal, wherein the signal comprises an individual hopping pattern, wherein the individual hopping pattern depends on a transmitter-side operation parameter.

Figure 7:
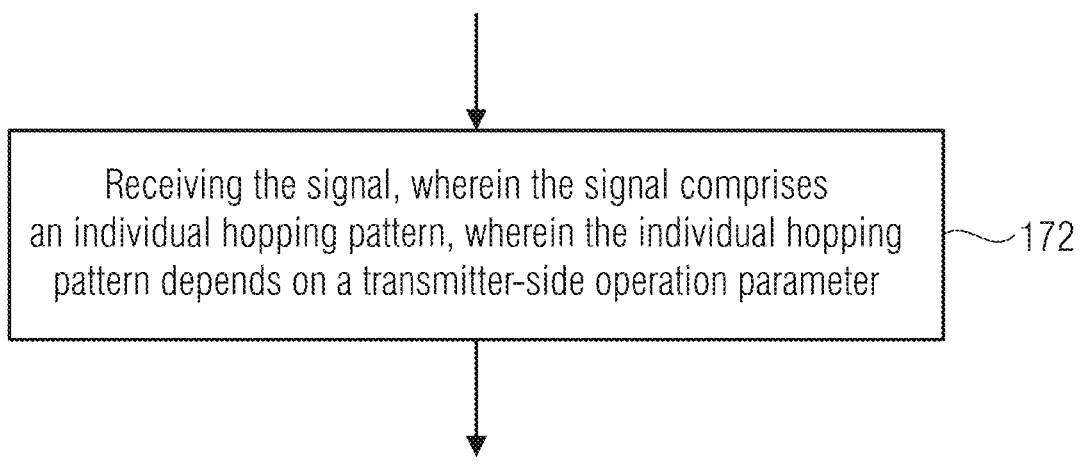
FIG. 7 shows a flow diagram of a method for receiving a signal according to an embodiment.

FIG. 7 shows a flow diagram of a method 170 for receiving 172 a signal according to an embodiment. The method 170 includes a step of receiving the signal, wherein the signal comprises an individual hopping pattern, wherein the individual hopping pattern depends on a transmitter-side operation parameter.

Figure 8:
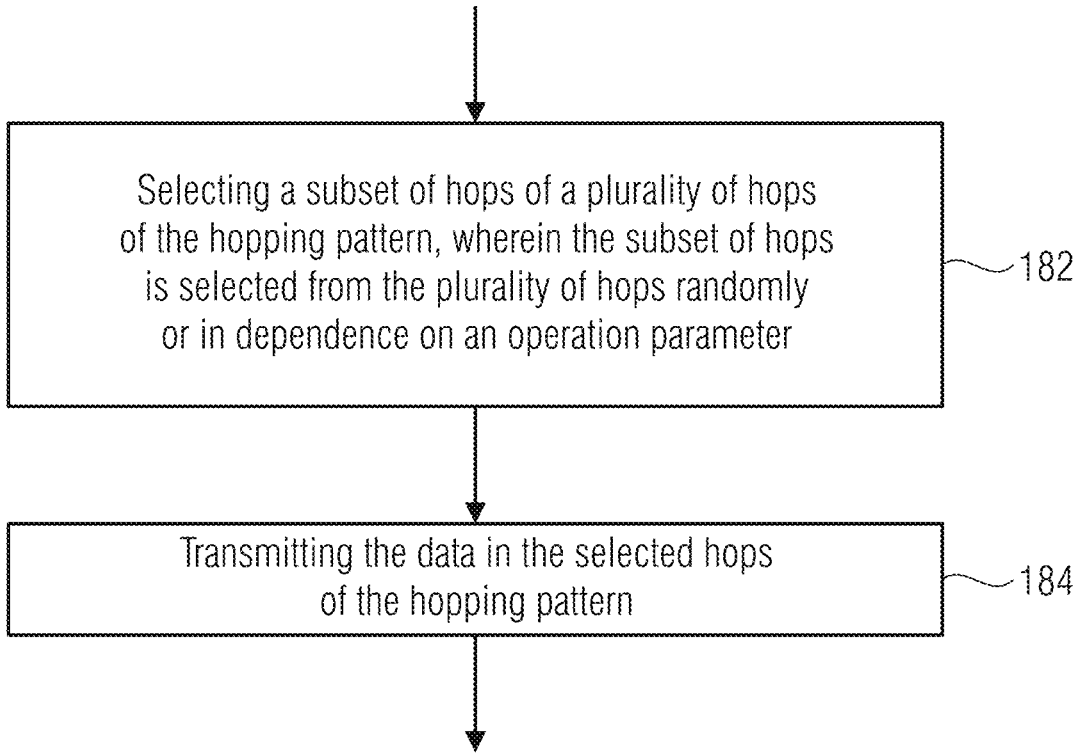
FIG. 8 shows a flow diagram of a method for transmitting a signal according to an embodiment.

FIG. 8 shows a flow diagram of a method 180 for transmitting data according to a hopping pattern according to an embodiment. The method 180 includes a step 182 of selecting a subset of hops of a plurality of hops of the hopping pattern, wherein the subset of hops is selected from the plurality of hops randomly or in dependence on an operation parameter. Furthermore, the method 180 includes a step 184 of transmitting the data in the selected hops of the hopping pattern.

Figure 9:
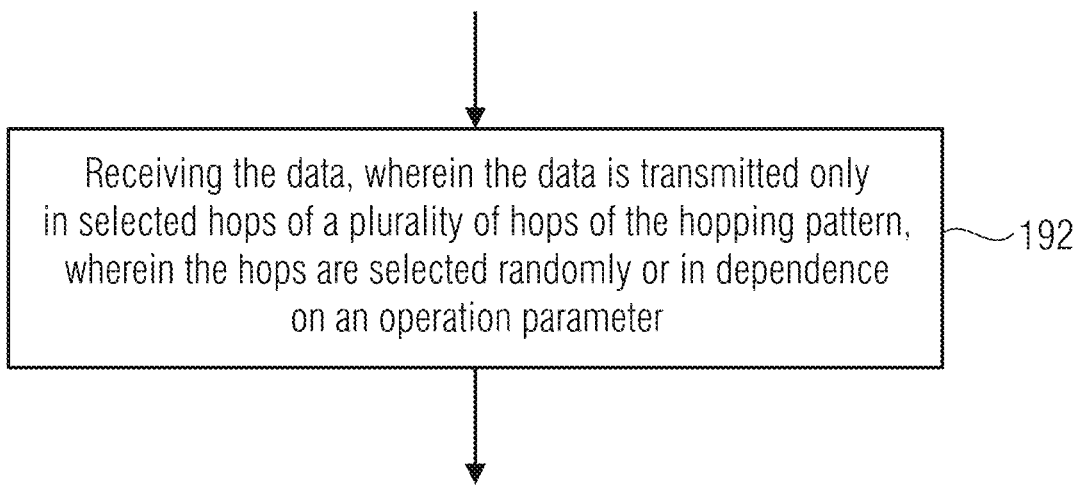
FIG. 9 shows a flow diagram of a method for receiving a signal according to an embodiment.

FIG. 9 shows a flow diagram of a method 190 for receiving data according to a hopping pattern according to an embodiment. The method 190 includes a step 192 of receiving the data, wherein the data is transmitted only in selected hops of a plurality of hops of the hopping pattern, wherein the hops are selected randomly or in dependence on an operation parameter.

2. GENERATION OF HOPPING PATTERNS

In the following, embodiments of a method for generating hopping patterns are described in more detail.

Figure 10:
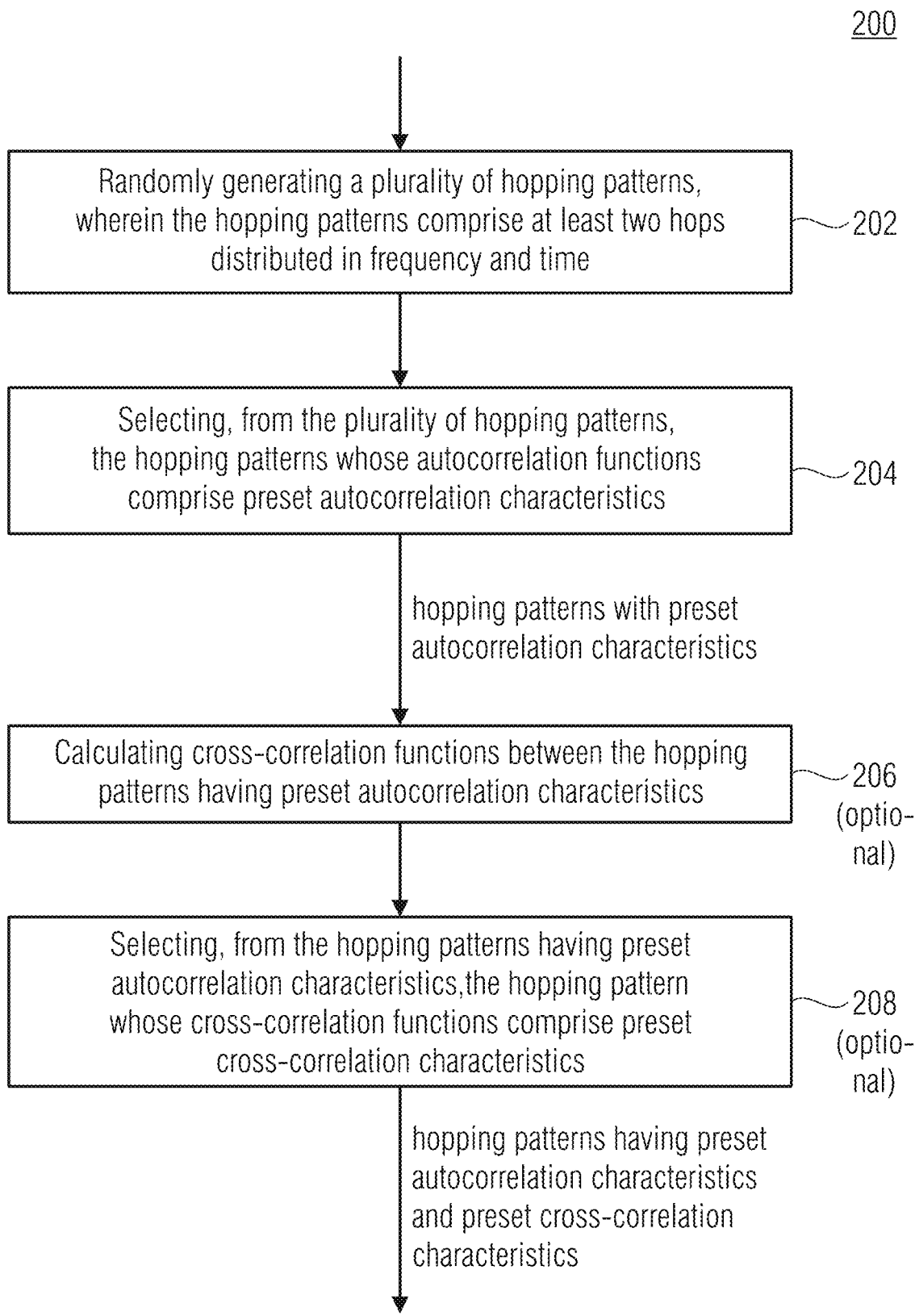
FIG. 10 shows a flow diagram of a method for generating hopping patterns according to an embodiment.

FIG. 10 shows a flow diagram of a method 200 for generating hopping patterns according to an embodiment. The method 200 includes a step 202 of randomly generating a plurality of hopping patterns, wherein the hopping patterns comprise at least two hops distributed in frequency and time. The method 200 further includes a step 204 of selecting, from the plurality of hopping patterns, the hopping patterns whose autocorrelation functions comprise specified autocorrelation characteristics in order to obtain hopping patterns with specified autocorrelation characteristics.

In embodiments, the hopping patterns whose autocorrelation function side maximums do not exceed a specified minimum amplitude threshold value may fulfill the specified autocorrelation characteristics. For example, the amplitude threshold value may be equal to a number of hops of a cluster of a plurality of clusters into which the hopping pattern is subdivided. For example, a cluster may be a number of hops comprising the same temporal interval and/or frequency interval to each other.

In embodiments, the hopping patterns whose subtotal formed across a specified number of largest amplitude values of the respective autocorrelation function is smaller than a specified threshold value may fulfill the specified autocorrelation characteristics. Here, the threshold value may be selected such that at least two hopping patterns (or a specified number of hopping patterns) fulfill the specified autocorrelation characteristics.

As can be seen in FIG. 10, the method 200 may further comprise a step 206 of calculating cross-correlation functions between the hopping patterns having specified autocorrelation characteristics. Furthermore, the method 200 may comprise a step 208 of selecting, from the hopping patterns having specified autocorrelation characteristics, the hopping patterns whose cross-correlation functions comprise specified cross-correlation characteristics in order to obtain hopping patterns having specified autocorrelation characteristics and specified cross-correlation characteristics.

In embodiments, the hopping patterns whose subtotals formed across a specified number of largest amplitude values of the respective cross-correlation function are the smallest may fulfill the specified cross-correlation characteristics.

2.1 Generation of Hopping Patterns for TSMA

For example, hopping patterns generated with the method shown in FIG. 10 may be employed in a system for the unidirectional or bidirectional data transmission from many sensor nodes to a base station using the so-called "telegram splitting multiple access (TSMA)" method.

In TSMA, the transmission of a message is subdivided into a multitude of short bursts (=hops, or sub-data packets) 142 between which there are transmission-free time intervals of different lengths each. Here, the bursts 142 may be distributed across time and also across available frequencies according to a real and a pseudo-random principle.

This approach of telegram splitting provides a particularly large robustness against interferences of other sensor nodes, regardless of whether they come from their own or external systems. In particular, the interference robustness in the own sensor nodes is achieved by distributing the various user signal bursts as uniformly as possible across the time domain and also the frequency domain.

This random-like distribution may be achieved by various means, for example, (1) by unavoidable tolerable deviations of the crystal reference oscillator with respect to the frequency, (2) arbitrary granularity in the time domain results through the random asynchronous channel access, and (3) by different burst arrangements of the different sensor nodes to different hopping patterns.

The design and the optimization of such hopping patterns are described in detail in the following.

Figure 11:
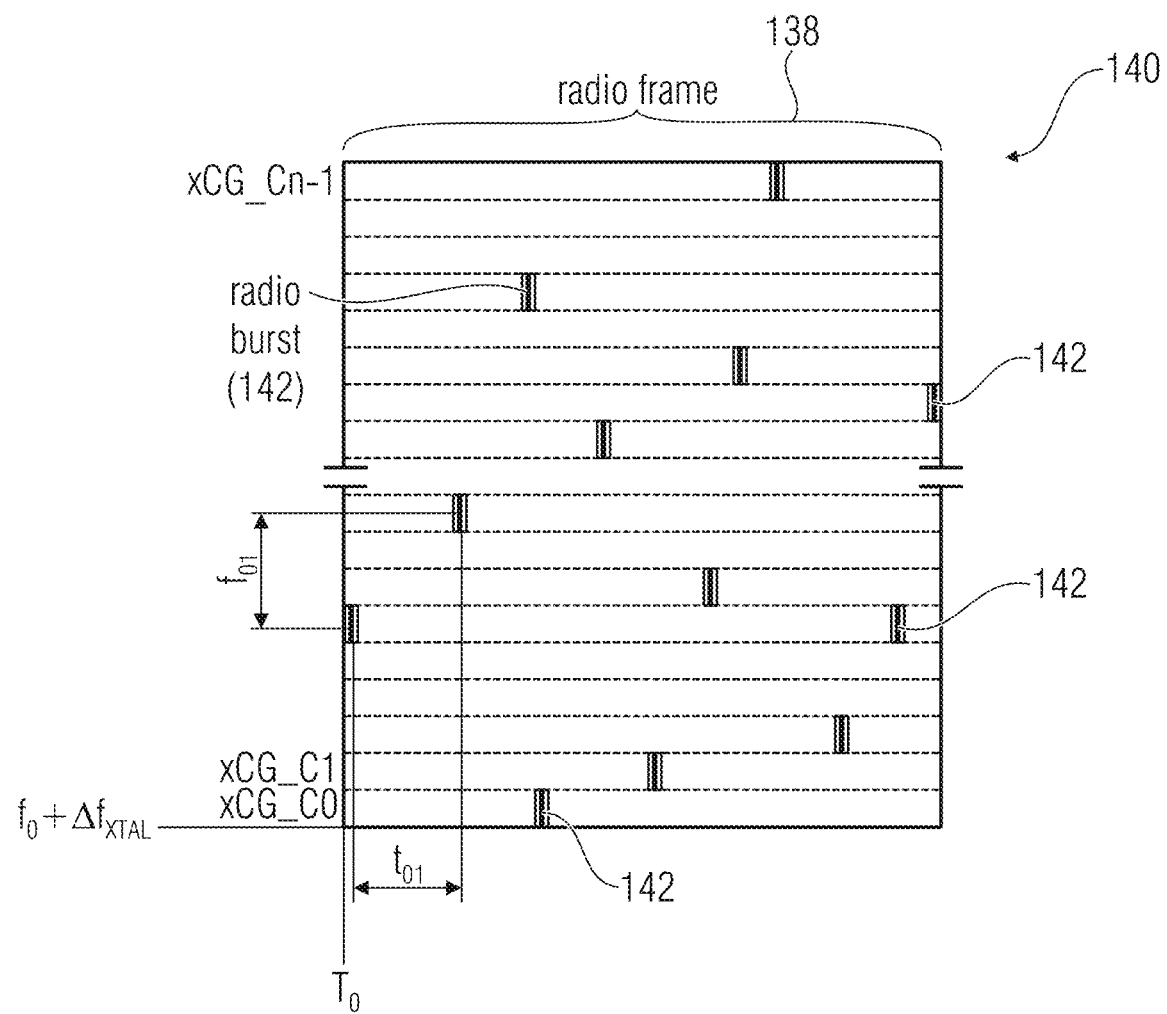
FIG. 11 shows a diagram of a structure of a frame with a TSMA hopping pattern.

In the transmission method TSMA, individual bursts of a data packet 120 (in the following also referred to as frame), as is illustrated in FIG. 11, are distributed across time and also across the frequencies.

In detail, FIG. 11 shows in a diagram a structure of a frame 120 having a TSMA hopping pattern 140. In this case, the ordinate describe the frequency, or channels (frequency channels), and the abscissa describes the time.

The start time $T_0$ of a frame 120 with the total duration $T_{frame}$ is selected by the sensor node 100 randomly due to the asynchronous transmission. The duration $T_{burst}$, of a burst 142 may vary, but is assumed to be constant in the following without restriction of the general validity, whereas the time intervals $t_{n,(n+1)}$, which each designate the distance of two neighboring burst centers (here of the two bursts having the indices n and n+1), are random quantities that are all within a specifiable range $T_{A\_min} \leq t_{n,(n+1)} \leq T_{A\_max}$ for $n \in \{1, 2, \ldots, N\}$. N is the number of the bursts 142 within a frame 120. For the frequencies used for the transmission, it is assumed that they are present in form of discrete frequency channels which are within a specifiable frequency channel grid. The frequency separation $f_{n,(n+1)}$ between 2 bursts 142 is a multiple of the TSMA carrier distance $B_C$.

The number of the available frequency channels is given with L and $N \leq L$ applies. In this respect, there are more or exactly as many frequency channels as are needed by the N bursts 142 and, therefore, each of the N bursts 142 is located in a different frequency channel within a frame 120.

In the following, the arrangement of the N bursts 142 in time and frequency is referred to as TSMA pattern (TSMA hopping pattern). If this hopping pattern is known to the receiver, it may synchronize with respect to the same based on the pilot sequences located in some or in every burst 142 and it may subsequently decode the reception data.

Figure 12:
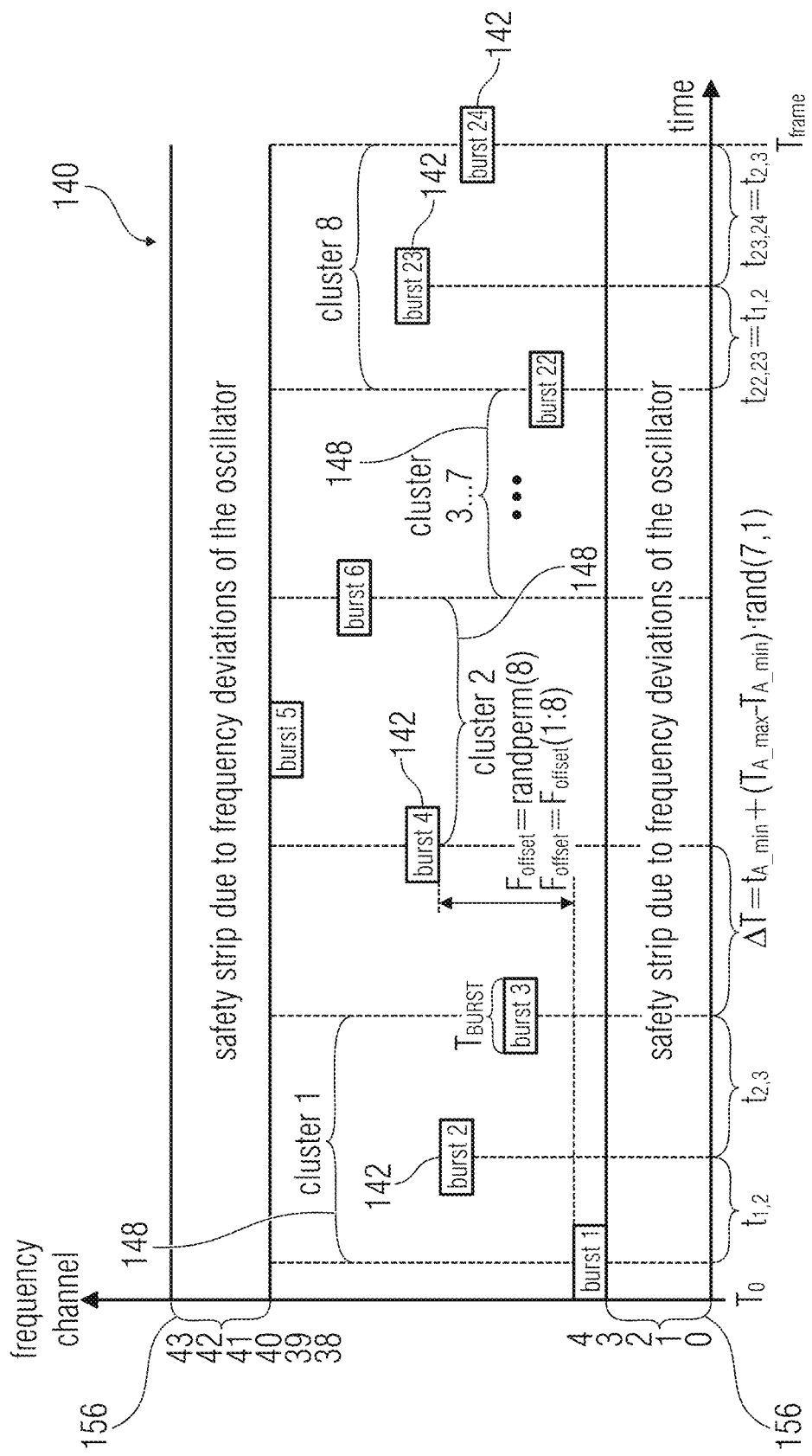
FIG. 12 shows in a diagram a schematic view of a structure of a TSMA hopping pattern.

The following system limitations may be considered with respect to the design of one or several TSMA patterns: (1) The frequency deviation of the oscillator from its nominal frequency may be considered. Depending on the system parameters and hardware requirements, the frequency deviation may be a multiple of the carrier distance. Since this frequency offset may have both positive and negative values, a guard strip 156 of S frequency channels in which there is no burst (cf. FIG. 12) may be provided accordingly at both edges of the frequency range that is considered for use. In this respect, the degree of freedom for the individual bursts of the hopping pattern is reduced to (L−2·S) frequencies, wherein $N \leq (L-2 \cdot S)$ still applies. (2) Due to the temporarily asynchronous transmission, the receiver 110 does not know when a transmitter 100 transmits and the receiver also does not know which transmitter transmits. In this respect, the detection of a signal would go along with a considerable additional effort if the pattern arrangement, i. e. the grouping of the N bursts 142 within the time range $T_{frame}$ and across the (L−2·S) frequencies, would be completely random. In this respect, for example, C subsequent bursts 142 that are relative, e. g. identical, to each other with respect to their time and frequency intervals may be combined to a so-called cluster 148. Thus, a hopping pattern 140 consists of N/C clusters 148 with C bursts 142 each. C may advantageously be selected such that it is an integer divider of N. Thus, N/C|N⇔∃k∈ℤ:k·N/C=N applies. Details are discussed as shown in FIG. 12. However, it should already be mentioned here that a hopping pattern construction consisting of N/C clusters 148 that are entirely identical in their internal structure has certain disadvantages with respect to their correlation characteristics (occurrence of strongly pronounced side maximums with an amplitude of N/C each in the 2D autocorrelation function). All first bursts 142 in the N/C clusters comprise repetition patterns that are identical in a frequency-offset manner (and possibly in a time-offset manner). Accordingly, it happens that N/C bursts 142 interfere with each other. However, this disadvantage may be accepted in view of the simplifications that may be achieved in the receiver as a result. A cluster size of C=1 (and therefore no cluster at all) is the most advantageous with respect to the correlation characteristics. (3) Due to the telegram splitting, the duration $T_{burst}$ of a burst 142 is relatively short as compared to the transmission time of the entire frame 120. If a certain minimum time $T_{A\_min}$ is allowed to elapse after the transmission of the first burst 142, this may have certain advantages with regard to the current consumption of the battery-powered sensor nodes (regeneration time of the battery after a comparatively energy-intensive transmission process). This minimum distance $T_{A\_min}$ should also be adhered to within the cluster as a design guideline.

Taking into account the above-mentioned restrictions, the structure of a TSMA pattern 142 shown in FIG. 12 arises.

In detail, FIG. 12 shows in a diagram a schematic view of a structure of a TSMA hopping pattern 142. In this case, the ordinate describes the frequency in frequency channels, and the abscissa describes the time. In other words, FIG. 12 shows a structure of the TSMA hopping pattern 142 with a cluster arrangement and frequency occupancy.

For better comprehensibility, the values in FIG. 12 are purely exemplary supplemented with concrete figures as far as needed: L=44, S=4, N=24, C=3. Due to the frequency deviation of the oscillator from its nominal frequency, S=4 frequency bands each are blocked for the burst occupancy, leaving 36 frequency bands for the 24 bursts or the 8 clusters.

This results in the following degrees of freedom with respect to the frequency channel occupancy. Since the 3 bursts in the 8 clusters each have a same frequency interval relative to each other, at least 8 further frequency bands may be reserved, leaving a maximum swing of 28 frequency bands for the base assignment of the 3 bursts. For example, any relative assignment with three different frequency bands may be performed. As is the case in the base assignments (1,28,14) or (1,24,12), for example, a largest possible frequency swing in neighboring bursts proves to be advantageous with regard to the later optimizations. The assignment of the individual clusters with respect to each other may also take place randomly. For example, the order of the numbers {1,2,3,4,5,6,7,8} may be arbitrarily permuted with each other (Matlab command: randperm (8)) and these 8 different values each be added to a base assignment in order to obtain the frequency assignment of the bursts in the 8 clusters.

This results in the following degrees of freedom with respect to the time intervals. Here, the two time intervals between the 3 bursts of the clusters as well as the 7 time intervals between the 8 clusters have to be determined. One should not fall below a certain minimum time $T_{A\_min}$. An upper time limit $T_{A\_max}$ results from the specification of the frame duration $T_{frame}$. The determination of the time intervals may also be performed by throwing a dice (Matlab command: $\Delta T = T_{A\_min} + (T_{A\_max} - T_{A\_min}) \cdot \text{rand}(7,1)$).

In the "Telegram Splitting Multiple Access (TSMA)" method, the message is split into many small bursts 142 both in the time direction and the frequency direction according to the hopping pattern 140. Due to the asynchronous transmission and the different frequency departures of the individual sensor nodes 100, the bursts 142 are smeared across time and also across the available frequency spectrum. If all sensor nodes 100 have the same hopping pattern, with increasing number of participants, bursts of different participants overlap more and more often and therefore interfere with each other. The more bursts 142 within a frame 120 are disturbed by bursts of other participants, the higher the probability that the receiver-side error correction fails and that transmission errors occur.

Embodiments provide a set of hopping patterns which ideally minimize the packet error rate (frame or packet error rate, FER, PER) of the radio transmission system. This is done under the assumption that all radio participants use the same set of hopping patterns. Although, with respect to the arrangement of the radio frequencies in a hopping pattern, only a finite (albeit usually extraordinarily large) number of permutations is possible by introducing discrete radio channels, the temporal arrangement of the bursts 142 leads to an extremely large number of permutation possibilities, i.e. hopping patterns, due to a continuous time axis. Thus, a "full search" across all possible hopping patterns is almost impossible. The method underlying the invention is therefore based on a Monte Carlo approach which selects, from a very large number of (pseudo) randomly generated hopping patterns, a set with the best characteristics as to an expected minimum error rate using suitable design criteria. The number of hopping patterns in this set amounts to $P_{selection}$.

In order to create suitable hopping patterns 142, a matrix that is ideally strictly monotonously related to the expected packet error rate, i.e. whose minimization ideally also minimizes the packet error rate, is needed. In embodiments, the two-dimensional (2D) autocorrelation and/or cross-correlation of the hopping pattern may be considered as a design criterium.

The 2D-autocorrelation (ACF) $\Theta_{x,x}$ of the matrix X of the hopping pattern 142, which spans the area across the duration $T_{frame}$, sampled with multiples of $T_A$ and the occupied frequency spectrum with the L frequency bands, may be specified as follows:

$$\theta_{x,x}(f, t) = \sum_{l=0}^{L-1} \sum_{m=0}^{M-1} x_{l,m} \cdot x_{l+f, m+t}$$

wherein L is the number of lines of the matrix X and $M=T_{frame}/T_A$ is the number of columns of the matrix X. If a burst is located at the respective position x(l,m) of the matrix X, an entry takes place at this location in X with x(l,m)=1, otherwise x(l,m)=0. The indexed elements of X outside the occupied range are also zero:

$x(l,m)=0$, $l<0$ or $l≥L$ or $m<0$ or $m≥M$

Since the oscillator frequency error per participant may amount by definition to a maximum deviation of S frequency channels, the frequency index f in the ACF extends from −2S to +2S. On the other hand, the time index t runs from −$T_{frame}$ to $T_{frame}$ in steps of $T_{frame}/T_A$. Die ACF dimension of $\Theta_{x,x}$ is therefore (4S+1)×(2M+1).

In the time and frequency information matrix X, if desired, the influence of neighboring channel interferences may also be taken into account. This is important if the reception filters in the receiver 110 do not have any particular selectivity with respect to neighboring channel interferences. For this, a matrix vector $m_{Met}$={cochannel, first neighboring channel, second neighboring channel, . . . } that inserts the corresponding information into the matrix X may be introduced. For example, if a matrix with $m_{Met}$={1, 0.5, 0.1} is specified, in X, there is a 1 at the point x(l,m) where the presence of a burst is assumed there is a 0.5 at the two positions of the neighboring frequencies x(l−1,m) and x(l+1,m). Accordingly, further on the outside, at x(l−2,m) and x(l+2,m) there is the value 0.1 for the 2nd neighboring channel. This indexing may be done at all positions where a burst is located in X.

Figure 13B:
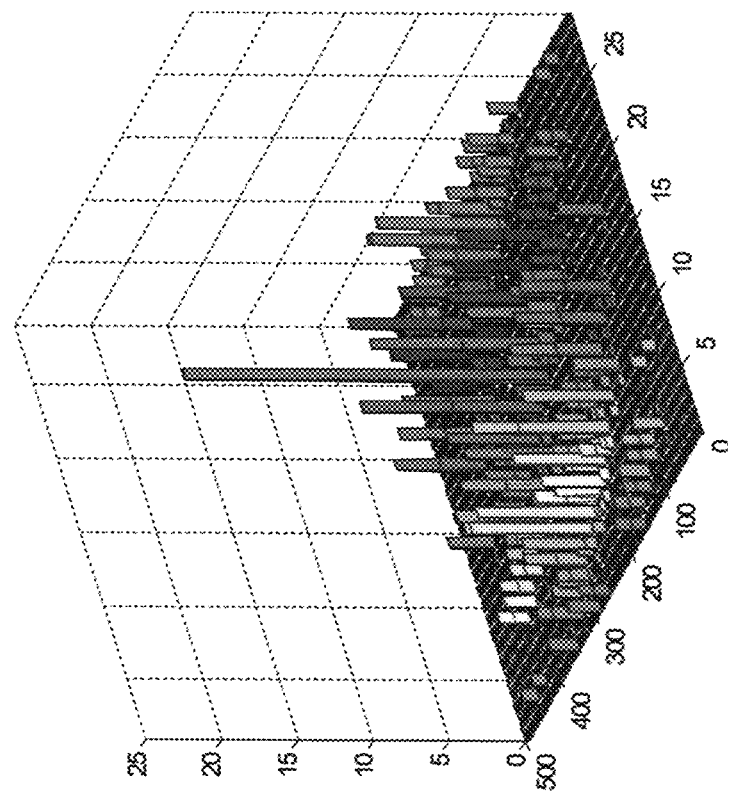
FIG. 13b shows in a diagram main and side maximums of an autocorrelation function of a hopping pattern not comprising specified autocorrelation characteristics, plotted across frequency and time.
Figure 13A:
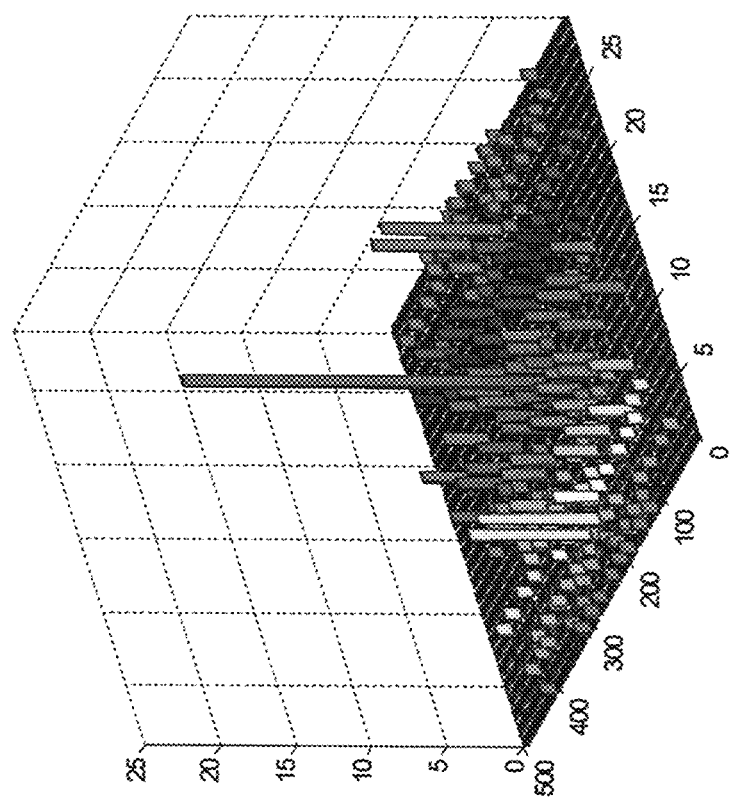
FIG. 13a shows in a diagram main and side maximums of an autocorrelation function of a hopping pattern comprising specified autocorrelation characteristics, plotted across frequency and time.

FIGS. 13a and 13b show two ACF examples. In FIG. 13a, beside the unavoidable main maximum at t=f=0 (since the unshifted sequence is most similar with itself, the 2D-ACF has the highest value for the sequence unshifted in both dimensions (time and frequency), in this case N burst collisions) and the 2 or 4 possible side maximums with the amplitudes of N/C each due to the cluster formation, there are only values that are smaller than or equal to a threshold value $N_{threshold}$. The lower this threshold, the fewer bursts are disturbed in a frame, while the probability of a transmission error is reduced. On the other hand, FIG. 13b shows a more unfavorable hopping pattern in which the threshold value is exceeded in some places. This increases the probability of transmission errors.

In the following, the individual design steps are described in detail. In a first design step, $P_{optimum}$ candidates of the hopping patterns whose ACF side maximums do not exceed a specified minimum amplitude threshold value $N_{threshold} \geq C$ (C is the cluster size) may be generated. The generation of candidates of the hopping patterns is done in the context of a Monte Carlo simulation in which hopping patterns having random time and frequency patterns (in the context of the mentioned edge conditions, see above) are generated. If $N_{threshold} \geq C$ applies for the threshold value, the number of values exceeding the value C should be as small as possible.

For this, the (4S+1)×(2M+1) elements of the 2D autocorrelation $\Theta_{x,x}$ may be sorted in ascending order in a vector $V_{sort}$. Since the total sum remains approximately constant across all ACF elements for all hopping patterns and most ACF elements have values of 0, 1 or C (full cluster collision), only the values larger than C are of interest, if available. In this regard, it is sufficient to only consider the last $v_{ACF}$ elements of $V_{sort}$, i. e. $V_{sort}$(end-$v_{ACF}$+1:end). As a criterion (specified autocorrelation characteristic), it may therefore be determined that the sum $SUM_{ACF}$ of these $v_{ACF}$ elements is not to exceed a threshold value of $S_{sum\_ACF\_threshold}$=($v_{ACF}$−1)·C+N, if possible. If not enough different hopping patterns are found for this, the value of $S_{sum\_ACF\_threshold}$ may be incrementally increased by 1 until a sufficient number of $P_{optimum}$ of hopping patterns is available. Particularly, if neighboring channel interferences are included into the calculation of the 2D-ACF by means of the matrix vector $m_{Met}$, the sum threshold value $S_{sum\_ACF\_threshold}$ may significantly increase.

If different sets of hopping patterns 142 are to be searched for, the first design step may be repeated with a new parameter set. For example, there may be the desire to generate several sets of hopping patterns with different oscillator deviations and optimize them together. Different oscillator deviations may cause different guard strips S, resulting in a change of the degree of freedom of the possible burst occupancy. In this respect, some parameters within the ACF calculation also change.

Figure 14A:
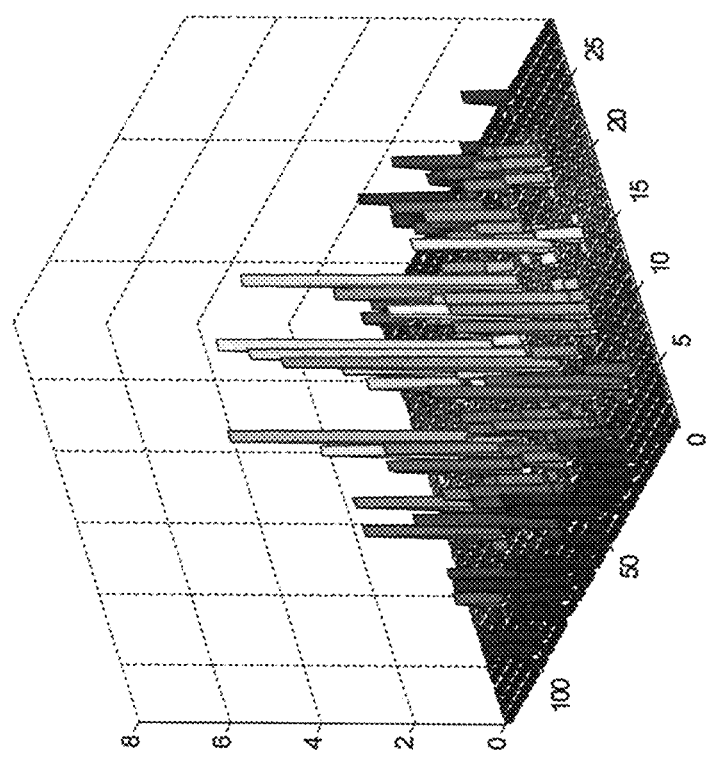
FIG. 14a shows in a diagram main and side maximums of a cross-correlation function of two hopping patterns comprising specified cross-correlation characteristics, plotted across frequency and time.
Figure 14B:
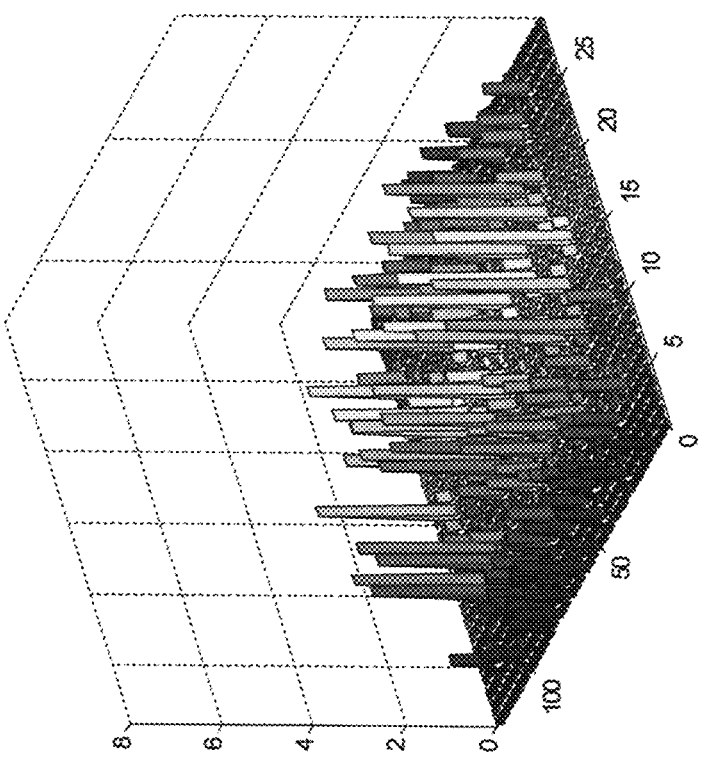
FIG. 14b shows in a diagram main and side maximums of a cross-correlation function of two hopping patterns not comprising specified cross-correlation characteristics, plotted across frequency and time.

If a given number $P_{selection}$ of different hopping patterns is searched for, they should be as orthogonal to each other as possible, and the individual 2D cross-correlation matrices (2D-CCF)

$$\Theta_{x,y}(f, t) = \sum_{l=0}^{L-1} \sum_{m=0}^{M-1} x_{l,m} \cdot y_{l+f, m+t}$$

of the two hopping patterns with the matrices X and Y should comprise the lowest possible maximum values since high maximum values potentially correspond to a large number of colliding bursts in a single frame in the radio transmission. The time index of the $\Theta_{x,y}$ continues in an unvaried manner in steps of $T_{frame}/T_A$ from −$T_{fame}$ to $T_{frame}$. The CCF frequency index f on the other hand, extends in general from −($S_x$+$S_y$) to +($S_x$+$S_y$) since the two considered hopping patterns may comprise different deviations in their frequency error behavior (oscillator frequency deviations). FIGS. 14a and 14b again show two 2D-CCF examples, a favorable case (FIG. 14a) and an unfavorable case (FIG. 14b).

In a second design step, starting from the $P_{optimum}$ previously selected hopping pattern candidates with their associated 2D autocorrelation sequences $\Theta_{x,x}$, all ($P_{optimum}$−1)× ($P_{optimum}$) possible, generally different cross-correlation sequences $\Theta_{x,y}$ may be calculated. In each 2D-CCF, the values of $\Theta_{x,y}$ may subsequently be again sorted in ascending order (analogously to the process in 2D-ACF), the sum of the last $v_{CCF}$ elements may be calculated, i.e. $SUM_{CCF}$=sum($V_{sort}$(end-$v_{CCF}$+1:end)) and be stored in a quadratic ($P_{optimum}$×$P_{optimum}$) matrix $O_{vCCF}$.

In a third step, the $P_{selection}$ different hopping patterns 142 that comprise the most favorable 2D-CCF characteristics with respect to each other since they correlate with a comparably low maximum number of colliding bursts in a frame are to be searched for. For this, the characteristics of (($P_{selection}$−1)·$P_{selection}$)/2 different 2D-CCF may be evaluated based on the stored sums $SUM_{CCF}$ in the matrix $O_{vCCF}$. The $P_{selection}$ different hopping patterns whose total sum across the (($P_{selection}$−1)·$P_{selection}$)/2 different subtotals $SUM_{CCF}$ from $O_{vCCF}$ is a minimum result in the optimum $P_{selection}$ hopping patterns. Since, in the context of an extensive Monte Carlo simulation, $P_{selection}$<<$P_{optimum}$ is the aim, according to the binomial coefficient "$P_{optimum}$ over $P_{selection}$", there are different combination possibilities, an extent that usually does not have to be fully processed. In this respect, $P_{selection}$ hopping patterns may be newly and randomly selected from the $P_{optimum}$ present hopping patterns (Matlab commands: F=randperm(1:$P_{optimum}$) and Pattern$_{selection}$=F(1:$P_{selection}$)) and the total sum TS may be calculated from the different subtotals $SUM_{CCF}$. With a correspondingly large sample size, there is a local minimum of the total sum, which then delivers the desired set of $P_{selection}$ hopping patterns.

Figure 15:
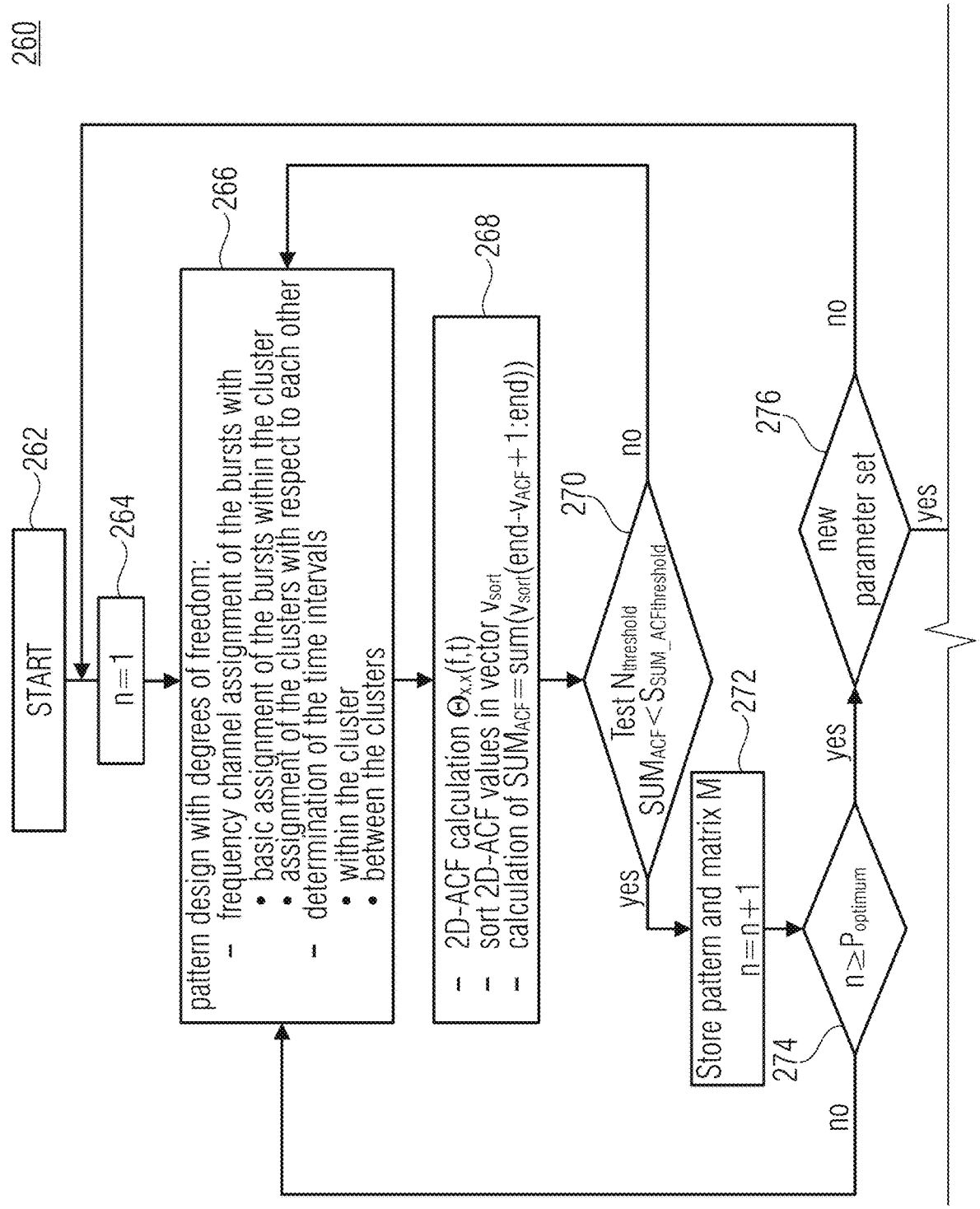
FIG. 15 shows a flow diagram of a method 260 for generating hopping patterns according to an embodiment.
Figure 15:
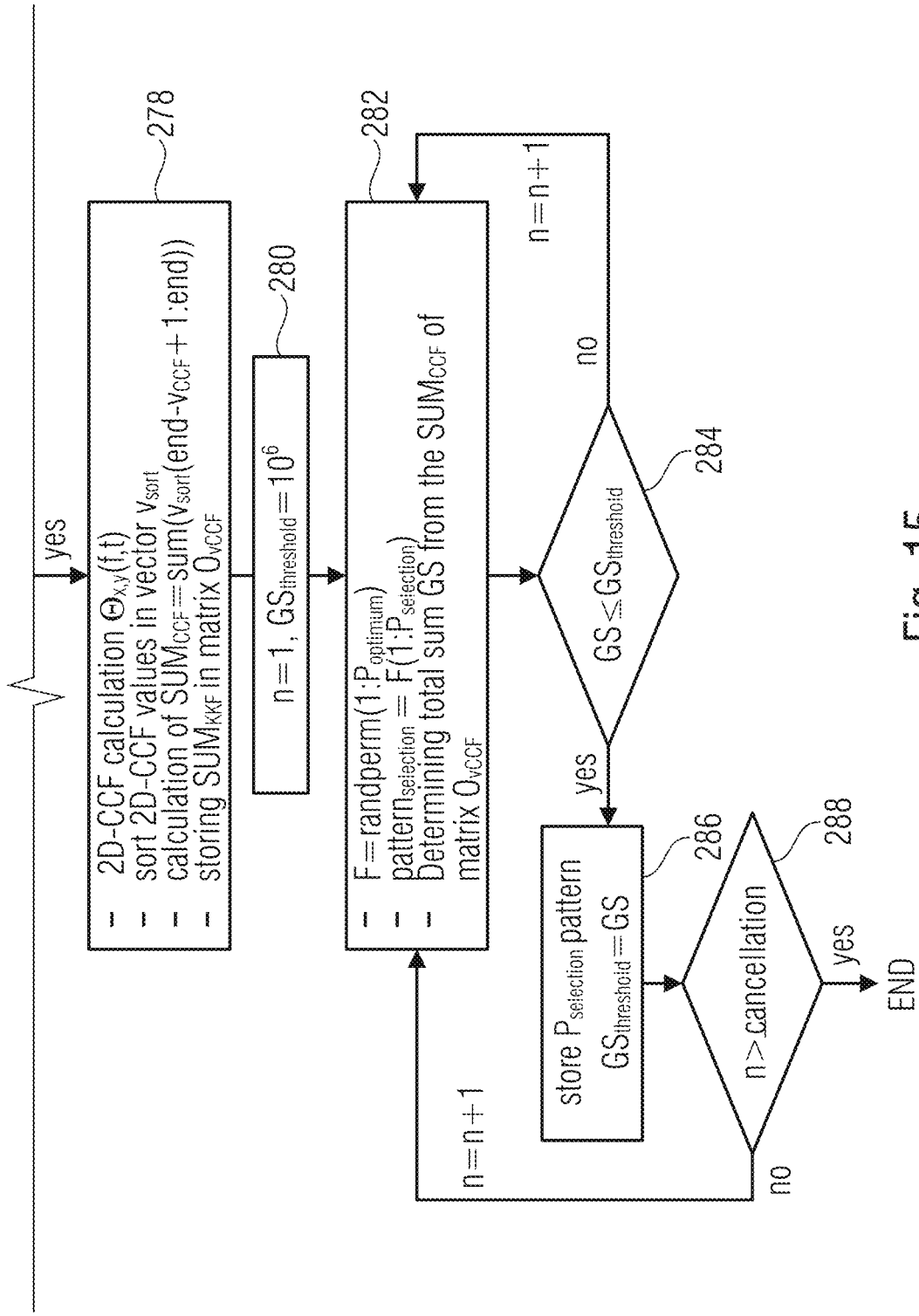

The full design process and the degrees of freedom when determining the hopping patterns are again illustrated in FIG. 15. The possibility to optimize several sets of hopping patterns at the same time is considered, but only indicated.

In detail, FIG. 15 shows a flow diagram of a method 260 for generating hopping patterns according to an embodiment.

In a first step 262, the method 260 is started.

In a second step 264, n is set to be equal one, wherein n is a running variable.

In a third step 266, a hopping pattern may be randomly generated. Here, the above-mentioned degrees of freedom with respect to the frequency channel occupancy may be considered, e.g. a frequency channel assignment of the bursts with a base assignment of the bursts within the cluster and an assignment of the clusters with respect to each another. Furthermore, the above-mentioned degrees of freedom with respect to the time intervals may be considered, e.g. a determination of the time intervals within the cluster and between the clusters.

In a fourth step 268, the autocorrelation function of the randomly generated hopping pattern may be calculated. For example, a 2D-ACF calculation $\Theta_{x,x}(f,t)$ may be carried out. Furthermore, the 2D-ACF values may be sorted in a vector $v_{sort}$. Furthermore, a subtotal may be formed across a specified number of largest amplitude values of the autocorrelation function, $SUM_{ACF}=sum(v_{sort}(end-v_{ACF}+1:end))$.

In a fifth step 270, it may be determined whether the randomly generated hopping pattern comprises the specified autocorrelation characteristics. For example, it may be determined whether the ACF side maximums of the hopping pattern do not exceed a specified minimum amplitude threshold value $N_{threshold} \geq C$ (C is the cluster size), in detail, it may be determined whether the sum $SUM_{ACF}$ of these $v_{ACF}$ elements (subtotal) does not exceed the sum threshold value of $S_{sum\_ACF\_threshold}$ of, e.g., $(v_{ACF}-1) \cdot C + N$.

If the hopping pattern does not comprise the specified autocorrelation characteristics, the third step is repeated. If the hopping pattern comprises the specified autocorrelation characteristics, the method is continued.

In a sixth step 272, the hopping pattern (with the specified autocorrelation characteristics) and the matrix X may be stored. Furthermore, the index n may be increased by one, n=n+1.

In a seventh step 274, it may be checked whether an optimum number $P_{optimum}$ of hopping patterns is available.

If no optimum number $P_{optimum}$ of hopping patterns is available, the third step 266 is repeated. If an optimum number $P_{optimum}$ of hopping patterns is available, the method is continued.

In an eighth step 276, it is determined whether a further set of hopping patterns is to be generated for another parameter set (e. g. another oscillator offset). If this is the case, the second step 264 is repeated. If this is not the case, the method is continued.

In a ninth step 278, the cross-correlation functions between the hopping patterns with specified autocorrelation characteristics are calculated. For example, a 2D-CCF calculation $\Theta_{x,y}(f,t)$ may be carried out, the 2D-CCF values may be stored in a vector $v_{sort}$, the subtotals $SUM_{CCF}=sum(v_{sort}(end-v_{CCF}+1:end))$ may be calculated, and the subtotals $SUM_{CCF}$ may be stored in a matrix $O_{vCCF}$.

In a tenth step 280, n may be set to be equal one and $TS_{threshold}$ may be set to a large threshold, e. g. $10^6$.

In an eleventh step 282, $P_{selection}$ hopping patterns are newly and randomly selected from the $P_{optimum}$ present hopping patterns. For this, $P_{optimum}$ different numbers in a random sequence are obtained by throwing a dice, $F=randperm(1:P_{optimum})$. From this, the first $P_{selection}$ may be selected, $pattern_{selection}=F(1:P_{selection})$. Based on the $pattern_{selection}$, the total sum TS may be calculated from the individual subtotals $SUM_{CCF}$ that are in the matrix $O_{vCCF}$.

In a twelfth step 282, it may be determined whether $TS \leq TS_{threshold}$. If $TS \leq TS_{threshold}$ is not satisfied, n is increased by one, n=n+1, and the eleventh step 282 is repeated. If $TS \leq TS_{threshold}$, the threshold $TS_{threshold}$ is overwritten with TS, and the method is continued.

In a thirteenth step 286 the selected hopping pattern may be stored.

In a fourteenth step 288, it may be determined whether n≥cancellation. If n≥cancellation is not satisfied, n is increased by one, n=n+1, and the eleventh step 282 is repeated. If n≥cancellation is satisfied, the method is completed.

2.2 Exemplary Hopping Patterns for TSMA

Two exemplary hopping patterns that have been generated with the above-mentioned method are described in the following.

Hopping Pattern 1

A first hopping pattern is a combination of a time hopping pattern and a frequency hopping pattern for nodes 100 with a quartz tolerance of +/−20 ppm or better, wherein the time hopping pattern is one of the following eight time hopping patterns having 24 hops each:

| | # of sub-data packets in the core frame $S_C$ | | | | | | | | | | | |
|---|---|---|---|---|---|---|---|---|---|---|---|---|
| No. | 1 | 2 | 3 | 4 | 5 | 6 | 7 | 8 | 9 | 10 | 11 | 12 |
| 1 | 330 | 387 | 388 | 330 | 387 | 354 | 330 | 387 | 356 | 330 | 387 | 432 |
| 2 | 330 | 387 | 435 | 330 | 387 | 409 | 330 | 387 | 398 | 330 | 387 | 370 |
| 3 | 330 | 387 | 356 | 330 | 387 | 439 | 330 | 387 | 413 | 330 | 387 | 352 |
| 4 | 330 | 387 | 352 | 330 | 387 | 382 | 330 | 387 | 381 | 330 | 387 | 365 |
| 5 | 330 | 387 | 380 | 330 | 387 | 634 | 330 | 387 | 360 | 330 | 387 | 393 |
| 6 | 330 | 387 | 364 | 330 | 387 | 375 | 330 | 387 | 474 | 330 | 387 | 355 |
| 7 | 330 | 387 | 472 | 330 | 387 | 546 | 330 | 387 | 501 | 330 | 387 | 356 |
| 8 | 330 | 387 | 391 | 330 | 387 | 468 | 330 | 387 | 512 | 330 | 387 | 543 |

| | # of sub-data packets in the core frame $S_C$ | | | | | | | | | | |
|---|---|---|---|---|---|---|---|---|---|---|---|
| No. | 13 | 14 | 15 | 16 | 17 | 18 | 19 | 20 | 21 | 22 | 23 |
| 1 | 330 | 387 | 352 | 330 | 387 | 467 | 330 | 387 | 620 | 330 | 387 |
| 2 | 330 | 387 | 361 | 330 | 387 | 472 | 330 | 387 | 522 | 330 | 387 |
| 3 | 330 | 387 | 485 | 330 | 387 | 397 | 330 | 387 | 444 | 330 | 387 |
| 4 | 330 | 387 | 595 | 330 | 387 | 604 | 330 | 387 | 352 | 330 | 387 |

-continued

| | | | | | | | | | | |
|---|---|---|---|---|---|---|---|---|---|---|
| 5 | 330 | 387 | 352 | 330 | 387 | 373 | 330 | 387 | 490 | 330 | 387 |
| 6 | 330 | 387 | 478 | 330 | 387 | 464 | 330 | 387 | 513 | 330 | 387 |
| 7 | 330 | 387 | 359 | 330 | 387 | 359 | 330 | 387 | 364 | 330 | 387 |
| 8 | 330 | 387 | 354 | 330 | 387 | 391 | 330 | 387 | 368 | 330 | 387 | wherein each line in the table is a time hopping pattern, wherein each column in the table is a hop of the respective time hopping pattern starting from a second hop so that each time hopping pattern comprises 24 hops, wherein each cell in the table indicates a temporal interval of a middle of the respective hop to a middle of an immediately subsequent hop in (advantageously multiples of) symbol durations; wherein the frequency hopping pattern is one of the following eight frequency hopping patterns having 24 hops each:

| Pattern | # of sub-data packets in the core frame $S_C$ | | | | | | | | | | | | | | | | | | | | | | | |
|---|---|---|---|---|---|---|---|---|---|---|---|---|---|---|---|---|---|---|---|---|---|---|---|---|
| Number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 5 | 21 | 13 | 6 | 22 | 14 | 1 | 17 | 9 | 0 | 16 | 8 | 7 | 23 | 15 | 4 | 20 | 12 | 3 | 19 | 11 | 2 | 18 | 10 |
| 2 | 4 | 20 | 12 | 1 | 17 | 9 | 0 | 16 | 8 | 6 | 22 | 14 | 7 | 23 | 15 | 2 | 18 | 10 | 5 | 21 | 13 | 3 | 19 | 11 |
| 3 | 4 | 20 | 12 | 3 | 19 | 11 | 6 | 22 | 14 | 7 | 23 | 15 | 0 | 16 | 8 | 5 | 21 | 13 | 2 | 18 | 10 | 1 | 17 | 9 |
| 4 | 6 | 22 | 14 | 2 | 18 | 10 | 7 | 23 | 15 | 0 | 16 | 8 | 1 | 17 | 9 | 4 | 20 | 12 | 5 | 21 | 13 | 3 | 19 | 11 |
| 5 | 7 | 23 | 15 | 4 | 20 | 12 | 3 | 19 | 11 | 2 | 18 | 10 | 6 | 22 | 14 | 0 | 16 | 8 | 1 | 17 | 9 | 5 | 21 | 13 |
| 6 | 3 | 19 | 11 | 6 | 22 | 14 | 2 | 18 | 10 | 0 | 16 | 8 | 7 | 23 | 15 | 1 | 17 | 9 | 4 | 20 | 12 | 5 | 21 | 13 |
| 7 | 3 | 19 | 11 | 1 | 17 | 9 | 5 | 21 | 13 | 7 | 23 | 15 | 0 | 16 | 8 | 2 | 18 | 10 | 6 | 22 | 14 | 4 | 20 | 12 |
| 8 | 0 | 16 | 8 | 6 | 22 | 14 | 3 | 19 | 11 | 2 | 18 | 10 | 4 | 20 | 12 | 7 | 23 | 15 | 5 | 21 | 13 | 1 | 17 | 9 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C23.

Hopping Pattern 2

A second hopping pattern is a combination of a time hopping pattern and a frequency hopping pattern for nodes 100 with a quartz tolerance of +/−10 ppm or better, wherein the time hopping pattern is one of the following eight time hopping patterns having 24 hops each:

| | # of sub-data packets in the core frame $S_C$ | | | | | | | | | | |
|---|---|---|---|---|---|---|---|---|---|---|---|
| No. | 1 | 2 | 3 | 4 | 5 | 6 | 7 | 8 | 9 | 10 | 11 | 12 |
| 1 | 373 | 319 | 489 | 373 | 319 | 500 | 373 | 319 | 482 | 373 | 319 | 637 |
| 2 | 373 | 319 | 505 | 373 | 319 | 545 | 373 | 319 | 403 | 373 | 319 | 412 |
| 3 | 373 | 319 | 349 | 373 | 319 | 349 | 373 | 319 | 443 | 373 | 319 | 649 |
| 4 | 373 | 319 | 507 | 373 | 319 | 426 | 373 | 319 | 658 | 373 | 319 | 601 |
| 5 | 373 | 319 | 430 | 373 | 319 | 375 | 373 | 319 | 427 | 373 | 319 | 476 |
| 6 | 373 | 319 | 485 | 373 | 319 | 357 | 373 | 319 | 611 | 373 | 319 | 438 |
| 7 | 373 | 319 | 620 | 373 | 319 | 490 | 373 | 319 | 402 | 373 | 319 | 517 |
| 8 | 373 | 319 | 353 | 373 | 319 | 341 | 373 | 319 | 634 | 373 | 319 | 556 |

| | # of sub-data packets in the core frame $S_C$ | | | | | | | | | |
|---|---|---|---|---|---|---|---|---|---|---|
| No. | 13 | 14 | 15 | 16 | 17 | 18 | 19 | 20 | 21 | 22 | 23 |
| 1 | 373 | 319 | 342 | 373 | 319 | 346 | 373 | 319 | 405 | 373 | 319 |
| 2 | 373 | 319 | 420 | 373 | 319 | 446 | 373 | 319 | 393 | 373 | 319 |
| 3 | 373 | 319 | 629 | 373 | 319 | 344 | 373 | 319 | 354 | 373 | 319 |
| 4 | 373 | 319 | 364 | 373 | 319 | 345 | 373 | 319 | 342 | 373 | 319 |
| 5 | 373 | 319 | 632 | 373 | 319 | 557 | 373 | 319 | 349 | 373 | 319 |
| 6 | 373 | 319 | 372 | 373 | 319 | 460 | 373 | 319 | 417 | 373 | 319 |
| 7 | 373 | 319 | 353 | 373 | 319 | 366 | 373 | 319 | 345 | 373 | 319 |
| 8 | 373 | 319 | 646 | 373 | 319 | 341 | 373 | 319 | 364 | 373 | 319 | wherein each line in the table is a time hopping pattern, wherein each column in the table is a hop of the respective time hopping pattern starting from a second hop so that each time hopping pattern comprises 24 hops, wherein each cell in the table indicates a temporal interval of a middle of the respective hop a middle of an immediately subsequent hop in (advantageously multiples of) symbol durations;

wherein the frequency hopping pattern is one of the following eight frequency hopping patterns having 24 hops each:

| Pattern Number | # of sub-data packets in the core frame $S_C$ | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 4 | 24 | 14 | 8 | 28 | 18 | 9 | 29 | 19 | 3 | 23 | 13 | 7 | 27 | 17 | 0 | 20 | 10 | 6 | 26 | 16 | 5 | 25 | 15 |
| 2 | 2 | 22 | 12 | 0 | 20 | 10 | 7 | 27 | 17 | 8 | 28 | 18 | 1 | 21 | 11 | 4 | 24 | 14 | 9 | 29 | 19 | 6 | 26 | 16 |
| 3 | 0 | 20 | 10 | 6 | 26 | 16 | 4 | 24 | 14 | 3 | 23 | 13 | 2 | 22 | 12 | 5 | 25 | 15 | 9 | 29 | 19 | 1 | 21 | 11 |
| 4 | 7 | 27 | 17 | 4 | 24 | 14 | 2 | 22 | 12 | 8 | 28 | 18 | 1 | 21 | 11 | 9 | 29 | 19 | 6 | 26 | 16 | 0 | 20 | 10 |
| 5 | 3 | 23 | 13 | 2 | 22 | 12 | 8 | 28 | 18 | 5 | 25 | 15 | 0 | 20 | 10 | 7 | 27 | 17 | 6 | 26 | 16 | 1 | 21 | 11 |
| 6 | 1 | 21 | 11 | 3 | 23 | 13 | 8 | 28 | 18 | 9 | 29 | 19 | 2 | 22 | 12 | 5 | 25 | 15 | 0 | 20 | 10 | 7 | 27 | 17 |
| 7 | 6 | 26 | 16 | 7 | 27 | 17 | 9 | 29 | 19 | 4 | 24 | 14 | 0 | 20 | 10 | 3 | 23 | 13 | 8 | 28 | 18 | 5 | 25 | 15 |
| 8 | 1 | 21 | 11 | 7 | 27 | 17 | 3 | 23 | 13 | 9 | 29 | 19 | 4 | 24 | 14 | 6 | 26 | 16 | 8 | 28 | 18 | 0 | 20 | 10 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C29.

Hopping Pattern 3

A third hopping pattern is a combination of a time hopping pattern and a frequency hopping pattern for nodes 100 with a quartz tolerance of +/−20 ppm or better, wherein the time hopping pattern is one of the following eight time hopping patterns having 18 hops each:

| Pattern Number | # of sub-data packets in the core frame $S_C$ | | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| 1 | 471 | 595 | 594 | 496 | 545 | 445 | 440 | 535 | 601 | 522 | 430 | 545 | 519 | 439 | 484 | 438 | 605 |
| 2 | 512 | 424 | 649 | 447 | 550 | 611 | 624 | 418 | 501 | 464 | 606 | 509 | 636 | 443 | 465 | 434 | 431 |
| 3 | 625 | 548 | 540 | 434 | 520 | 559 | 488 | 531 | 501 | 465 | 459 | 428 | 444 | 459 | 505 | 459 | 633 |
| 4 | 457 | 489 | 612 | 450 | 457 | 440 | 567 | 538 | 516 | 514 | 540 | 474 | 592 | 445 | 577 | 444 | 493 |
| 5 | 488 | 643 | 626 | 541 | 560 | 550 | 450 | 475 | 520 | 456 | 618 | 447 | 455 | 440 | 455 | 510 | 477 |
| 6 | 548 | 444 | 459 | 529 | 453 | 525 | 440 | 553 | 583 | 527 | 520 | 461 | 575 | 457 | 464 | 533 | 421 |
| 7 | 461 | 607 | 501 | 534 | 505 | 569 | 561 | 472 | 509 | 450 | 555 | 440 | 423 | 494 | 448 | 525 | 485 |
| 8 | 577 | 611 | 464 | 552 | 451 | 508 | 478 | 438 | 443 | 507 | 420 | 553 | 520 | 576 | 580 | 564 | 404 | wherein each line in the table is a time hopping pattern, wherein each column in the table is a hop of the respective time hopping pattern starting from a second hop so that each time hopping pattern comprises 18 hops, wherein each cell in the table indicates a temporal interval of a middle of the respective hop to a middle of an immediately subsequent hop in (advantageously multiples of) symbol durations;

wherein the frequency hopping pattern is one of the following eight frequency hopping patterns having 18 hops each:

| Pattern Number | # of sub-data packets in the core frame $S_C$ | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| 1 | 19 | 18 | 12 | 21 | 15 | 14 | 22 | 2 | 5 | 10 | 17 | 6 | 8 | 4 | 7 | 20 | 13 | 0 |
| 2 | 10 | 4 | 1 | 7 | 23 | 6 | 3 | 8 | 17 | 2 | 18 | 9 | 22 | 14 | 11 | 16 | 5 | 21 |
| 3 | 0 | 16 | 11 | 20 | 9 | 13 | 23 | 21 | 2 | 19 | 1 | 15 | 3 | 7 | 12 | 4 | 22 | 6 |
| 4 | 14 | 9 | 0 | 15 | 7 | 5 | 8 | 18 | 1 | 12 | 19 | 23 | 17 | 16 | 10 | 2 | 13 | 11 |
| 5 | 6 | 12 | 19 | 10 | 4 | 22 | 13 | 17 | 11 | 5 | 23 | 3 | 1 | 8 | 14 | 0 | 9 | 20 |
| 6 | 16 | 20 | 3 | 5 | 21 | 10 | 17 | 1 | 12 | 18 | 15 | 11 | 0 | 9 | 2 | 14 | 6 | 8 |
| 7 | 15 | 0 | 8 | 18 | 9 | 23 | 11 | 20 | 14 | 3 | 16 | 22 | 19 | 13 | 7 | 21 | 12 | 4 |
| 8 | 4 | 7 | 16 | 22 | 13 | 19 | 2 | 3 | 6 | 15 | 10 | 20 | 23 | 5 | 21 | 17 | 18 | 1 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C23.

Hopping Pattern 4

A fourth hopping pattern is a combination of a time hopping pattern and a frequency hopping pattern for nodes 100 with a quartz tolerance of +/−10 ppm or better, wherein the time hopping pattern is one of the following eight time hopping patterns having 18 hops each:

| Pattern Number | # of sub-data packets in the core frame $S_C$ | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| 1 | 442 | 455 | 586 | 520 | 436 | 485 | 506 | 446 | 590 | 459 | 637 | 466 | 597 | 445 | 471 | 419 | 547 |
| 2 | 447 | 594 | 459 | 512 | 577 | 490 | 510 | 500 | 576 | 581 | 512 | 441 | 483 | 507 | 467 | 447 | 612 |
| 3 | 525 | 446 | 428 | 450 | 434 | 445 | 457 | 563 | 470 | 537 | 529 | 527 | 537 | 513 | 428 | 525 | 620 |
| 4 | 626 | 467 | 450 | 544 | 564 | 505 | 450 | 645 | 457 | 423 | 433 | 439 | 559 | 547 | 449 | 641 | 508 |
| 5 | 590 | 592 | 423 | 544 | 444 | 553 | 475 | 431 | 452 | 551 | 454 | 459 | 450 | 512 | 499 | 532 | 447 |
| 6 | 476 | 420 | 516 | 422 | 558 | 483 | 474 | 462 | 474 | 458 | 529 | 596 | 562 | 419 | 417 | 600 | 634 |
| 7 | 500 | 462 | 601 | 484 | 556 | 591 | 423 | 429 | 540 | 523 | 530 | 606 | 589 | 459 | 415 | 419 | 606 |
| 8 | 422 | 473 | 458 | 535 | 420 | 423 | 502 | 425 | 602 | 472 | 555 | 650 | 509 | 579 | 595 | 510 | 568 | wherein each line in the table is a time hopping pattern, wherein each column in the table is a hop of the respective time hopping pattern starting from a second hop so that each time hopping pattern comprises 18 hops, wherein each cell in the table indicates a temporal interval of a middle of the respective hop to a middle of an immediately subsequent hop in (advantageously multiples of) symbol durations; wherein the frequency hopping pattern is one of the following eight frequency hopping patterns having 18 hops each:

| Pattern Number | # of sub-data packets in the core frame $S_C$ | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| 1 | 2 | 14 | 16 | 18 | 0 | 26 | 21 | 9 | 6 | 28 | 5 | 24 | 22 | 29 | 17 | 27 | 13 | 12 |
| 2 | 23 | 7 | 19 | 15 | 8 | 3 | 1 | 11 | 10 | 20 | 25 | 4 | 6 | 9 | 14 | 17 | 5 | 0 |
| 3 | 10 | 23 | 11 | 2 | 25 | 22 | 4 | 24 | 27 | 8 | 16 | 15 | 1 | 18 | 28 | 7 | 21 | 26 |
| 4 | 12 | 13 | 29 | 20 | 3 | 19 | 26 | 15 | 1 | 21 | 27 | 6 | 17 | 14 | 4 | 2 | 25 | 7 |
| 5 | 19 | 22 | 12 | 13 | 11 | 28 | 23 | 18 | 16 | 0 | 10 | 24 | 3 | 5 | 29 | 20 | 8 | 9 |
| 6 | 16 | 12 | 18 | 25 | 19 | 23 | 20 | 4 | 5 | 6 | 9 | 27 | 21 | 10 | 15 | 28 | 24 | 13 |
| 7 | 14 | 29 | 26 | 11 | 22 | 2 | 0 | 1 | 7 | 3 | 8 | 9 | 23 | 4 | 27 | 16 | 15 | 17 |
| 8 | 0 | 24 | 28 | 3 | 29 | 5 | 14 | 8 | 18 | 22 | 20 | 17 | 10 | 6 | 26 | 11 | 21 | 12 | wherein each line in the table is a frequency hopping pattern, wherein each column in the table is a hop of the respective frequency hopping pattern, wherein each cell in the table indicates a transmission frequency of the respective hop of the respective frequency hopping pattern in carriers of UCG_C0 to UCG_C29.

In general, if there is an indication of a hop in multiples of symbol durations, this refers advantageously to an integer multiple of the symbol durations or to a fraction of a symbol duration.

3. FURTHER EMBODIMENTS

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

A signal encoded according to the invention, such as an audio signal or a video signal or a transport current signal, may be stored on a digital storage medium or may be transmitted on a transmission medium, such as a wireless transmission medium or a wired transmission medium, e.g. the internet.

The audio signal encoded according to the invention may be stored on a digital storage medium or may be transmitted on a transmission medium, such as a wireless transmission medium or a wired transmission medium, e.g. the internet.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software (computer program).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ABBREVIATIONS

C: Number of the bursts that form a cluster
L: Number of the available frequency bands
N: Number of the bursts that a frame consists of
$N_{threshold}$ Amplitude threshold value in the generation of ACF candidates
$P_{selection}$ Number of the hopping patterns optimized as to 2D-ACF und CCF characteristics
S: Number of the frequency bands that are not allowed to contain bursts as guard strips due to oscillator frequency errors
$T_A$: Sampling rate on the time axis
$T_{burst}$: Duration of a burst
$T_{frame}$: Duration of a frame
TSMA: Telegram Splitting Multiple Access
TSMA pattern: Hopping pattern of a frame in the time and frequency domain
X Matrix having time and frequency information of the hopping patterns
$\Theta_{x,x}$ 2D autocorrelation function (2D-ACF)
$\Theta_{x,y}$ 2D cross-correlation function (2D CCF)

The invention claimed is:

1. A data transmitter comprising:
a transmission unit configured to transmit a signal comprising an individual hopping pattern, wherein the individual hopping pattern depends on an operation parameter,
wherein the operation parameter is a frequency offset which the transmission unit is configured to apply to a hopping pattern in order to acquire the individual hopping pattern,
wherein the hopping pattern is defined by a sequence of transmission frequencies,
wherein the transmission unit is configured to apply the frequency offset to the hopping pattern by applying a same frequency offset to all transmission frequencies of the sequence of transmission frequencies,
wherein the frequency offset is a random frequency offset.

2. The data transmitter according to claim 1, wherein the transmission unit is configured to calculate the individual hopping pattern in dependence on the operation parameter.

3. The data transmitter according to claim 1, wherein the transmission unit is configured to select the individual hopping pattern from a set of hopping patterns in dependence on the operation parameter.

4. The data transmitter according to claim 3, wherein the set of hopping patterns is known to the data transmitter or is assigned to the data transmitter.

5. The data transmitter according to claim 1, wherein the operation parameter of the data transmitter further includes an intrinsic parameter of the data transmitter itself.

6. The data transmitter according to claim 5, wherein the intrinsic parameter of the data transmitter further includes addressing information or identification information of the data transmitter.

7. The data transmitter according to claim 5, wherein the intrinsic parameter of the data transmitter further includes a quartz tolerance of the data transmitter.

8. The data transmitter according to claim 7, wherein the transmission unit is configured to determine, in dependence on the quartz tolerance, a maximum range of frequency sub-channels of a frequency channel to be used;

wherein the transmission unit is configured to calculate the individual hopping pattern or select the hopping pattern from a set of hopping patterns such that the individual hopping pattern is within the maximum range of frequency sub-channels of the frequency channel to be used.

9. The data transmitter according to claim 5, wherein the intrinsic parameter of the data transmitter further includes the available transmission energy.

10. The data transmitter according to claim 9, wherein the transmission unit is further configured to puncture the hopping pattern in dependence on the available transmission energy when acquiring the individual hopping pattern.

11. The data transmitter according to claim 5, wherein the transmission unit is configured to determine the frequency offset in dependence on user data or error protection data to be transmitted.

12. The data transmitter according to claim 5, wherein the transmission unit is configured to provide the signal with information describing the frequency offset.

13. The data transmitter according to claim 1, wherein the transmission unit is configured to determine the frequency offset in dependence on user data or a part of the user data.

14. The data transmitter according to claim 1, wherein the transmission unit is configured to determine the frequency offset in dependence on error protection data or a part of the error protection data.

15. The data transmitter according to claim 1, wherein the hopping pattern is a frequency hopping pattern or a combination of the frequency hopping pattern and a time hopping pattern.

16. The data transmitter according to claim 1, wherein the-transmission unit is configured to divide a data packet into a plurality of sub-data packets, wherein each of the plurality of sub-data packets is shorter than the data packet; wherein the transmission unit is configured to transmit the plurality of sub-data packets distributed in frequency or time and frequency according to the hopping pattern.

17. A system, comprising:
the data transmitter according to claim 1; and
a data receiver configured to receive the signal from the data transmitter.

18. A data receiver comprising:
a reception unit configured to receive a data signal from a data transmitter, wherein the data signal comprises an individual hopping pattern, wherein the individual hopping pattern depends on an operation parameter of the data transmitter,
wherein the operation parameter is a frequency offset which the data transmitter applies to a hopping pattern in order to acquire the individual hopping pattern,
wherein the hopping pattern is defined by a sequence of transmission frequencies,
wherein the frequency offset is applied to the hopping pattern by applying a same frequency offset to all transmission frequencies of the sequence of transmission frequencies,
wherein the frequency offset is a random frequency offset; and
the reception unit is further configured to recover data from the received data signal using a calculated individual hopping pattern which corresponds to the individual hopping pattern of the data transmitter.

19. The data receiver according to claim 18, wherein the data receiver knows the operation parameter of the data transmitter.

20. The data receiver according to claim 19, wherein the reception unit is configured to calculate the individual hopping pattern of the data transmitter using the operation parameter.

21. The data receiver according to claim 18, wherein the reception unit is configured to determine, from a set of hopping patterns, the individual hopping pattern of the data transmitter in dependence on the operation parameter.

22. The data receiver according to claim 21, wherein the reception unit is configured to specify the set of hopping patterns to the data transmitter.

23. The data receiver according to claim 21, wherein the set of hopping patterns is known to the data receiver and the data transmitter.

24. The data receiver according to claim 18, wherein the operation parameter further includes a quartz tolerance of the data transmitter.

25. The data receiver according to claim 24, wherein the reception unit is configured to determine the frequency offset that depends on the quartz tolerance of the data transmitter and with which the data transmitter transmits the hopping pattern known to the data receiver in order to determine the individual hopping pattern of the data transmitter that results from the frequency offset.

26. A method for transmitting a signal, comprising:
transmitting, using a transmission unit of a data transmitter, the signal, wherein the signal comprises an individual hopping pattern, wherein the individual hopping pattern depends on a transmitter-side operation parameter,
applying, using the transmission unit, a frequency offset as the operation parameter to a hopping pattern in order to acquire the individual hopping pattern,
wherein the hopping pattern is defined by a sequence of transmission frequencies,
wherein the frequency offset is applied to the hopping pattern using the transmission unit by applying a same frequency offset to all transmission frequencies of the sequence of transmission frequencies,
wherein the frequency offset is a random frequency offset.

27. A method for receiving a data signal, comprising:
receiving the data signal using a reception unit of a data receiver, wherein the data signal comprises an individual hopping pattern, wherein the individual hopping pattern depends on a transmitter-side operation parameter,
wherein the transmitter-side operation parameter is a frequency offset which is applied to a hopping pattern on a transmitter-side in order to acquire the individual hopping pattern,
wherein the hopping pattern is defined by a sequence of transmission frequencies,
wherein the frequency offset is applied to the hopping pattern by applying a same frequency offset to all transmission frequencies of the sequence of transmission frequencies,
wherein the frequency offset is a random frequency offset; and
recovering data from the received data signal using a calculated individual hopping pattern which corresponds to the individual hopping pattern of the transmitter-side.

28. A non-transitory digital storage medium having a computer program stored thereon to perform a method for transmitting a signal when the computer program is run by a computer, the method comprising:

transmitting, using a transmission unit of a data transmitter, the signal, wherein the signal comprises an individual hopping pattern, wherein the individual hopping pattern depends on a transmitter-side operation parameter, applying, using the transmission unit, a frequency offset as the operation parameter to a hopping pattern in order to acquire the individual hopping pattern, wherein the hopping pattern is defined by a sequence of transmission frequencies, wherein the frequency offset is applied to the hopping pattern using the transmission unit by applying a same frequency offset to all transmission frequencies of the sequence of transmission frequencies, wherein the frequency offset is a random frequency offset.

29. A non-transitory digital storage medium having a computer program stored thereon to perform a method for receiving a data signal when the computer program is run by a computer, the method comprising:

receiving the data signal using a reception unit of a data receiver, wherein the data signal comprises an individual hopping pattern, wherein the individual hopping pattern depends on a transmitter-side operation parameter, wherein the transmitter-side operation parameter is a frequency offset which is applied to a hopping pattern on a transmitter-side in order to acquire the individual hopping pattern, wherein the hopping pattern is defined by a sequence of transmission frequencies, wherein the frequency offset is applied to the hopping pattern by applying a same frequency offset to all transmission frequencies of the sequence of transmission frequencies, wherein the frequency offset is a random frequency offset; and recovering data from the received data signal using a calculated individual hopping pattern which corresponds to the individual hopping pattern of the transmitter-side.

* * * * *